United States Patent
Sasaki et al.

(10) Patent No.: US 8,212,662 B2
(45) Date of Patent: Jul. 3, 2012

(54) AUTOMOTIVE DISPLAY SYSTEM AND DISPLAY METHOD

(75) Inventors: Takashi Sasaki, Kanagawa-ken (JP); Aira Hotta, Kanagawa-ken (JP); Haruhiko Okumura, Kanagawa-ken (JP); Masatoshi Ogawa, Saitama (JP); Osamu Nagahara, Tokyo (JP); Tsuyoshi Hagiwara, Tokyo (JP); Kazuo Horiuchi, Kanagawa-ken (JP); Naotada Okada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 458 days.

(21) Appl. No.: 12/568,045

(22) Filed: Sep. 28, 2009

(65) Prior Publication Data

US 2010/0164702 A1    Jul. 1, 2010

(30) Foreign Application Priority Data

Dec. 26, 2008 (JP) ................. 2008-334949

(51) Int. Cl.
 *B60Q 1/00* (2006.01)
(52) U.S. Cl. ........................................ 340/438
(58) Field of Classification Search ............. 340/438, 340/901, 937, 425.5, 933; 348/118, 135; 345/7
See application file for complete search history.

(56) References Cited

U.S. PATENT DOCUMENTS

| | | | |
|---|---|---|---|
| 6,552,653 B2 * | 4/2003 | Nakaho et al. | 340/425.5 |
| 7,145,519 B2 * | 12/2006 | Takahashi et al. | 345/7 |
| 2004/0113818 A1 * | 6/2004 | Yokokohji et al. | 340/995.1 |
| 2004/0169653 A1 * | 9/2004 | Endo et al. | 345/427 |
| 2005/0264433 A1 * | 12/2005 | Yokokohji et al. | 340/937 |
| 2008/0007428 A1 * | 1/2008 | Watanabe et al. | 340/901 |
| 2008/0068520 A1 * | 3/2008 | Minikey et al. | 349/11 |
| 2009/0135374 A1 | 5/2009 | Horiuchi et al. | |
| 2009/0153962 A1 | 6/2009 | Okada et al. | |
| 2009/0201225 A1 | 8/2009 | Okada et al. | |
| 2009/0237803 A1 | 9/2009 | Hotta et al. | |
| 2009/0243963 A1 | 10/2009 | Hotta et al. | |
| 2009/0244702 A1 | 10/2009 | Okada et al. | |
| 2010/0066832 A1 | 3/2010 | Nagahara et al. | |
| 2010/0066925 A1 | 3/2010 | Nagahara et al. | |
| 2010/0066984 A1 | 3/2010 | Horiuchi et al. | |
| 2010/0073773 A1 | 3/2010 | Hotta et al. | |
| 2010/0157430 A1 | 6/2010 | Hotta et al. | |
| 2010/0283035 A1 | 11/2010 | Tanaka | |
| 2011/0001639 A1 | 1/2011 | Sasaki et al. | |

FOREIGN PATENT DOCUMENTS

| | | |
|---|---|---|
| JP | 2006-017626 | 1/2006 |
| JP | 2006-284458 | 10/2006 |

\* cited by examiner

*Primary Examiner* — Phung Nguyen

(74) *Attorney, Agent, or Firm* — Turocy & Watson, LLP

(57) ABSTRACT

An automotive display system includes an image projection unit and an angle information acquisition unit. The image projection unit projects a light flux including an image including a display object toward one eye of an image viewer. The angle information acquisition unit acquires at least one of vehicle angle information and external environment angle information. The vehicle angle information relates to an angle of at least one of an attitude and a heading of a vehicle carrying the image viewer. The external environment angle information relates to an angle of a background object at a target position of the display object in a background of an external environment of the vehicle. The image projection unit changes an angle of the display object in the image based on at least one of the vehicle angle information and the external environment angle information acquired by the angle information acquisition unit.

20 Claims, 28 Drawing Sheets

AUTOMOTIVE DISPLAY SYSTEM AND DISPLAY METHOD

CROSS-REFERENCE TO RELATED APPLICATIONS

This application is based upon and claims the benefit of priority from the prior Japanese Patent Application No. 2008-334949, filed on Dec. 26, 2008; the entire contents of which are incorporated herein by reference.

BACKGROUND OF THE INVENTION

1. Field of the Invention

This invention relates to an automotive display system and a display method.

2. Background Art

Automotive display devices include a group of display devices called HUDs (Head-Up Displays). In such display devices, an image presented by an image formation device such as an LCD, a CRT, etc., is reflected by a semi-transmissive reflector such as a half mirror via an optical system and provided to an observer operating a vehicle. The semi-transmissive reflector, called a combiner, provides an image superimposed on external environment information to the observer by reflecting the image from the image formation device and transmitting the external environment information. As a result, the observer can simultaneously visually identify the external environment information and the image information from the image formation device.

There is a strong desire for such a display device to project by substantially superimposing the presented image information on the external environment information forming the background, and to project by disposing the presented image information at, for example, a position corresponding to the spatial position of the external environment information. In particular, attempts are being made to present vehicle route information better suited to the external environment information of the background to use in car navigation for automobiles.

For example, JP-A 2006-284458 discusses technology to dynamically modify the display mode of an arrow according to the traveling state of a vehicle and/or the traffic conditions around the vehicle when displaying a moving image of the arrow to indicate the direction in which the vehicle should proceed. In this technology, the degree of safety is determined according to the traveling state of the vehicle and/or the traffic conditions around the vehicle, and the display mode of the arrow such as the display position, the color, the clarity, the operation, the configuration, and the size is modified.

JP-A 2006-17626, for example, discusses technology to present an image of an arrow and the like while changing the size of the image according to the passage of time during a movement of a moving object such that the image is overlaid on the landscape seen frontward of the windshield of the moving object.

However, in such conventional HUDs, there is no consideration given to shifting of the display in the case where, for example, the attitude of the vehicle (e.g., the slant rearward and frontward and/or the slant left and right, etc.) is shifted from the configuration of the road frontward of the vehicle (e.g., the slant uphill and downhill and/or left and right, etc.). Therefore, in the case where the attitude of the vehicle is shifted from the configuration of the road, the arrow, for example, displayed in the HUD is undesirably shifted from the road, and an incongruity results.

In conventional HUDs such as those recited above, the subjective depth position (the perceived depth position) of the presented information observed as a virtual image undesirably matches the virtual image distance. Therefore, no matter the presented information, it is difficult to match the perceived depth position of the presented information to the actual spatial position.

SUMMARY OF THE INVENTION

According to an aspect of the invention, there is provided an automotive display system, including: an image projection unit configured to project a light flux including an image including a display object toward one eye of an image viewer; and an angle information acquisition unit configured to acquire at least one of vehicle angle information and external environment angle information, the vehicle angle information relating to an angle of at least one of an attitude and a heading of a vehicle carrying the image viewer, the external environment angle information relating to an angle of a background object at a target position of the display object in a background of an external environment of the vehicle, the image projection unit changing an angle of the display object in the image based on at least one of the vehicle angle information and the external environment angle information acquired by the angle information acquisition unit.

According to another aspect of the invention, there is provided a display method, including: acquiring at least one of vehicle angle information and external environment angle information, the vehicle angle information relating to an angle of at least one of an attitude and a heading of a vehicle carrying an image viewer, the external environment angle information relating to an angle of a background object at a target position of the display object in a background of an external environment of the vehicle; changing an angle of a display object in an image based on at least one of the acquired vehicle angle information and the acquired external environment angle information; and projecting a light flux including the image including the display object toward one eye of the image viewer.

BRIEF DESCRIPTION OF THE DRAWINGS

FIGS. 4A to 4C are schematic views illustrating states of the vehicle using the automotive display system according to the first embodiment of;

DETAILED DESCRIPTION OF THE INVENTION

Figure 1:
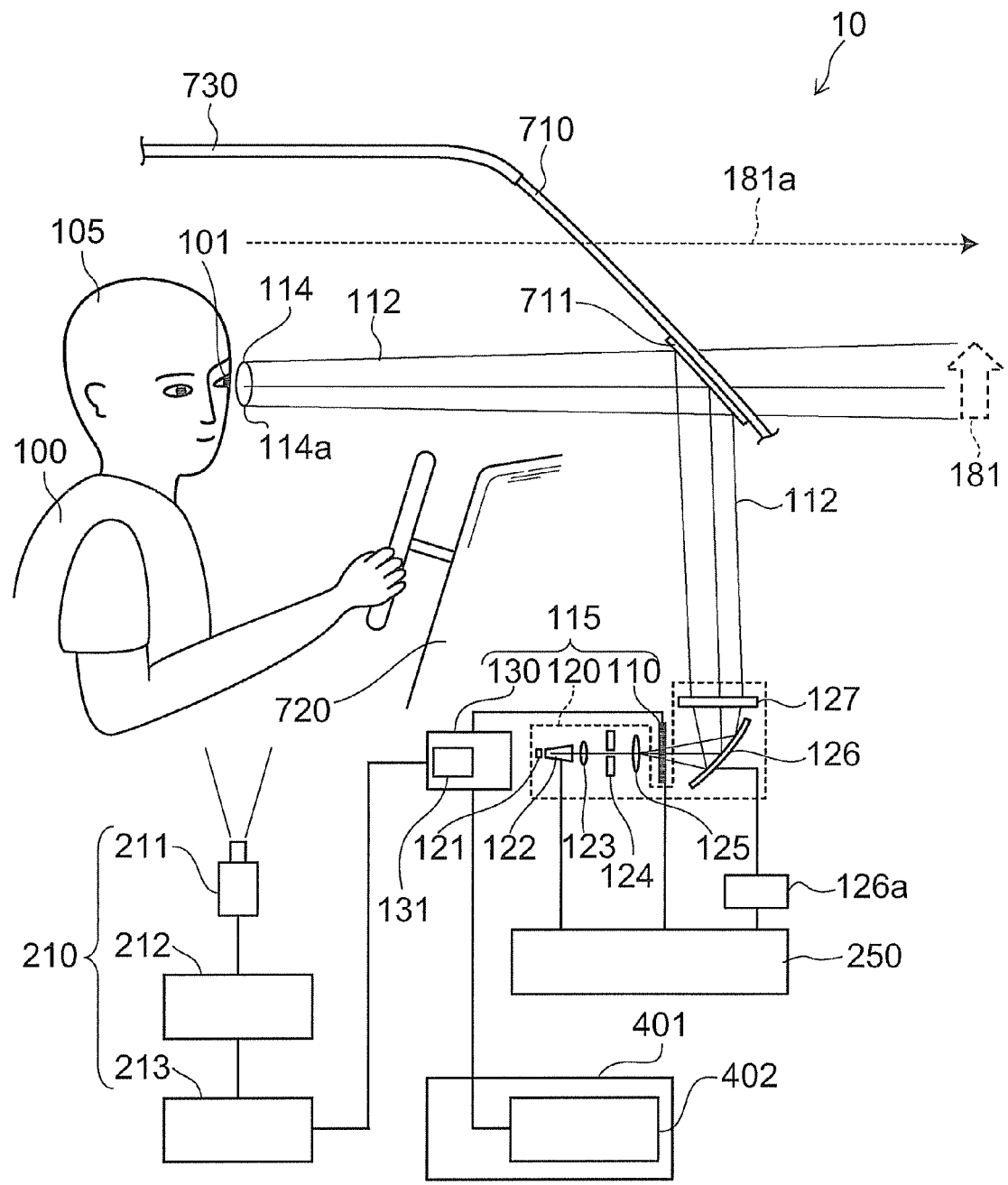
FIG. 1 is a schematic view illustrating the configuration of an automotive display system according to a first embodiment.

Embodiments of the invention will now be described in detail with reference to the drawings. In the specification and drawings, components similar to those described or illustrated in a drawing thereinabove are marked with like reference numerals, and a detailed description is omitted as appropriate. Up, down, left, right, front, and rear in the descriptions are relative directions referenced to illustrations in the drawings.

First Embodiment

FIG. 1 is a schematic view illustrating the configuration of an automotive display system according to a first embodiment of the invention.

An automotive display system 10 according to the first embodiment of the invention illustrated in FIG. 1 includes an angle information acquisition unit 401 and an image projection unit 115.

The angle information acquisition unit 401 acquires information regarding an angle of at least one of vehicle angle information and external environment angle information, where the vehicle angle information relates to an angle of an attitude and a heading of a vehicle (moving object) 730 (angle of an axis of the vehicle 730), and the external environment angle information relates to an angle of a background object (angle of an axis of the background object) at a target position of a display object in the background of the external environment of the vehicle 730.

The vehicle 730 may include various moving bodies such as an automobile or a two-wheeled vehicle carrying an image viewer 100 viewing an image presented by the automotive display system 10. The image viewer 100 is a person riding in the vehicle 730 and may be, for example, an operator (driver) operating the vehicle 730.

The axis of the vehicle 730 may be, for example, the axis from the rear toward the front of the vehicle 730. However, it is sufficient that the axis of the vehicle 730 indicates the attitude and the direction of the vehicle 730 in space, and any axis relating to the vehicle 730 may be used.

The angle of the axis of the vehicle 730 is at least one of the attitude and the heading of the vehicle 730. In other words, the angle of the axis of the vehicle 730 may include, for example, at least one of an angle in a pitch direction (pitch angle), an angle in a roll direction (roll angle), and an angle in a yaw direction (yaw angle) of the vehicle 730 as described below.

The external environment of the vehicle 730 is a space outside of the space in which the image viewer 100 rides in the vehicle 730 (the vehicle interior), and particularly the space outside and in the frontward path of the vehicle 730.

An axis of the background object in the external environment of the vehicle 730 may be taken as, for example, an axis relating to an extension direction of a road in the frontward path. It is sufficient that the axis of the background object is an axis indicating a direction of the background object in space, and any axis relating to the background object of the external environment may be used.

The angle of the axis of the background object (the angle of the background object) may include, for example, at least one of an uphill/downhill angle of the road, the angle of a slant of the road in the left and right direction, and an angle in a heading direction of the road as described below.

The image projection unit 115 projects a light flux 112 including an image which includes the display object toward one eye 101 of the image viewer 100. In other words, the image projection unit 115 generates the display object in the image at a corresponding position in the background of the frontward path and projects the light flux 112 including the image which includes the generated display object toward the one eye 101 of the image viewer 100.

The display object is provided in the image which the automotive display system 10 presents to the image viewer 100 and may be, for example, content relating to driving information of the vehicle 730 in which the automotive display system 10 is mounted such as displays including an arrow and the like indicating the travel direction, the speed, cautions, warnings, etc.

The image projection unit 115 changes the angle of the display object in the image based on at least one of the vehicle angle information and the external environment angle information recited above acquired by the angle information acquisition unit 401.

As illustrated in FIG. 1, the automotive display system 10 is provided, for example, in the vehicle 730, that is, for example, in an inner portion of a dashboard 720 of the vehicle 730 as viewed by the image viewer 100.

The image projection unit 115 includes, for example, an image generation unit 130, an image formation unit 110, and a projection unit 120.

The image generation unit 130 generates an image signal corresponding to the image including the display object and supplies the image signal to the image formation unit 110.

The image generation unit 130 may include an image memory 131 (image data storage unit) that stores image data on which the image is based. Image data relating to the display object such as, for example, the arrow described below may be stored in the image memory 131. In such a case, the image memory 131 may store data of the display object in a virtual three dimensional space, i.e., a virtual space, and function as memory during three dimensional rendering of the display object in the virtual space. The image memory 131 also may store various image data relating to the display object as a two dimensional image and image data generated by, for example, interpolation based on such stored image data. The image memory 131 may be provided separately from the image generation unit 130 and separately from the image projection unit 115.

The image formation unit 110 may include, for example, various optical switches such as an LCD, a DMD (Digital Micromirror Device), and a MEMS (Micro-electro-mechanical System). The image formation unit 110 receives the image signal including the prescribed image from the image generation unit 130 and forms the image on a screen of the image formation unit 110.

The image formation unit 110 may include a laser projector, LED projector, and the like. In such a case, light from the laser beam or LED forms the image.

The projection unit 120 projects the image formed by the image formation unit 110 onto the one eye 101 of the image viewer 100.

The projection unit 120 may include, for example, various light sources, projection lenses, mirrors, and various optical devices controlling the divergence angle (the diffusion angle).

In this specific example, the projection unit 120 includes, for example, a light source 121, a tapered light guide 122, a first lens 123, and variable aperture 124, a second lens 125, a movable mirror 126 having, for example, a concave configuration, and an aspherical Fresnel lens 127.

Various light sources may be used as the light source 121 including a LED, a high pressure mercury lamp, a halogen lamp, a laser, etc. The aspherical Fresnel lens 127 may be designed to control the shape (such as the cross sectional configuration) of the light flux 112 to match the configuration of, for example, a windshield 710.

Assuming, for example, a focal distance f1 of the first lens 123 and a focal distance f2 of the second lens 125, the variable aperture 124 is disposed a distance of f1 from the first lens 123 and a distance of f2 from the second lens 125.

Light flux emerging from the second lens 125 enters the image formation unit 110 and is modulated by the image formed by the image formation unit 110 to form the light flux 112.

The light flux 112 passes through the aspherical Fresnel lens 127 via the mirror 126, is reflected by, for example, the windshield 710 (a transparent plate) of the vehicle 730 in which the automotive display system 10 is mounted, and is projected onto the one eye 101 of the image viewer 100. The image viewer 100 perceives a virtual image 181 formed at a virtual image formation position 181a via the windshield 710. A reflector 711 may be provided on the windshield 710 as necessary. The reflector 711 is designed to have both the ability to transmit light and the ability to reflect light, and the image viewer 100 can simultaneously see the background of the external environment and the image including the display object in the light flux 112. Thus, the automotive display system 10 can be used as a HUD. That is, an image based on the display object may be used as the virtual image 181.

Thus, the divergence angle is controlled such that the light flux 112 reaches the image viewer 100 and the image viewer 100 views the image with the one eye 101. Here, the spacing between the eyes of the image viewer 100 is an average of 6 cm. Therefore, the light flux 112 can be projected onto the one eye 101 without projecting the image onto both eyes by controlling the width of the light flux 112 on a head 105 of the image viewer 100 to about 6 cm. It is favorable to project the image onto the dominant eye of the image viewer 100 for ease of viewing the image.

Although the variable aperture 124 is used to control the divergence angle of the light flux 112 recited above, a lenticular lens, a diffuser plate having a controlled diffusion angle, and the like also may be used.

In this specific example, an image viewer position detection unit 210 is further provided. The image viewer position detection unit 210 detects the position of the image viewer 100 riding in the vehicle 730. The image viewer position detection unit 210 detects, for example, the position of the one eye 101 of the image viewer 100.

The image viewer position detection unit 210 may include, for example, an imaging unit 211 that captures an image of the image viewer 100, an image processing unit 212 that performs image processing of the image captured by the imaging unit 211, and a calculation unit 213 that detects by determining the position of the one eye 101 of the image viewer 100 based on the data of the image processing by the image processing unit 212.

The calculation unit 213 detects using, for example, technology relating to personal authentication recited in JP 3279913 and the like to perform face recognition on the image viewer 100, calculate the positions of eyeballs as facial parts, and determine the position of the one eye 101 of the image viewer 100 onto which the image is to be projected.

The imaging unit 211 is disposed, for example, frontward and/or sideward of the driver's seat of the vehicle 730 to capture an image of, for example, the face of the image viewer 100, i.e., the operator; and the position of the one eye 101 of the image viewer 100 is detected as recited above.

In the automotive display system 10 according to this embodiment, the image projection unit 115 can project the light flux 112 including the generated image including the display object toward the one eye 101 of the image viewer 100 based on the position of the image viewer 100 (e.g., the position of the one eye 101) detected by the image viewer position detection unit 210. Thereby, the projection can be performed accurately onto the one eye 101.

The angle of the mirror 126, for example, may be adjustable by a drive unit 126a. In such a case, the drive unit 126a adjusts the angle of the mirror 126 based on the position of the image viewer 100 (e.g., the position of the one eye 101) detected by the image viewer position detection unit 210.

A control unit 250 is further provided in this specific example. The control unit 250 adjusts the angle of the display object in the image and at least one of a projection area 114a and a projection position 114 of the light flux 112 based on the position of the image viewer 100 (e.g., the position of the one eye 101) detected by the image viewer position detection unit 210.

The control unit 250 in this specific example, for example, controls the projection position 114 by, for example, controlling the drive unit 126a linked to the mirror 126 forming a portion of the projection unit 120 to control the angle of the mirror 126.

The control unit 250 can control the projection area 114a by, for example, controlling the various optical components forming the projection unit 120.

Thereby, it is possible to control at least one of the presentation position and the presentation area of the image to follow the head 105 of the image viewer 100 even in the case where the head 105 moves. The head 105 of the image viewer 100 does not move out of the image presentation position, and the practical viewing area can be increased.

The control unit 250 may adjust the luminance, contrast, etc., of the image by, for example, controlling the image formation unit 110.

Although the control unit 250 automatically adjusts at least one of the projection area 114a and the projection position 114 of the light flux 112 based on the detected position of the image viewer 100 (e.g., the position of the one eye 101) in the specific example recited above, the invention is not limited thereto. For example, the at least one of the projection area 114a and the projection position 114 of the light flux 112 may be manually adjusted based on the detected position of the image viewer 100 (e.g., the position of the one eye 101). In such a case, the angle of the mirror 126 may be controlled by, for example, manually controlling the drive unit 126a while viewing the image of the head 105 of the image viewer 100 captured by the projection unit 120 on some display.

Instead of a plane mirror, the mirror 126 may include a concave mirror as a reflective surface having a refractive power. Also in such a case, the angle thereof may be changed by the drive unit 126a. Although distortion of the displayed image may occur depending on the angle of the mirror 126, etc., an image without distortion can be presented to the image viewer 100 by performing a distortion compensation by the image generation unit 130.

Various modifications of the image projection unit 115 as described below are possible in addition to the specific examples recited above.

Thus, the automotive display system 10 according to this embodiment is a monocular display system.

Figure 2:
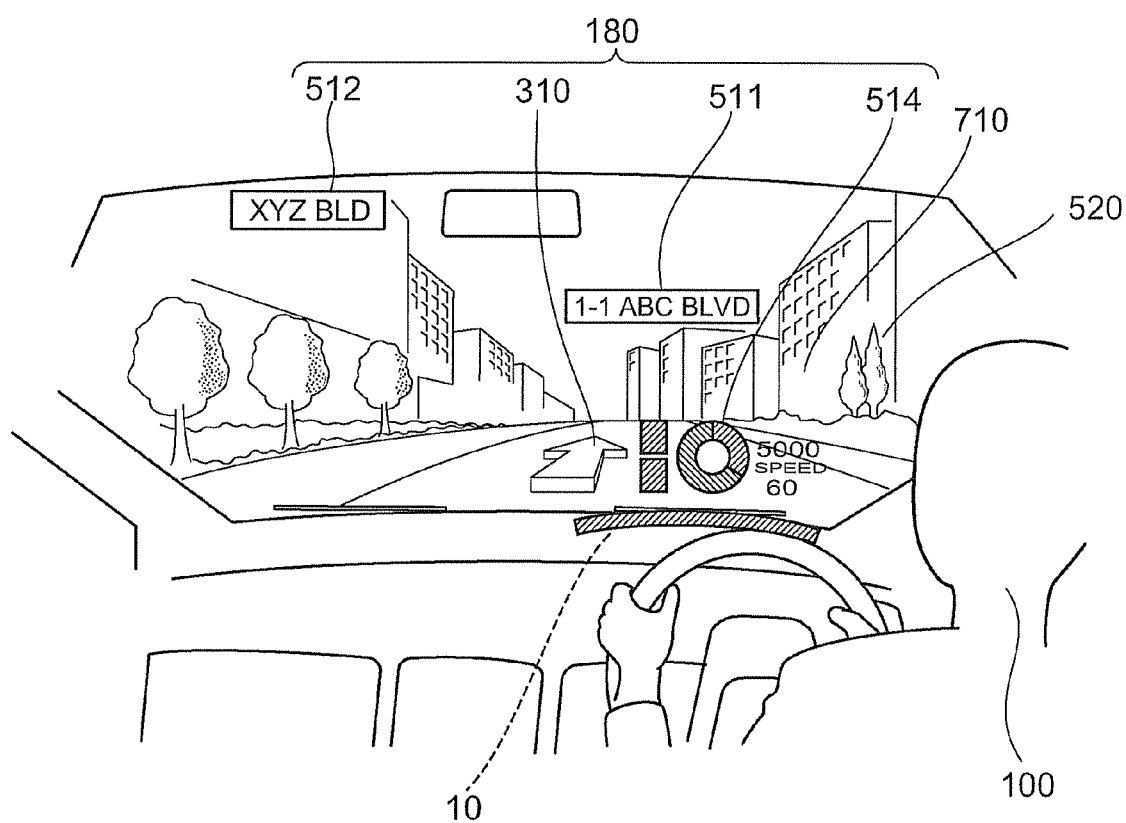
FIG. 2 is a schematic view illustrating the operating state of the automotive display system according to the first embodiment.

FIG. 2 is a schematic view illustrating the operating state of the automotive display system according to the first embodiment of the invention.

In the automotive display system 10 according to this embodiment illustrated in FIG. 2, an arrow 310 indicating the path of the vehicle 730 and the like, for example, is used as a display object 180 to be displayed. The image of the arrow 310 is projected and displayed on the windshield 710 (or the not-illustrated reflector 711). Thereby, the driver (the image viewer) 100 can simultaneously see a background object 520 of the external environment and a display object 180. Thus, the automotive display system 10 can be used as an automotive HUD.

Here, for example, in the case where the arrow 310 indicates a path to be selected at a branch point in the road, etc., the arrow 310 may be disposed at a position in the image presented by the automotive display system 10 to correspond to the position of the branch point in the background (e.g., a matched overlay). A more natural and easily understandable display is thereby possible. In other words, the arrow 310 is disposed at a prescribed position in the depth, up, down, left, and right directions in space for the corresponding external environment. Thus, the position in space of the external environment corresponding to the display object 180 such as the arrow 310 is referred to as a "target position" of the display object 180.

In addition to the arrow 310 indicating the path, the display object 180 may include, for example, any positional information 511 of the external environment such as the addresses of locations and any external environment information such as name information 512 including street names, surrounding buildings, etc. In other words, in this case as well, the positional information 511, the name information 512, and the like of the external environment may be displayed corresponding to the target position of the corresponding background of the external environment.

In addition to the arrow 310, the positional information 511 of the external environment, the name information 512 of the external environment, and the like recited above, the display object 180 may include, for example, any information relating to the operation of the vehicle 730 such as vehicle information 514 including the current position, speed, fuel, etc., of the vehicle 730.

The driver (the image viewer 100) can intuitively and easily understand the display of the HUD because the display is superimposed on the background. The automotive display system 10 in particular is a monocular HUD and can present an easily viewable display because the HUD display can be viewed simultaneously even when the fixation point of the driver is distal.

According to the automotive display system 10, an easily understandable display is possible by displaying the display object 180 corresponding to the background of the external environment. In particular, an easily viewable display is possible by displaying the arrow 310 corresponding to the configuration, position, and depth of the road to indicate the path to be traveled by the vehicle 730. Hereinbelow, to simplify the description, the case is described where the arrow 310 indicating the path is used as the display object 180.

In the case where the arrow 310 is displayed as the display object 180 as recited above, the road corresponding to the arrow 310 is the background object 520. Accordingly, when displaying the arrow 310, the external environment angle information is information relating to the angle of the road, i.e., the background object 520, at the target position of the arrow 310 (the display object 180) in the background of the external environment.

In the automotive display system 10 according to this embodiment illustrated in FIG. 1, the angle information acquisition unit 401 includes a vehicle axis angle detection unit 402 that detects the angle of the axis of the vehicle 730. Thereby, a display having a corrected vehicle 730 axis can be presented even in the case where the axis of the vehicle 730 is shifted from the axis of the background object 520 in the frontward path of the vehicle 730. Therefore, it is possible to perceive the display object 180 such as the arrow 310 more naturally.

Although the angle information acquisition unit 401 acquires at least one of vehicle angle information relating to the angle of the axis of the vehicle 730 and external environment angle information relating to the angle of the axis of the background object 520 of the external environment of the vehicle 730, first, the case where the angle information acquisition unit 401 includes the vehicle axis angle detection unit 402 to detect the angle of the axis of the vehicle 730 will be described.

The angle of the axis of the vehicle 730 may be taken as an angle referenced to, for example, at least one of a direction of terrestrial magnetism, a direction of gravity, and an axis based on the latitude and the longitude of the earth. Also, the angle of the axis of the vehicle 730 may be defined using the axis of the vehicle 730 at one reference time and the axis of the vehicle 730 at another time.

On the other hand, the angle of the axis of the background object 520 of the external environment of the vehicle 730 may be taken as an angle referenced to, for example, at least one of the direction of terrestrial magnetism, the direction of gravity, and the axis based on the latitude and the longitude of the earth. Also, the angle of the axis of the background object 520 may be defined using the axis of the background object 520 of the external environment of the vehicle 730 at one reference time and the axis of the background object 520 of the external environment of the vehicle 730 at another time.

Further, the angle of the axis of the vehicle 730 may be taken as an angle referenced to the axis of the background object 520 of the external environment. The angle of the axis of the background object 520 may be taken as an angle referenced to the axis of the vehicle 730. In other words, to correct the shift of the axis of the vehicle 730 in space and the image of the external environment in this embodiment, the angle of the axis of the vehicle 730 and the angle referenced to the axis of the background object 520 of the external environment may be established only by the relative relationship therebetween instead of being established only by another reference such as the direction of terrestrial magnetism, the direction of gravity, and the axis based on the latitude and the longitude of the earth.

Figure 3:
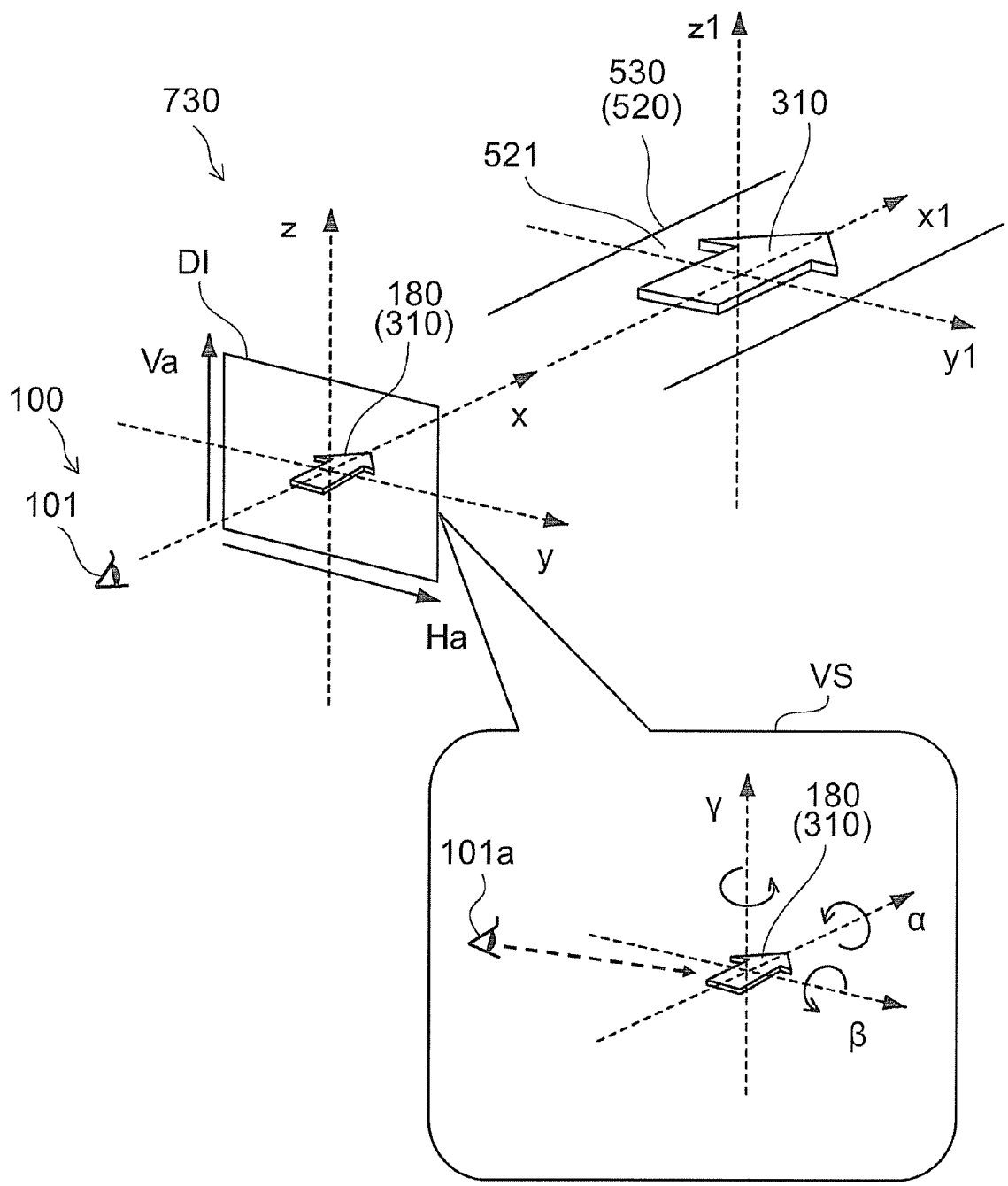
FIG. 3 is a schematic view illustrating a coordinate system of the automotive display system according to the first embodiment.

FIG. 3 is a schematic view illustrating a coordinate system of the automotive display system according to the first embodiment of the invention.

As illustrated in FIG. 3, a direction from the rear toward the front of the vehicle 730 in which the automotive display system 10 according to this embodiment is mounted is taken as an x axis. A direction from the left toward the right of the vehicle 730 is taken as a y axis. A direction perpendicular to the x axis and the y axis is taken as a z axis. When the vehicle 730 is traveling, parked, or stopped on a flat and horizontal surface, the x-y plane is the horizontal surface and the z axis is the direction of gravity, that is, the direction parallel to the vertical direction. When the vehicle 730 is traveling straight on a flat, horizontal surface, the travel direction of the vehicle 730 is the direction of the x axis.

The image plane of an image DI of the automotive display system 10 is assumed to be in the y-z plane for convenience. That is, although the light flux 112 emerges from the image projection unit 115, is incident on the windshield 710 of the vehicle 730, is reflected by the windshield 710, and is projected onto the one eye 101 of the image viewer 100 in the automotive display system 10 as described above, generally, the windshield 710 is slanted from the x axis recited above. Therefore, the windshield 710 is disposed at a prescribed angle with respect to the x axis. The image DI generally has a rectangular configuration. Although the configuration of the image DI may become, for example, a trapezoidal configuration when the light flux 112 is projected onto the windshield 710, the configuration of the image DI can be corrected to a rectangular configuration by adjusting the image data. When the image viewer 100 views the image DI reflected by the windshield 710, the perceived image DI is substantially a rectangle, and the projected image plane of the image DI is perceived as a plane perpendicular to the x axis. Therefore, the image plane of the image DI is assumed to be the y-z plane as recited above to simplify the description. In the image plane of the image DI, an axis parallel to the y axis is taken as a horizontal axis Ha, and an axis parallel to the z axis is taken as a vertical axis Va.

Inside a virtual space VS in the image DI, three orthogonal axes, for example, may be set as an a axis, a $\beta$ axis, and a $\gamma$ axis. The $\alpha$ axis, the $\beta$ axis, and the $\gamma$ axis may correspond to the x axis, the y axis, and the z axis recited above, respectively. In other words, the a axis may be taken as the travel direction of the vehicle 730.

A virtual visual point 101a (a visual point which is virtual), for example, may be set at any position in the virtual space VS. The position of the virtual visual point 101a in the virtual space VS may be set to the position of the one eye 101 of the image viewer 100 in real space. When the position of the one eye 101 of the image viewer 100 moves in real space, the position of the virtual visual point 101a in the virtual space VS also may be moved in response thereto.

On the other hand, the display object 180 (e.g., the arrow 310) is disposed in the virtual space VS in the image DI.

The display object 180 (e.g., the arrow 310) may be rotated at any angle in any direction in the virtual space VS. For example, the display object 180 (e.g., the arrow 310) may be rotated at any angle around at least one of the $\alpha$ axis, the $\beta$ axis, and the $\gamma$ axis to thereby point the display object 180 in any direction as viewed from the virtual visual point 101a. In other words, the angle of the display object 180 can be changed.

Namely, the angle of the display object 180 in the image DI may include at least one of a first rotation angle around a first direction (the $\alpha$ axis) corresponding to the direction from the rear toward the front of the vehicle 730, a second rotation angle around a second direction (the $\beta$ axis) corresponding to the left and right direction of the vehicle 730, and a third rotation angle around a third direction (the $\gamma$ axis) orthogonal to the first direction and the second direction in the virtual space VS in the image DI.

When the position of the virtual visual point 101a moves in the virtual space VS, the orientation (the angle) of the display object 180 changes in response thereto, and an image of the display object 180 as viewed from the position of the moved virtual visual point 101a is generated.

The distance between the virtual visual point 101a and the display object 180 also may be arbitrarily modified. For example, the size of the display object 180 decreases as the distance between the virtual visual point 101a and the display object 180 increases. Restated, the size of the display object 180 may be changed to suit the sense of distance to the display object 180 as viewed from the virtual visual point 101a.

Thus, at least one of the relative angle and the relative distance between the virtual visual point 101a and the display object 180 can be changed to any relative angle and/or relative distance, and it is possible to change the angle and the size of the display object 180 in the virtual space VS to correspond to the at least one of the relative angle and the relative distance. Such an operation can be realized using three dimensional computer graphics rendering.

Thereby, the configuration, the size, and the position of the image of the display object 180 in the two dimensional plane (the Va-Ha plane) in the image DI may be changed in response to the modification of the orientation angle and the size of the display object 180 in the virtual space VS. In other words, the angle of the display object 180 in the image DI is an angle corresponding to the configuration, the size, and the position of the display object 180 in the two dimensional image DI. By changing this angle, the display object 180 in the image DI appears to rotate and/or be at a different distance when viewed by the image viewer 100.

Although the virtual visual point 101a may be disposed at any position in the virtual space VS as recited above, hereinbelow for simplification, the case is described where the position of the one eye 101 of the image viewer 100 is fixed in real space, that is, the position of the virtual visual point 101a is fixed in the virtual space VS.

The arrow 310, i.e., the display object 180, is displayed in the image DI as recited above and viewed by the one eye 101 of the image viewer 100. The image viewer 100 simultaneously views the image DI including the display object 180 superimposed on the image of the background object 520, e.g., a road 530. The image viewer 100 perceives the arrow 310, i.e., the virtual image of the display object 180.

The display object 180 is disposed at the position in the image DI corresponding to a target position 521 of the background object 520 corresponding to the display object 180.

For example, the arrow 310, i.e., the display object 180, provides guidance for the travel direction at a branch point of a street, etc. At this time, the arrow 310, i.e., the display object 180, is displayed at a position in the image DI corresponding to the position of the branch point (the target position 521).

Thus, the position where the display object 180 is displayed in the image DI is taken as the position corresponding to the target position 521 of the background object 520. Thereby, the image viewer 100 can accurately ascertain the branch point, etc., indicated by the arrow 310 for guidance.

Here, the extension direction of the road 530 at the target position 521 for the background object 520 is taken as an x1 axis. A direction perpendicular to the x1 axis direction in a plane parallel to the surface of the road 530 is taken as a y1 axis. A direction perpendicular to the x1 axis and the y1 axis is taken as a z1 axis. For example, in the case where the road 530 at the target position 521 is flat and horizontal (without an uphill or downhill grade and without a slant in the left and right direction), the x1-y1 plane is parallel to a plane parallel to the surface of the road 530, and the x1 axis and the y1 axis are perpendicular to the direction of gravity, that is, the vertical direction. The z1 axis is a direction parallel to the direction of gravity, that is, the vertical direction.

For example, in the case where the road 530 has a constant road width and proceeds straight in a constant region, the x1 axis is the direction proceeding straight and the y1 axis is the road width direction. In the case where the road 530 curves, the direction tangent to the curve of the road 530 at the target position 521 is the extension direction of the road 530, and the x1 axis can be taken as the direction tangent to the road 530 at the target position 521. In such a case, the y1 axis can be taken as a direction perpendicular to the x1 axis in a plane parallel to the surface of the road 530. The x1 axis is the extension direction of the road 530 and the y1 axis is perpendicular to the x1 axis also when the width of the road 530 is changing.

In the case where the road 530 slants, for example, in a direction perpendicular to the extension direction, that is, slants in the left and right direction, the y1 axis is the slanting direction and the z1 axis slants, for example, away from the direction of gravity.

Thus, the x axis, the y axis, and the z axis recited above may be used as the axes of the vehicle 730. The x1 axis, the y1 axis, and the z1 axis recited above may be used as the axes of the background object 520 of the external environment. In particular, the x1 axis, the y1 axis, and the z1 axis at the target position 521 of the background object 520 of the external environment corresponding to the display object 180 to be displayed may be used.

In this specific example, it is assumed that the arrow 310 indicating the travel direction is disposed, for example, substantially parallel to the surface of the road 530. Thereby, the travel direction of the road 530 can be congruously and naturally perceived by using the arrow 310.

The axes (e.g., the x axis, the y axis, and the z axis) of the vehicle 730 change with changes of, for example, the slant of the topography where the vehicle 730 is located and the like. In other words, in the case where the location of the vehicle 730 slants uphill or downhill and/or slants left or right with respect to the travel direction of the vehicle 730, the axes of the vehicle 730 rotate around the y axis and/or the x axis. In the case where the vehicle 730 points, for example, in a direction left or right with respect to the travel direction, the axes of the vehicle 730 rotate around the z axis.

On the other hand, the axes (e.g., the x1 axis, the y1 axis, and the z1 axis) of the background object 520 of the external environment also change with the topography at the target position 521 of the display object 180 of the background of the external environment in the frontward path and the like. Specifically, the x1 axis, the y1 axis, and the z1 axis, that is, the axes of the background object 520 of the external environment, change with the topography of the road and/or the extension direction of the road at the target position 521.

The axis of the vehicle 730 and the axis of the background object 520 of the external environment change independently of each other. Although an incongruity occurs when the display object 180 is displayed in the image DI in such a state where these axes are mutually different, in the automotive display system 10 according to this embodiment, the difference between the axis of the vehicle 730 and the axis of the background object 520 of the external environment is corrected to change the angle of the display object 180 in the image DI. Therefore, the display object 180 can be perceived congruously and naturally. The change of the angle of the display object 180 in the image DI can be realized by, for example, three dimensional rendering of the display object 180 in the virtual space VS recited above.

First, the case will be described where the axes (e.g., the x axis, the y axis, and the z axis) of the vehicle 730 change while the axes (e.g., the x1 axis, the y1 axis, and the z1 axis) of the background object 520 of the external environment are constant, that is, the road 530 in the frontward background proceeds straight, the road 530 is horizontal left and right, and there is no uphill or downhill grade.

The changes of the x axis, the y axis, and the z axis of the vehicle 730 may be detected by the vehicle axis angle detection unit 402 of the angle information acquisition unit 401 provided in the automotive display system 10. For example, a rotation of the y axis and the z axis around the x axis corresponds to a change of the roll angle of the vehicle 730. A rotation of the x axis and the z axis around the y axis corresponds to a change of the pitch angle of the vehicle 730. A rotation of the x axis and the y axis around the z axis corresponds to a change of the yaw angle of the vehicle 730. Thus, the angle of the axis of the vehicle 730 may include at least one of the roll angle, the pitch angle, and the yaw angle of the vehicle 730.

The change of the roll angle, the pitch angle, and the yaw angle recited above may be detected by using, for example, various tilt sensors such as sensors detecting the change between the direction of terrestrial magnetism and the axis of the vehicle 730, liquid-based sensors, vertical pendulum sensors, and gyro sensors; and various acceleration sensors, angular velocity sensors, and angular acceleration sensors. In other words, the vehicle axis angle detection unit 402 may include at least one of a tilt sensor, an acceleration sensor, an angular velocity sensor, and an angular acceleration sensor. The tilt sensor recited above may include at least one of a terrestrial magnetism sensor, a liquid-based sensor, a pendulum sensor, and a gyro sensor.

First, the case where a change of the pitch angle of the vehicle 730 is corrected will be described.

Figure 4A:
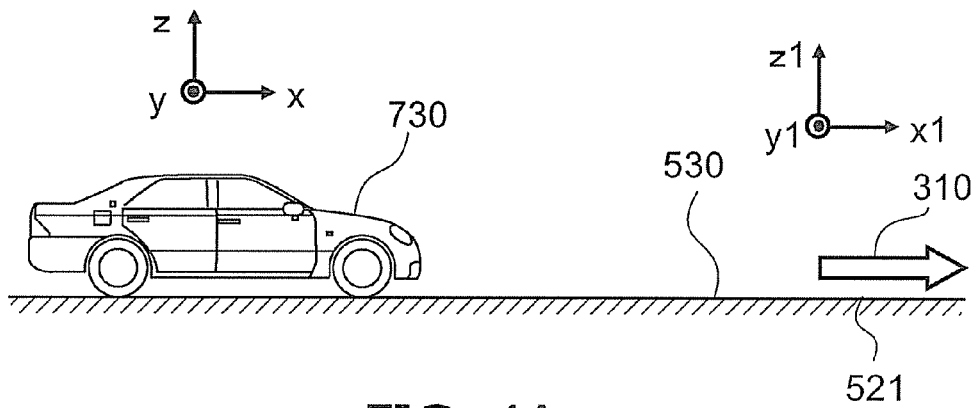
Figure 4B:
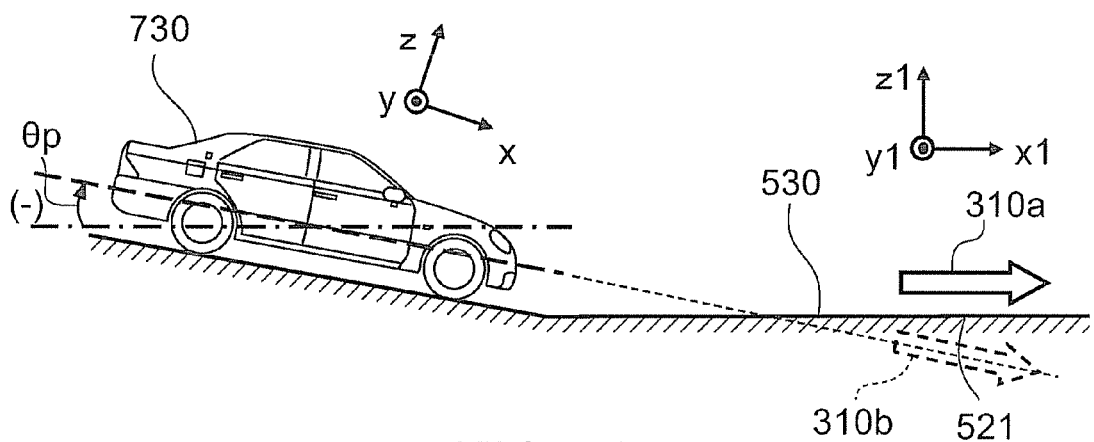
Figure 4C:
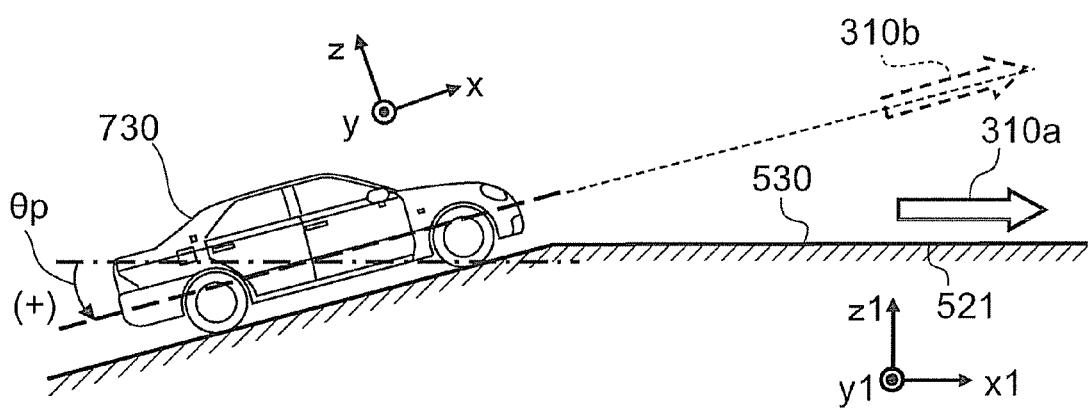

FIGS. 4A to 4C are schematic views illustrating states of the vehicle using the automotive display system according to the first embodiment of the invention.

Namely, FIGS. 4A to 4C illustrate three kinds of attitudes of the vehicle 730 in which the automotive display system 10 is mounted. The vehicle 730 and the road 530 are viewed from the side of the vehicle 730. In this example, the road 530 is horizontal in the left and right direction.

The location is horizontal where the vehicle 730 illustrated in FIG. 4A is traveling, parked, or stopped. The road 530 at the target position 521 corresponding to the arrow 310 also is horizontal. In such a case, the x axis, the y axis, and the z axis corresponding to the vehicle 730 are parallel to and have directions matched to the x1 axis, the y1 axis, and the z1 axis corresponding to the road 530 at the target position 521, respectively.

On the other hand, in the case where the location is downhill where the vehicle 730 is traveling, parked, or stopped as illustrated in FIG. 4B, the x axis and the z axis rotate around the y axis when referenced to the vertical direction. The angle of this rotation is taken as a pitch angle $\theta p$. In this example, the rotation is clockwise, and the pitch angle $\theta p$ is taken as negative. The pitch angle $\theta p$ is substantially equal to the angle of the grade of the hill at the location where the vehicle 730 is traveling, parked, or stopped.

In such a case as well, the road 530 at the target position 521 of the arrow 310 is horizontal. Therefore, the x axis and the z axis corresponding to the vehicle 730 are shifted from the x1 axis and the z1 axis corresponding to the frontward road 530 by the pitch angle $\theta p$.

In such a case, an uncorrected arrow 310b unnaturally appears to be buried in the road 530 if the display object 180 corresponding to the arrow 310 is disposed in the image DI without a correction. However, in the automotive display system 10 according to this embodiment described below, the display object 180 is rotated in the virtual space VS and generated in the image DI. Therefore, a corrected arrow 310a after the correction is perceived, and a congruous and natural image can be presented.

On the other hand, in the case where the location is uphill where the vehicle 730 is traveling, parked, or stopped as illustrated in FIG. 4C, the x axis and the z axis rotate counterclockwise around the y axis, and the pitch angle $\theta p$ is positive. In such a case as well, the pitch angle $\theta p$ is substantially equal to the angle of the grade of the hill at the location where the vehicle 730 is positioned.

In such a case as well, the road 530 at the target position 521 of the arrow 310 is horizontal. Therefore, the x axis and the z axis corresponding to the vehicle 730 are shifted from the x1 axis and the z1 axis corresponding to the frontward road 530 by the pitch angle $\theta p$.

In such a case, the uncorrected arrow 310b unnaturally appears to float in the air above the road 530 if the display object 180 corresponding to the arrow 310 is disposed in the image DI without a correction. However, in the automotive display system 10 according to this embodiment, the display object 180 is rotated in the virtual space VS and generated in the image DI. Therefore, the corrected arrow 310a after the correction is perceived, and a congruous and natural image can be presented.

FIGS. 5A to 5F are schematic views illustrating operations of the automotive display system according to the first embodiment of the invention.

Figure 5A:
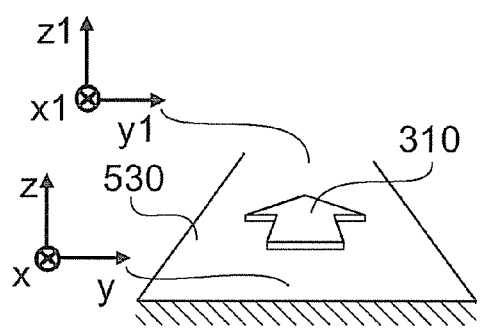
FIGS. 5A to 5F are schematic views illustrating operations of the automotive display system according to the first embodiment.
Figure 5D:
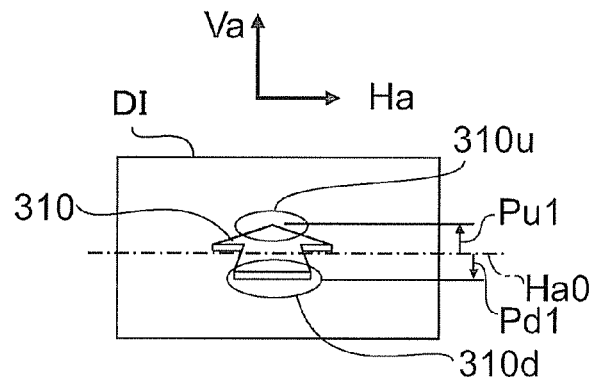
Figure 5B:
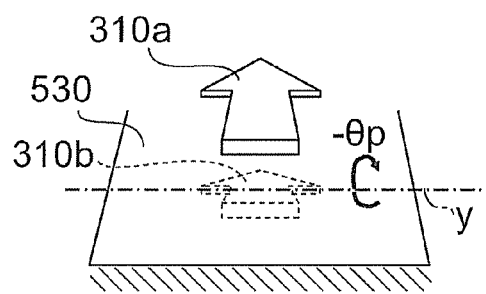
Figure 5E:
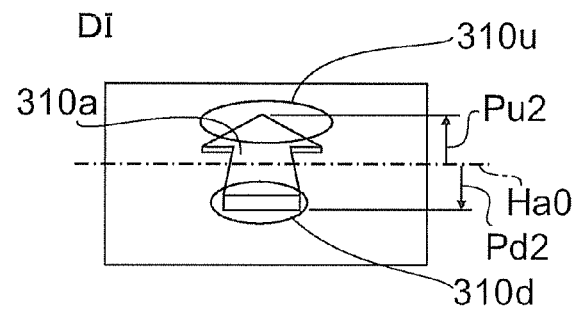
Figure 5C:
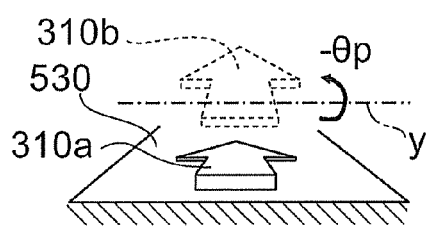
Figure 5F:
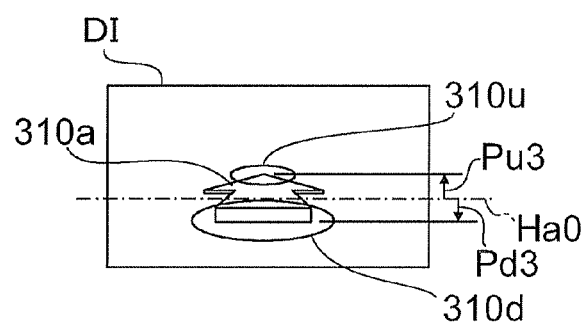

Namely, FIGS. 5A, 5B, and 5C illustrate the configurations of the arrow 310, i.e., the display object 180, the corrected arrow 310a, and the road 530 perceived by the image viewer 100 corresponding to the attitudes of the vehicle 730 illustrated in FIGS. 4A, 4B, and 4C, respectively. FIGS. 5D, 5E, and 5F illustrate the configurations of the arrow 310 and the corrected arrow 310a in the image DI corresponding to the attitudes of the vehicle 730 illustrated in FIGS. 4A, 4B, and 4C, respectively.

In the case where the vehicle 730 and the frontward road 530 are both horizontal as illustrated in FIG. 5A, the axes (the x axis, the y axis, and the z axis) of the vehicle 730 are parallel to and have directions matched to the axes (the x1 axis, the y1 axis, and the z1 axis) at the target position 521 of the frontward road 530, respectively.

In such a case, for example, the orientation of the display object 180 in the virtual space VS and the configuration, the size, and the position of the display object 180 in the image DI do not need to be corrected.

For example, the end of an upper portion 310u of the arrow 310 in the image DI illustrated in FIG. 5D is assumed to be positioned a distance Pu1 from a reference axis Ha0 of the horizontal axis Ha of the image DI. The end of a lower portion 310d of the arrow 310 is assumed to be positioned a distance Pd1 from the reference axis Ha0 of the horizontal axis Ha of the image DI. The displayed size of the upper portion 310u of the arrow 310 is relatively smaller than the displayed size of the lower portion 310d. In other words, the upper portion 310u is disposed more distal along the frontward road 530 than the lower portion 310d. Therefore, the sizes of the upper portion 310u and the lower portion 310d of the arrow 310 are changed according to sizes corresponding to the sense of perspective thereof. Thereby, the arrow 310 is perceived by the image viewer 100 to follow the surface of the road 530 at the target position 521, and a naturally viewable image is presented to the image viewer 100.

Thus, in the case where the axes (the x axis, the y axis, and the z axis) of the vehicle 730 match the axes (the x1 axis, the y1 axis, and the z1 axis) at the target position 521 of the frontward road 530, respectively, the arrow 310 is disposed and perceived to be parallel to the road 530 at the target position 521 of the frontward road 530 and appears naturally even without performing correction processing on the configuration, the size, and the position of the display object 180 in the image DI.

On the other hand, in the case where the vehicle 730 is pointing downhill and the road 530 at the target position 521 is horizontal as illustrated in FIG. 5B, the frontward road relatively appears uphill when the image viewer 100 is taken as the reference. In such a case, the uncorrected arrow 310b prior to correcting the image of the arrow 310 in the image DI is perceived to lie in the direction parallel to the x axis as viewed from the image viewer 100 (i.e., below the surface of the frontward road 530) and as a result unnaturally appears to be buried in the road 530.

Conversely, in the automotive display system 10 according to this embodiment, the arrow 310, i.e., the display object 180, is rotated in the virtual space VS based on the relative difference of angles between the axis of the vehicle 730 and the axis of the frontward road 530 at the target position 521.

In this embodiment, the orientation of the corrected arrow 310a is rotated from the direction parallel to the x axis to a direction parallel to the x1 axis of the frontward road 530 at the target position 521. In other words, when the vehicle 730 tilts at the pitch angle θp downward (in the negative direction), the arrow 310, i.e., the display object 180, is rotated in the virtual space VS an angle having the same magnitude as the pitch angle θp in the reverse direction (the positive direction).

As a result, in the image DI illustrated in FIG. 5E, the end of the upper portion 310u of the corrected arrow 310a is positioned a distance Pu2 from the reference axis Ha0 of the horizontal axis Ha of the image DI, and the end of the lower portion 310d of the corrected arrow 310a is positioned a distance Pd2 from the reference axis Ha0 of the horizontal axis Ha of the image DI. The distance Pu2 is longer than the distance Pu1, and the distance Pd2 is longer than the distance Pd1. In other words, the length of the corrected arrow 310a in the vertical axis Va direction is longer than the length of the arrow 310 in the vertical axis Va direction prior to the correction.

Although the displayed size of the upper portion 310u of the arrow 310 is relatively smaller than the displayed size of the lower portion 310d in such a case as well, the ratio thereof is lower than that of the case illustrated in FIG. 5D. In other words, the displayed size of the upper portion 310u is closer to the displayed size of the lower portion 310d compared to those illustrated in FIG. 5D. In other words, compared to the case illustrated in FIG. 5D, the sizes of the upper portion 310u and the lower portion 310d of the arrow 310 illustrated in FIG. 5E are modified according to the sizes corresponding to a sense of perspective such that the tip of the arrow 310 is relatively more proximal on the front side to the image viewer 100.

Thus, the arrow 310 is rotated in the virtual space VS. As a result, at least one of the length of the arrow 310 in the vertical axis Va direction and the ratio of the sizes of the upper portion 310u and the lower portion 310d are changed in the image DI. Thereby, the corrected arrow 310a is perceived by the image viewer 100 to follow the surface of the road 530 at the target position 521, and a naturally viewable image is presented to the image viewer 100.

In the case where the vehicle 730 is pointing uphill and the road 530 at the target position 521 is horizontal as illustrated in FIG. 5C, the frontward road 530 relatively appears to be downhill when the image viewer 100 is taken as the reference. In such a case, the uncorrected arrow 310b prior to correcting the image of the arrow 310 in the image DI is perceived to lie in the direction parallel to the x axis as viewed from the image viewer 100 (i.e., above the frontward road 530) and as a result unnaturally appears to float in the air above the surface of the road 530.

Conversely, in the automotive display system 10 according to this embodiment, the arrow 310, i.e., the display object 180, is rotated in the virtual space VS based on the relative difference of angles between the axis of the vehicle 730 and the axis of the frontward road 530 at the target position 521.

In this embodiment, the orientation of the corrected arrow 310a is rotated from the direction parallel to the x axis to a direction parallel to the x1 axis of the frontward road 530 at the target position 521. In other words, when the vehicle 730 tilts at the pitch angle θp upward (in the positive direction), the arrow 310, i.e., the display object 180, is rotated an angle having the same magnitude as the pitch angle θp in the reverse direction (the negative direction) in the image DI.

As a result, in the image DI illustrated in FIG. 5F, the end of the upper portion 310u of the corrected arrow 310a is positioned a distance Pu3 from the reference axis Ha0 of the horizontal axis Ha of the image DI, and the end of the lower portion 310d of the corrected arrow 310a is positioned a distance Pd3 from the reference axis Ha0 of the horizontal axis Ha of the image DI. The distance Pu3 is shorter than the distance Pu1, and the distance Pd3 is shorter than the distance Pd1. In other words, the length of the corrected arrow 310a in the vertical axis Va direction is shorter than the length of the arrow 310 in the vertical axis Va direction prior to the correction.

Although the displayed size of the upper portion 310u of the arrow 310 is relatively smaller than the displayed size of the lower portion 310d in such a case as well, the ratio thereof is higher than that of the case illustrated in FIG. 5D. In other words, the displayed size of the upper portion 310u is smaller than the displayed size of the lower portion 310d to a greater degree than those illustrated in FIG. 5D. In other words, compared to the case illustrated in FIG. 5D, the sizes of the upper portion 310u and the lower portion 310d of the arrow 310 illustrated in FIG. 5F are modified according to the sizes corresponding to a sense of perspective such that the tip of the arrow 310 is relatively more distal depthward to the image viewer 100.

Thus, the arrow 310 is rotated in the virtual space VS. As a result, at least one of the length of the arrow 310 in the vertical axis Va direction and the ratio of the sizes of the upper portion 310u and the lower portion 310d are changed in the image DI. Thereby, the corrected arrow 310a is perceived by the image viewer 100 to follow the surface of the road 530 at the target position 521, and a naturally viewable image is presented to the image viewer 100.

In the examples of the images illustrated in FIGS. 5D, 5E, and 5F, the position of the arrow 310 in the image DI also is changed. In other words, the position of the corrected arrow 310a illustrated in FIG. 5E is corrected upward in the image DI from the position of the arrow 310 illustrated in FIG. 5D. Thereby, the corrected arrow 310a is disposed at the prescribed position above the road 530. On the other hand, the position of the corrected arrow 310a illustrated in FIG. 5F is corrected downward in the image DI from the position of the arrow 310 illustrated in FIG. 5D. Thereby, the corrected arrow 310a is disposed at the prescribed position above the road 530. Thus, rotating the display object 180, that is, changing the angle thereof, in the virtual space VS may be accompanied by changing the position of the display object 180 in the virtual space VS.

Although the images of the arrow 310 and the corrected arrow 310a (the display object 180) in the image DI illustrated in FIGS. 5D, 5E, and 5F recited above may be obtained by a three dimensional rendering operation of the arrow 310 (the display object 180) in the virtual space VS, the invention is not limited thereto. Namely, an operation corresponding to a rotation of the display object 180 in the virtual space VS can also be realized by changing the at least one of the configuration, the size, and the position of the image of the display object 180 in the image DI. In other words, the arrow 310 can be perceived to rotate as illustrated in FIGS. 5D, 5E, and 5F by, for example, correcting at least one of the length in the vertical axis Va direction, the ratio of the sizes of the upper portion 310u and the lower portion 310d, and the position of the arrow 310. As described below, the correction of the at least one of the length in the vertical axis Va direction, the ratio of the sizes of the upper portion 310u and the lower portion 310d, and the position of the arrow 310 may be performed by pre-storing data of various configurations of the arrow 310 corresponding to various angles and generating configurations of the arrow 310 corresponding to the necessary angle by interpolating from the data.

The state of the rotation of the display object 180 in the virtual space VS and the configuration of the image of the display object 180 in the image DI is described hereinbelow. In these descriptions, the image of the display object 180 in the two dimensional image DI may be obtained not only by an operation of data in the virtual space VS, but also by an operation of data in the two dimensional image DI as recited above.

The case where the change of the roll angle of the vehicle 730 is corrected will now be described.

Figure 6A:
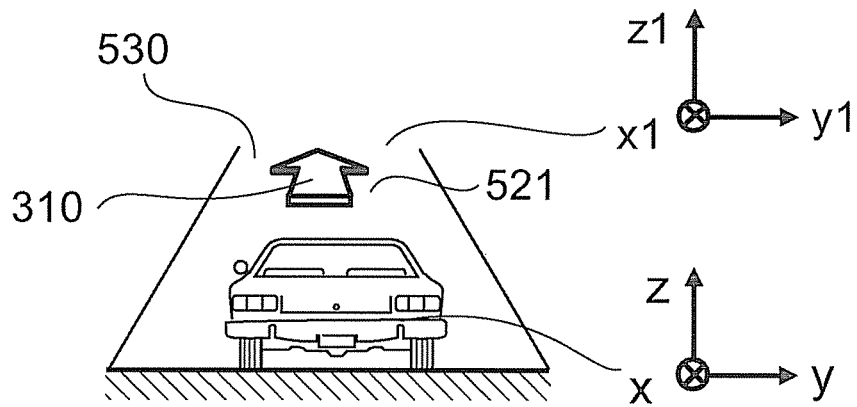
FIGS. 6A to 6C are schematic views illustrating other states of the vehicle using the automotive display system according to the first embodiment.
Figure 6B:
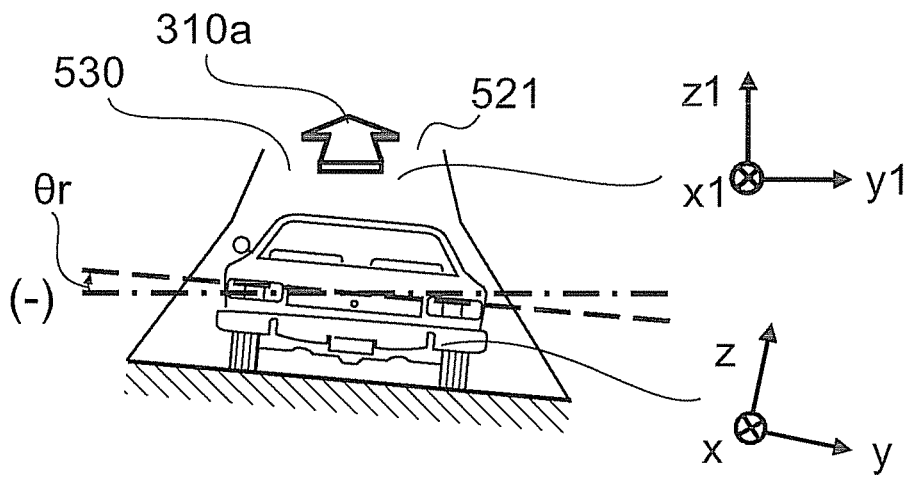
Figure 6C:
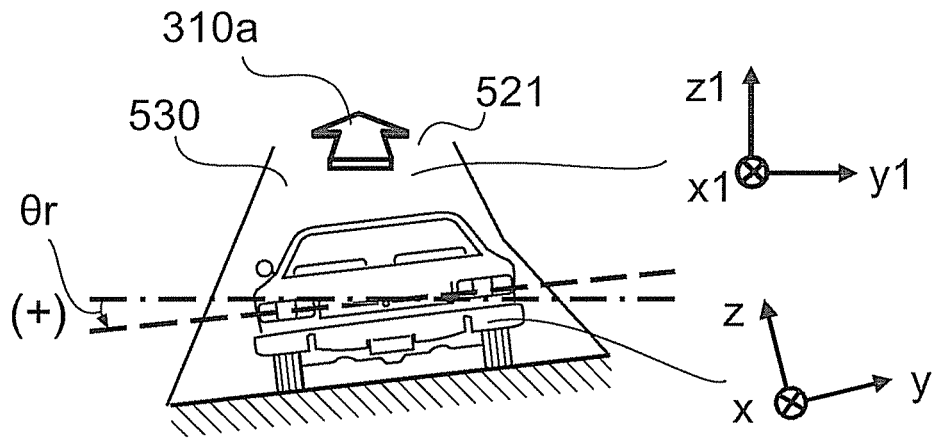

FIGS. 6A to 6C are schematic views illustrating other states of the vehicle using the automotive display system according to the first embodiment of the invention.

Namely, FIGS. 6A to 6C illustrate three kinds of attitudes of the vehicle 730 in which the automotive display system 10 is mounted. The vehicle 730 and the road 530 are viewed from the rear of the vehicle 730. In this example, there is no slant (e.g., uphill or downhill) relating to the travel direction of the road 530, and the road 530 at the target position 521 of the arrow 310 is horizontal in the left and right direction.

The location where the vehicle 730 is traveling, parked, or stopped illustrated in FIG. 6A is horizontal in the left and right direction. In the case where the road 530 at the target position 521 corresponding to the arrow 310 also is horizontal in the left and right direction, the x axis, the y axis, and the z axis corresponding to the vehicle 730 are parallel to and have directions matched to the x1 axis, the y1 axis, and the z1 axis corresponding to the frontward road 530, respectively.

On the other hand, in the case where the right side of the location where the vehicle 730 is traveling, parked, or stopped is lower than the left side as illustrated in FIG. 6B, the y axis and the z axis rotate around the x axis. The angle of this rotation is taken as a roll angle θr. In this example, the rotation is clockwise, and the roll angle θr is taken as negative.

In the case where the left side of the location where the vehicle 730 is traveling, parked, or stopped is lower than the right side as illustrated in FIG. 6C, the y axis and the z axis rotate around the x axis. In this example, the rotation is counterclockwise, and the roll angle θr is taken as positive.

In the cases illustrated in FIGS. 6B and 6C as well, the road 530 at the target position 521 of the arrow 310 is horizontal in the left and right direction. Therefore, the y axis and the z axis corresponding to the vehicle 730 and the y1 axis and the z1 axis corresponding to the frontward road 530 are shifted by the roll angle θr.

In such a case, the uncorrected arrow 310b (not illustrated) unnaturally appears to be tilted with respect to the surface of the road 530 if the display object 180 corresponding to the arrow 310 is disposed in the image DI without a correction. However, in the automotive display system 10 according to this embodiment described below, the display object 180 is rotated in the virtual space VS and generated in the image DI. Therefore, the corrected arrow 310a is perceived, and a congruous and natural image can be presented.

FIGS. 7A to 7F are schematic views illustrating other operations of the automotive display system according to the first embodiment of the invention.

Figure 7A:
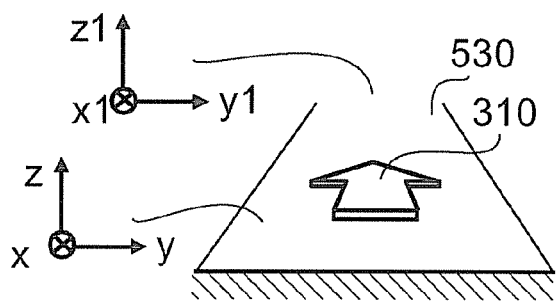
FIGS. 7A to 7F are schematic views illustrating other operations of the automotive display system according to the first embodiment.
Figure 7D:
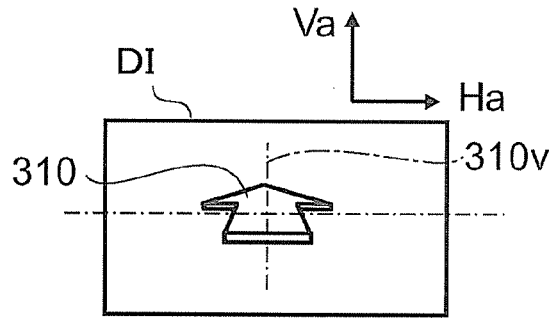
Figure 7B:
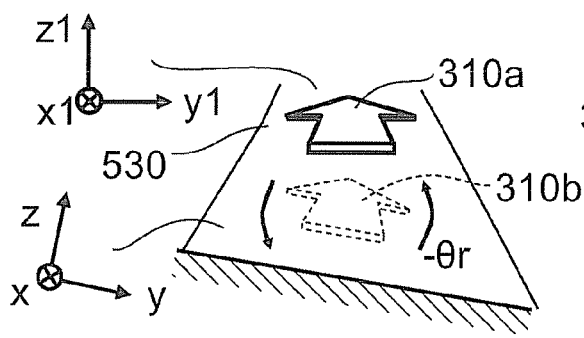
Figure 7E:
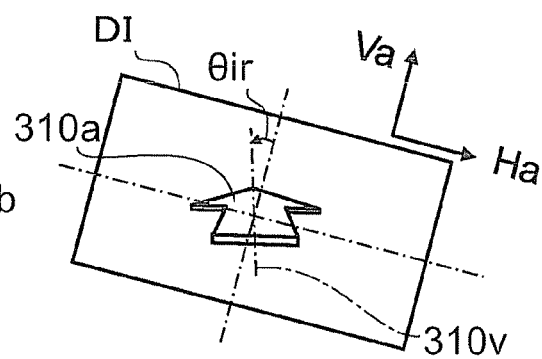
Figure 7C:
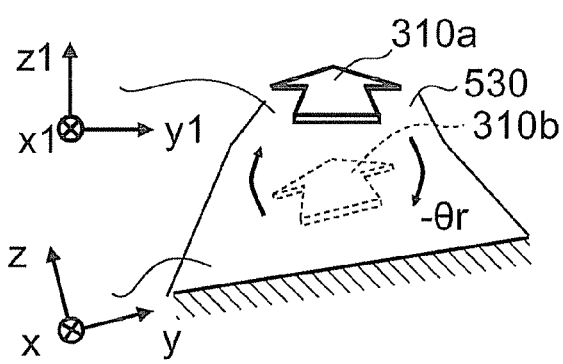
Figure 7F:
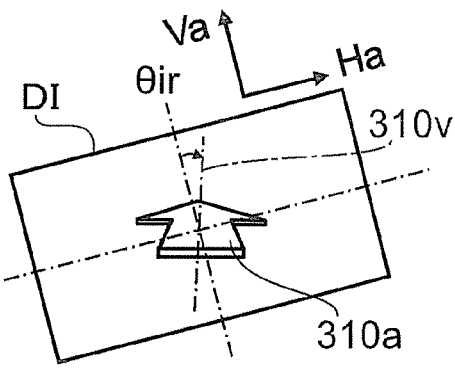

Namely, FIGS. 7A, 7B, and 7C illustrate the configurations of the arrow 310, i.e., the display object 180, the corrected arrow 310a, and the road 530 perceived by the image viewer 100 corresponding to the attitudes of the vehicle 730 illustrated in FIGS. 6A, 6B, and 6C, respectively. FIGS. 7D, 7E, and 7F illustrate the configurations of the arrow 310 and the corrected arrow 310a in the image DI corresponding to the attitudes of the vehicle 730 illustrated in FIGS. 6A, 6B, and 6C, respectively.

In the case where the vehicle 730 and the frontward road 530 are both horizontal in the left and right direction as illustrated in FIG. 7A, the axes (the x axis, the y axis, and the z axis) of the vehicle 730 are parallel to and have directions matched to the axes (the x1 axis, the y1 axis, and the z1 axis) at the target position 521 of the frontward road 530, respectively.

In such a case, for example, the orientation of the display object 180 in the virtual space VS and the configuration, the size, and the position of the display object 180 in the image DI do not need to be corrected.

For example, an axis 310v of the arrow 310 in the image DI illustrated in FIG. 7D is parallel to the vertical axis Va of the image DI. In such a case as well, the displayed size of the upper portion 310u of the arrow 310 is relatively smaller than the displayed size of the lower portion 310d to correspond to the sense of perspective thereof. Thereby, the arrow 310 is perceived by the image viewer 100 to follow the surface of the road 530 at the target position 521, and a naturally viewable image is presented to the image viewer 100.

On the other hand, in the case where the vehicle 730 is on a slanted surface where the right side thereof is lower than the left side and the road 530 at the target position 521 is horizontal left and right as illustrated in FIG. 7B, the frontward road 530 relatively appears to correspond to a slanted surface where the left side thereof is lower than the right side when the image viewer 100 is taken as the reference. In such a case, the uncorrected arrow 310b prior to correcting the image of the arrow 310 in the image DI is perceived to be parallel to the y axis as viewed from the image viewer 100 (i.e., the axis slanted in the left and right direction) and unnaturally appears to be different from the y1 axis of the frontward road 530 in the left and right direction.

Conversely, in the automotive display system 10 according to this embodiment, the arrow 310, i.e., the display object 180, is rotated in the virtual space VS based on the relative difference of angles between the axis of the vehicle 730 and the axis of the frontward road 530 at the target position 521.

In this embodiment, the orientation of the corrected arrow 310a is rotated from the direction parallel to the y axis (i.e., the axis slanted in the left and right direction) to a direction parallel to the y1 axis (i.e., the axis horizontal left and right) of the frontward road 530 at the target position 521. In other words, when the vehicle 730 tilts at the roll angle θr with the right side down (in the negative direction), the arrow 310, i.e., the display object 180, is rotated an angle having the same magnitude as the roll angle θr in the reverse direction in the image DI.

As a result, in the image DI illustrated in FIG. 7E, the axis 310v of the corrected arrow 310a is rotated a roll correction angle θir with respect to the vertical axis Va of the image DI. The roll correction angle θir is, for example, an angle having the same magnitude as the roll angle θr of the vehicle 730 in the reverse direction (the positive direction). In other words, the corrected arrow 310a is rotated the same angle as the roll angle θr in the reverse direction. For better clarity in FIGS. 7A to 7F, the image DI is rotated only the roll angle θr with respect to the page surface of the drawings.

Thus, the axis 310v of the corrected arrow 310a is perceived by the image viewer 100 to follow the surface of the road 530 at the target position 521 by rotating and correcting the axis 310v of the corrected arrow 310a in the image DI, and a naturally viewable image of the corrected arrow 310a can be presented to the image viewer 100.

Also in the case where the vehicle 730 is on a slanted surface where the left side thereof is lower than the right side and the frontward road 530 at the target position 521 is horizontal left and right as illustrated in FIG. 7C, the arrow 310, i.e., the display object 180, is rotated in the virtual space VS based on the relative difference of angles between the axis of the vehicle 730 and the axis of the frontward road 530 at the target position 521.

In other words, in this embodiment, when the vehicle 730 tilts at the roll angle θr with the left side down (in the positive direction), the arrow 310, i.e., the display object 180, is rotated an angle having the same magnitude as the roll angle θr in the reverse direction in the image DI.

As a result, in the image DI illustrated in FIG. 7F, the axis 310v of the corrected arrow 310a in rotated the roll correction angle air with respect to the vertical axis Va of the image DI. The roll correction angle θir is, for example, an angle having the same magnitude as the roll angle θr of the vehicle 730 in the reverse direction (the negative direction). In other words, the corrected arrow 310a is corrected by rotating the same angle as the roll angle θr in the reverse direction. For better clarity in FIGS. 7A to 7F, the image DI is rotated only the roll angle θr with respect to the page surface of the drawings.

Thus, the axis 310v of the corrected arrow 310a is perceived by the image viewer 100 to follow the surface of the road 530 at the target position 521 by rotating and correcting the axis 310v of the corrected arrow 310a in the image DI, and a naturally viewable image is presented to the image viewer 100.

The case where the change of the yaw angle of the vehicle 730 is corrected will now be described.

Figure 8A:
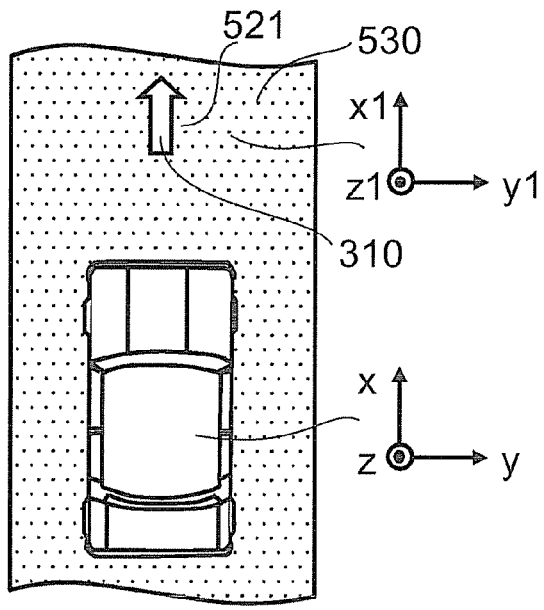
FIGS. 8A to 8C are schematic views illustrating other states of the vehicle using the automotive display system according to the first embodiment.
Figure 8B:
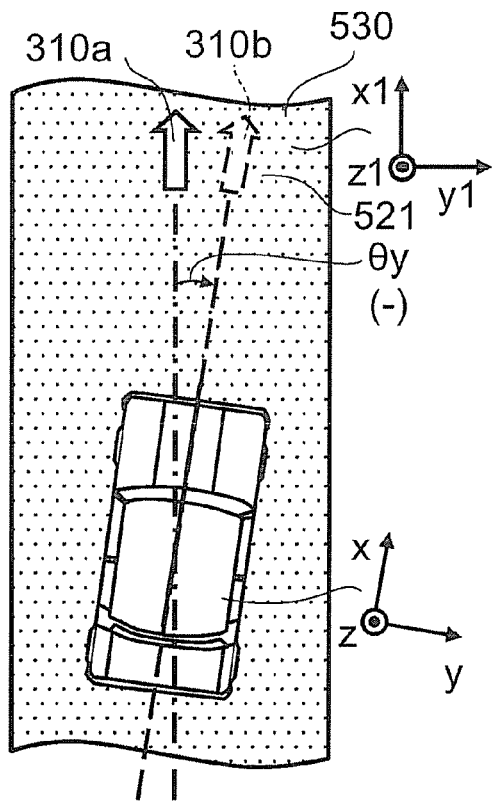
Figure 8C:
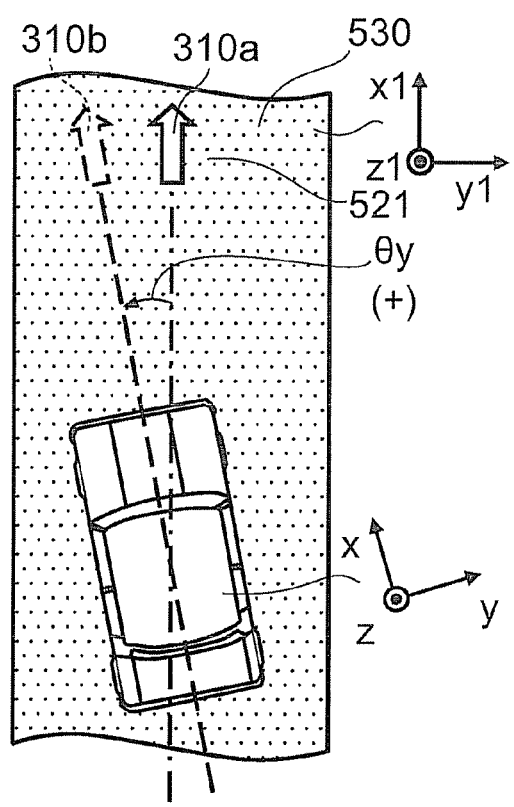

FIGS. 8A to 8C are schematic views illustrating other states of the vehicle using the automotive display system according to the first embodiment of the invention.

Namely, FIGS. 8A to 8C illustrate three kinds of directions of the vehicle 730 in which the automotive display system 10 is mounted. The vehicle 730 and the road 530 are viewed from above the vehicle 730. In this example, it is assumed that there is no slant relating to the travel direction of the road 530 (uphill or downhill), there is no slant relating to the left and right direction, the road 530 is horizontal, the road 530 is substantially a straight line extending in one direction, and the width of the road 530 also is constant.

In the case where the vehicle 730 points in the direction parallel to the extension direction of the road 530 as illustrated in FIG. 8A, the x axis, the y axis, and the z axis corresponding to the vehicle 730 are parallel to and have directions matched to the x1 axis, the y1 axis, and the z1 axis corresponding to the frontward road 530, respectively.

On the other hand, in the case where the vehicle 730 points rightward of the extension direction of the road 530 (in the clockwise direction as viewed from above) as illustrated in FIG. 8B, the x axis and the y axis rotate around the z axis. The angle of this rotation is taken as a yaw angle θy. In this example, the rotation is clockwise, and the yaw angle θy is taken as negative.

In the case where the vehicle 730 points leftward of the extension direction of the road 530 (in the counterclockwise direction as viewed from above) as illustrated in FIG. 8C, the x axis and the y axis rotate around the z axis. The angle of this rotation is taken as a positive yaw angle θy.

In the cases of FIGS. 8B and 8C as well, the road 530 proceeds straight at the target position 521 corresponding to the arrow 310, i.e., the display object 180, frontward of the vehicle 730. The x axis and the y axis corresponding to the vehicle 730 are shifted from the x1 axis and the y1 axis corresponding to the frontward road 530 by the yaw angle θy.

In such cases, the uncorrected arrow 310b unnaturally appears to be shifted from the extension direction of the road 530 if the orientation of the display object 180 corresponding to the arrow 310 is not corrected in the virtual space VS. However, in the automotive display system 10 according to this embodiment, the display object 180 is rotated in the virtual space VS and generated in the image DI as described below. Therefore, the corrected arrow 310a after the correction is perceived, and a congruous and natural image can be presented.

FIGS. 9A to 9F are schematic views illustrating other operations of the automotive display system according to the first embodiment of the invention.

Figure 9A:
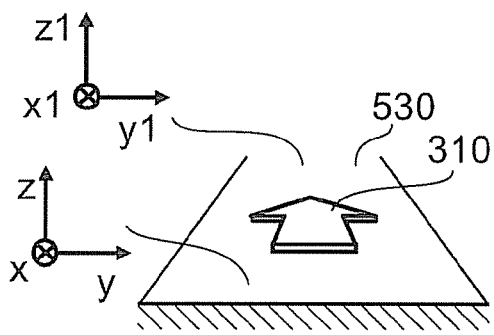
FIGS. 9A to 9F are schematic views illustrating other operations of the automotive display system according to the first embodiment.
Figure 9D:
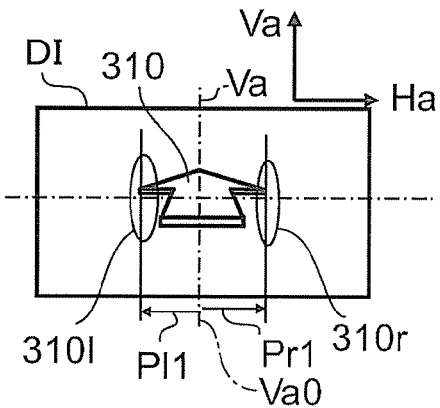
Figure 9B:
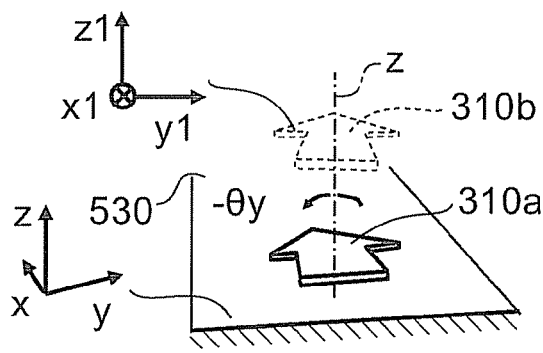
Figure 9E:
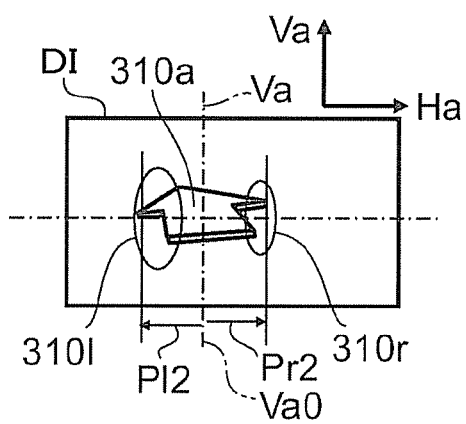
Figure 9C:
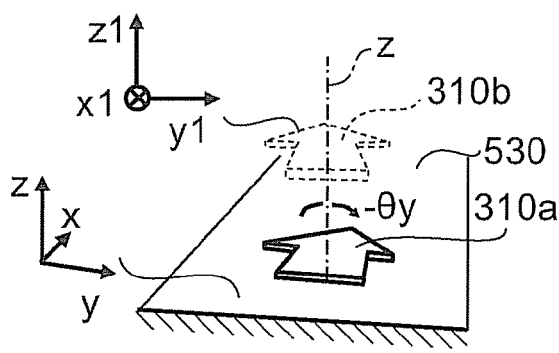
Figure 9F:
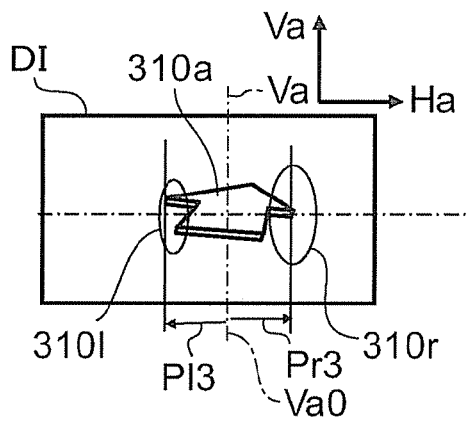

Namely, FIGS. 9A, 9B, and 9C illustrate the configurations of the arrow 310, i.e., the display object 180, the corrected arrow 310a, and the road 530 perceived by the image viewer 100 corresponding to the directions of the vehicle 730 illustrated in FIGS. 8A, 8B, and 8C, respectively. FIGS. 9D, 9E, and 9F illustrate the configurations of the arrow 310 and the corrected arrow 310a in the image DI corresponding to the directions of the vehicle 730 illustrated in FIGS. 8A, 8B, and 8C, respectively.

In the case where the road 530 proceeds straight and the vehicle 730 points in a direction parallel to the extension direction of the road 530 as illustrated in FIG. 9A, the axes (the x axis, the y axis, and the z axis) of the vehicle 730 are parallel to and have directions matched to the axes (the x1 axis, the y1 axis, and the z1 axis) at the target position 521 of the frontward road 530, respectively.

In such a case, for example, the orientation of the display object 180 in the virtual space VS and the configuration, the size, and the position of the display object 180 in the image DI do not need to be corrected.

For example, the end of a leftward portion 310l of the arrow 310 in the image DI illustrated in FIG. 9D is assumed to be positioned a distance Pl1 from a reference axis Va0 of the vertical axis Va of the image DI. The end of a rightward portion 310r of the arrow 310 is assumed to be positioned a distance Pr1 from the reference axis Va0 of the vertical axis Va of the image DI. The distance Pl1 and the distance Pr1 are substantially equal to each other. The displayed size of the leftward portion 310l of the arrow 310 is substantially equal to the displayed size of the rightward portion 310r. Thereby, the orientation of the arrow 310 is perceived to be in a direction parallel to the extension direction of the road 530, and a naturally viewable image is presented to the image viewer 100.

On the other hand, in the case where the vehicle 730 is pointing rightward as illustrated in FIG. 9B, the frontward road 530 relatively appears to rotate to the left when the image viewer 100 is taken as the reference. In such a case, the uncorrected arrow 310b prior to correcting the image of the arrow 310 in the image DI is perceived to lie in the direction parallel to the x axis as viewed from the image viewer 100 and as a result unnaturally appears to be shifted from the extension direction (the x1 axis direction) of the road 530.

Conversely, in the automotive display system 10 according to this embodiment, the arrow 310, i.e., the display object 180, is rotated in the virtual space VS based on the relative difference of angles between the axis of the vehicle 730 and the axis of the frontward road 530 at the target position 521.

In this embodiment, the orientation of the corrected arrow 310a is rotated from the direction parallel to the x axis to the extension direction (the x1 axis direction) of the road 530 at the target position 521. In other words, when the vehicle 730 points at the yaw angle θy rightward (the negative direction), the arrow 310, i.e., the display object 180, is corrected an angle having the same magnitude as the yaw angle θy in the reverse direction (the positive direction) in the image DI.

As a result, for example, as illustrated in FIG. 9E, the displayed size of the leftward portion 310*l* of the corrected arrow 310*a* is relatively larger than the displayed size of the rightward portion 310*r*. Thereby, the leftward portion 310*l* of the corrected arrow 310*a* relatively appears to be positioned more proximal on front side than the rightward portion 310*r* to the image viewer 100. In other words, the sizes of the leftward portion 310*l* and the rightward portion 310*r* of the arrow 310 are modified according to the sizes corresponding to the sense of perspective.

In such a case, the position of the corrected arrow 310*a* in the image DI is moved leftward from the position prior to the correction.

In the image DI, the end of the leftward portion 310*l* of the corrected arrow 310*a* is positioned a distance Pl2 from the reference axis Va0 of the vertical axis Va of the image DI, and the end of the rightward portion 310*r* of the corrected arrow 310*a* is positioned a distance Pr2 from the reference axis Va0 of the vertical axis Va of the image DI. The distance Pl2 with respect to the distance Pl1 and the distance Pr2 with respect to the distance Pr1, that is, the length of the corrected arrow 310*a* in the left and right direction, may be changed corresponding to the rotation of the arrow 310 in the image DI. In other words, the length of the corrected arrow 310*a* in the left and right direction may be corrected by the ratio in the axis direction and the width direction of the arrow 310 and the magnitude of the yaw angle θy.

Thus, the arrow 310 is corrected by correcting at least one of the ratio of the sizes of the leftward portion 310*l* and the lower portion 310*r*, the position in the image DI, and the length in the horizontal axis Ha direction. Thereby, the corrected arrow 310*a* is perceived by the image viewer 100 to follow the extension direction of the road 530 at the target position 521, and a naturally viewable image is presented to the image viewer 100.

In the case where the vehicle 730 points leftward as illustrated in FIG. 9C, the frontward road 530 relatively appears to rotate to the right when the image viewer 100 is taken as the reference. In such a case, the uncorrected arrow 310*b* prior to correcting the image of the arrow 310 in the image DI is perceived to lie in the direction parallel to the x axis as viewed from the image viewer 100 and as a result unnaturally appears to be shifted from the extension direction (the x1 axis direction) of the road 530.

Conversely, in the automotive display system 10 according to this embodiment, the arrow 310, i.e., the display object 180, is rotated in the virtual space VS based on the relative difference of angles between the axis of the vehicle 730 and the axis of the frontward road 530 at the target position 521.

In this embodiment, the vehicle 730 points at the yaw angle θy leftward (the positive direction) and the arrow 310, i.e., the display object 180, is corrected an angle having the same magnitude as the yaw angle θy in the reverse direction (the negative direction) in the image DI.

As a result, in the image DI illustrated in FIG. 9F, the displayed size of the leftward portion 310*l* of the corrected arrow 310*a* is relatively smaller than the displayed size of the rightward portion 310*r*. Thereby, the leftward portion 310*l* of the corrected arrow 310*a* relatively appears more distal depthward than the rightward portion 310*r* to the image viewer 100. In other words, the sizes of the leftward portion 310*l* and the rightward portion 310*r* of the arrow 310 are modified according to the sizes corresponding to the sense of perspective.

In such a case, the position of the corrected arrow 310*a* in the image DI is moved rightward from the position prior to the correction.

In the image DI in such a case, the end of the leftward portion 310*l* of the corrected arrow 310*a* is positioned a distance Pl3 from the reference axis Va0 of the vertical axis Va of the image DI, and the end of the rightward portion 310*r* of the corrected arrow 310*a* is positioned a distance Pr3 from the reference axis Va0 of the vertical axis Va of the image DI. The distance Pl3 with respect to the distance Pl1 and the distance Pr3 with respect to the distance Pr1, that is, the length of the corrected arrow 310*a* in the left and right direction, may be changed corresponding to the rotation of the arrow 310 in the image DI. In other words, the length of the corrected arrow 310*a* in the left and right direction may be corrected by the ratio in the axis direction and the width direction of the arrow 310 and the magnitude of the yaw angle θy.

Thus, the arrow 310 is corrected by correcting at least one of the ratio of the sizes of the leftward portion 310*l* and the lower portion 310*r*, the position in the image DI, and the length in the horizontal axis Ha direction. Thereby, the corrected arrow 310*a* is perceived by the image viewer 100 to follow the extension direction of the road 530 at the target position 521, and a naturally viewable image is presented to the image viewer 100.

Thus, in the automotive display system 10 according to this embodiment, the angle information acquisition unit 401 includes the vehicle axis angle detection unit 402 that detects the angle of the axis of the vehicle 730. Vehicle angle information relating to the angle of the axis of the vehicle 730 is thereby acquired. For example, the vehicle axis angle detection unit 402 detects at least one of the roll angle, the pitch angle, and the yaw angle of the vehicle 730. In other words, the vehicle angle information relating to the axis of the vehicle 730 includes at least one of the pitch angle, the roll angle, and the yaw angle.

These angles are corrected, for example, to correct and rotate (change the angle of) the arrow 310, i.e., the display object 180, in the virtual space VS; and at least one of the configuration, the size, and the position of the display object 180 is corrected to dispose the display object 180 in the image DI. Thereby, a monocular automotive display system can be provided having reduced incongruity caused by differences between the slant of the background and the attitude and the heading of the vehicle even in the case where the axis of the vehicle shifts.

The monocular automotive display system eliminates congested information to both eyes. Therefore, the presented image information and the external environment information appropriately match, and the perceived depth position of the image of the automotive display system 10 can easily be presented at any depth position. In the automotive display system 10 according to this embodiment, the high incongruity experienced by the image viewer when the slants between the presented image information (e.g., the displayed arrow) and the external environment information (information relating to the frontward road) do not spatially match such as when the attitude of the vehicle tilts can be reduced while keeping a high sense of matching between the presented image information and the external environment information.

As described above, rotating the display object 180, that is, changing the angle thereof, in the virtual space VS may be accompanied by changing the position of the display object 180 in the virtual space VS.

Figure 10:
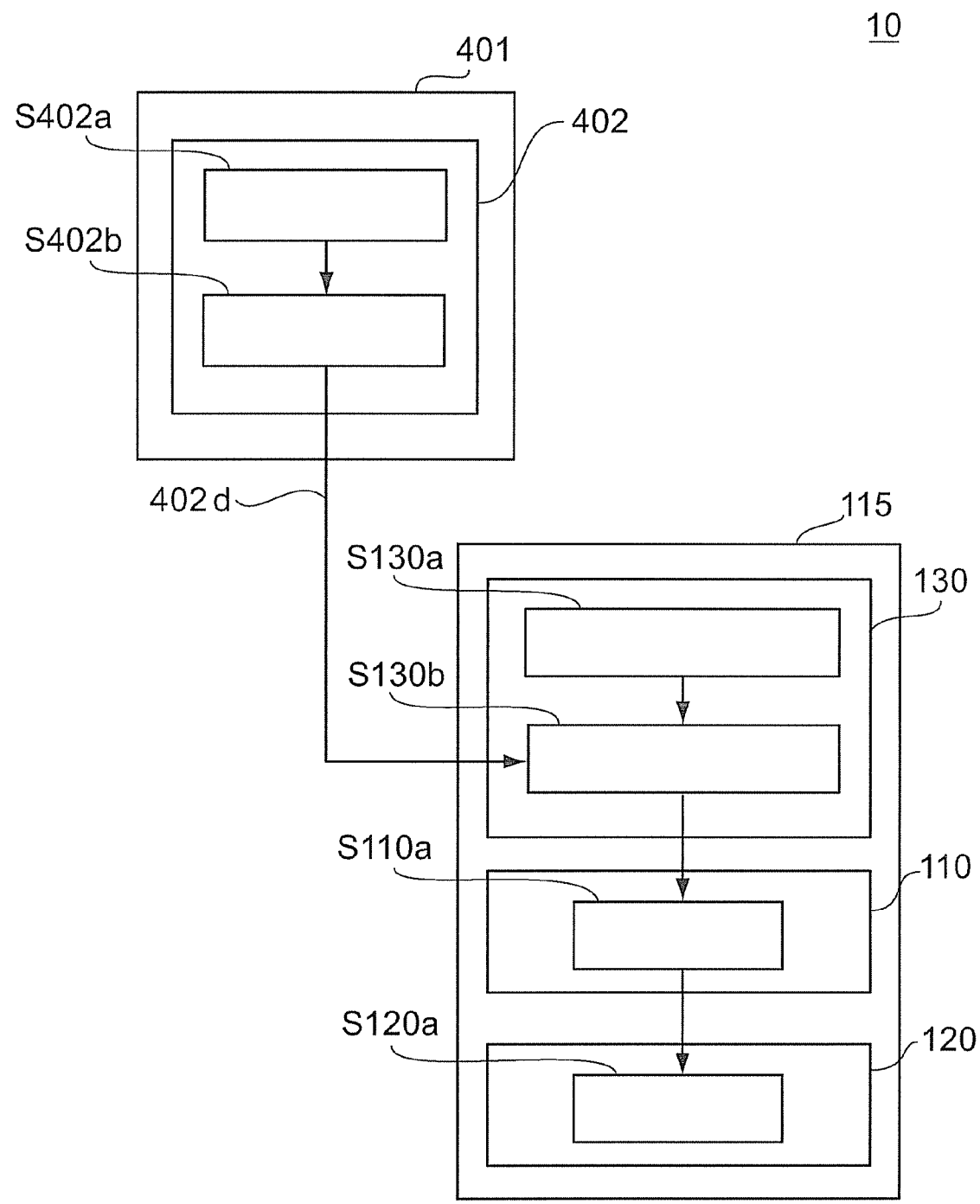
FIG. 10 is a schematic view illustrating the operation of the automotive display system according to the first embodiment.

FIG. 10 is a schematic view illustrating the operation of the automotive display system according to the first embodiment of the invention.

First, in the automotive display system 10 illustrated in FIG. 10, the vehicle axis angle detection unit 402 of the angle information acquisition unit 401 detects data relating to the axis of the vehicle 730 (step S402a). Low pass filter processing is performed on the detected data relating to the axis of the vehicle 730 (step S402b), noise such as vibrations of the vehicle 730 is removed from the data relating to the axis of the vehicle 730, and vehicle angle information 402d is obtained relating to the angle of the axis of the vehicle 730.

The vehicle angle information 402d is provided to the image projection unit 115. That is, the vehicle angle information 402d is provided to, for example, the image generation unit 130 of the image projection unit 115.

The image generation unit 130 generates image data including, for example, the arrow 310 as the prescribed display object 180 (step S130a). The arrow 310, i.e., the display object 180, is rotated in the virtual space VS to correct the image data based on the vehicle angle information 402d from the angle information acquisition unit 401 (step S130b).

As a result, at least one of the configuration, the size, and the position of the display object 180 is changed in the image DI.

The data of the display object 180 also may be corrected in the image DI without using the virtual space VS based on, for example, pre-stored data of the display object 180 corresponding to various angles.

The corrected image data is provided to the image formation unit 110. The image formation unit 110 forms the image DI including, for example, the arrow 310, i.e., the display object 180 (step S110a).

The projection unit 120 projects the formed image DI onto the one eye 101 of the image viewer 100 (step S120a).

Thus, in the automotive display system 10 according to this embodiment, a tilt sensor, for example, is provided on the vehicle body of the vehicle 730; the tilt sensor detects the attitude and the direction of the tilt and the like of the vehicle 730; and this information is transmitted to an image processing device of the image projection unit 115. The image processing device displays by rotating the image to be displayed on the HUD and correcting the image shift accompanying the tilt of the vehicle body based on the information relating to the tilt of the vehicle body. Thereby, a monocular automotive display system can be provided having reduced incongruity caused by differences between the slant of the background and the attitude and the heading of the vehicle.

If the display object 180 is not corrected, the tilt of the vehicle 730 causes the image to be superimposed in a direction tilted with respect to the background. The image viewer 100 maintains a sense of direction of perpendicular and horizontal with respect to the visual space. Therefore, the displayed image tilts with respect to the perceived visual space; and the image viewer 100 not only senses a visual incongruity but also may mistakenly perceive the spatial position indicated by the displayed image. Conversely, the automotive display system 10 reduces mismatching between the display object 180 and the background in the visual space by correcting the display object 180.

In regard to the aforementioned, it is sufficient that the vehicle axis angle detection unit 402 detects the axis of the vehicle relating to, for example, at least one of the pitch, the roll, and the yaw of the vehicle 730. Although the vehicle axis angle detection unit 402 is provided inside the angle information acquisition unit 401 in this specific example, the invention is not limited thereto. For example, the vehicle axis angle detection unit 402 may be provided separately from the angle information acquisition unit 401 and may be provided on the vehicle 730.

Further, the vehicle axis angle detection unit 402 may be provided outside the vehicle 730. The angle information acquisition unit 401 may acquire the vehicle angle information 402d relating to the axis of the vehicle 730 detected by the vehicle axis angle detection unit 402 provided outside the vehicle 730 by, for example, a communication method such as wireless communication. For example, the direction of the axis of the vehicle 730 may be detected by various sensors provided on the street, communication satellites, etc., and the detection result may be acquired as the vehicle angle information 402d of the vehicle 730.

For example, the yaw angle θy of the vehicle 730 can be detected with relatively high precision by, for example, GPS (Global Positioning System) and the like, and the yaw angle θy may be obtained using a GPS receiver and the like. Thus, the data relating to the axis of the vehicle 730 can be detected by a sensor provided in the vehicle 730 or by a detection unit provided separate from the vehicle 730. It is sufficient that the angle information acquisition unit 401 of the automotive display system 10 acquires at least a portion of the vehicle angle information 402d relating to the angle of the axis of the vehicle 730 therefrom.

Second Embodiment

Figure 11:
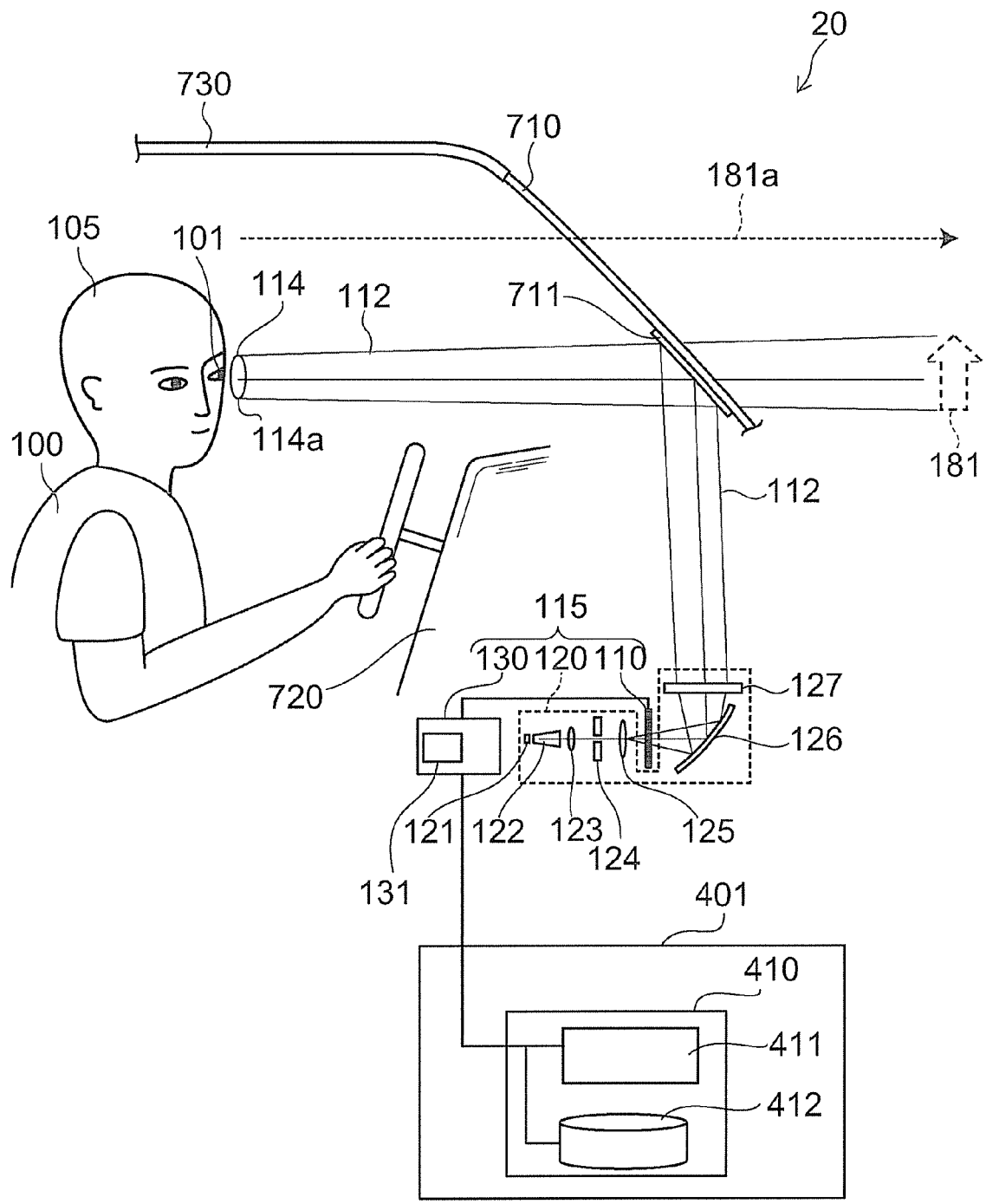
FIG. 11 is a schematic view illustrating the configuration of an automotive display system according to a second embodiment.

FIG. 11 is a schematic view illustrating the configuration of an automotive display system according to a second embodiment of the invention.

In an automotive display system 20 according to the second embodiment of the invention illustrated in FIG. 11, the angle information acquisition unit 401 does not include the vehicle axis angle detection unit 402 but includes an external environment angle information acquisition unit 410. Otherwise, the automotive display system 20 may be similar to the automotive display system 10, and a description is therefore omitted. Although the image viewer position detection unit 210 and the control unit 250 are omitted in FIG. 11, the automotive display system 20 also may include these components and perform similar operations.

The external environment angle information acquisition unit 410 acquires external environment angle information relating to the angle of the background object 520 in the external environment outside the space in which the image viewer rides in the vehicle 730. In this specific example, the external environment angle information acquisition unit 410 includes a vehicle position acquisition unit 411 that acquires the position of the vehicle 730 and an external environment information storage unit 412 that stores, for example, information of the external environment of the vehicle 730.

A GPS receiver and the like, for example, may be used as the vehicle position acquisition unit 411. Any device such as a device detecting the position of the vehicle 730 using various markers provided on streets, intersections, and the like, ITS (Intelligent Transport Systems), and the like may be used. In other words, any device acquiring, for example, information from a host allowing the designation of the position of the vehicle 730 can be used as the vehicle position acquisition unit 411.

On the other hand, the external environment information storage unit 412 stores information of the external environment of the vehicle 730 such as topography, maps, etc., including information such as the configuration, disposition, size, grade, slant, and heading of roads, intersections, and the like. The information of the external environment may include not only information relating to roads and the like but also information relating to mountains, rivers, fields, and the like other than roads as well as buildings and the like.

The external environment angle information acquisition unit 410 acquires external environment angle information relating to the angle of the background object 520 of the external environment of the vehicle 730 based on the position of the vehicle 730 acquired by the vehicle position acquisition unit 411 and the information of the external environment of the vehicle 730 stored in the external environment information storage unit 412.

The angle of the axis of the background object 520 may be taken as, for example, the uphill/downhill angle, the slant angle in the left and right direction, and the angle of the heading direction of the road.

In other words, the angle of the axis of the background object 520 includes at least one of an angle of the grade in the direction along the extension direction of the road 530 (a grade angle $\theta p1$ described below), an angle of the slant in the direction along the left and right direction orthogonal to the extension direction of the road 530 (a left/right slant angle $\theta r1$ described below), and an angle of the heading of the extension direction of the road 530 (a heading angle $\theta y1$ described below) at the target position 521 of the display object 180 of the frontward road 530 in the path of the vehicle 730.

First, the grade of the road, that is, the uphill and downhill slant, will be described.

Figure 12A:
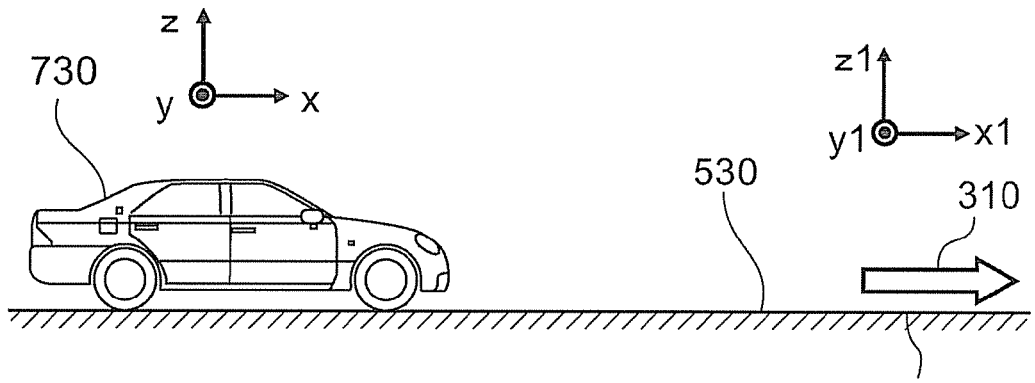
FIGS. 12A to 12C are schematic views illustrating states of external environments where the automotive display system according to the second embodiment is used.
Figure 12B:
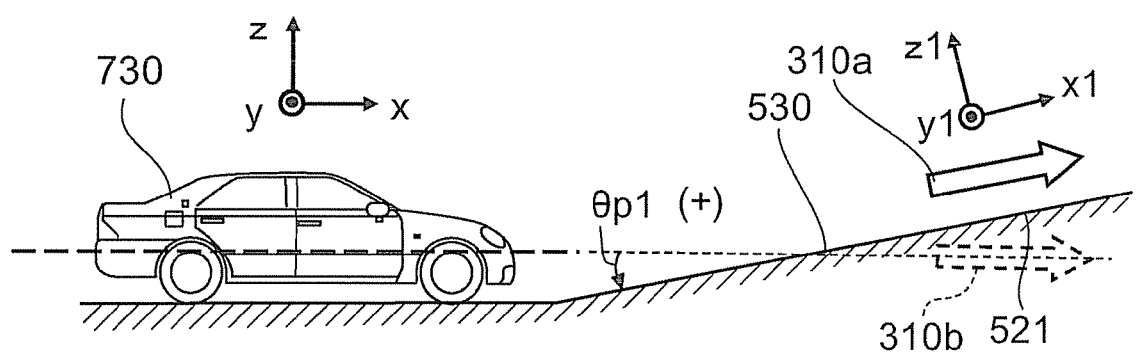
Figure 12C:
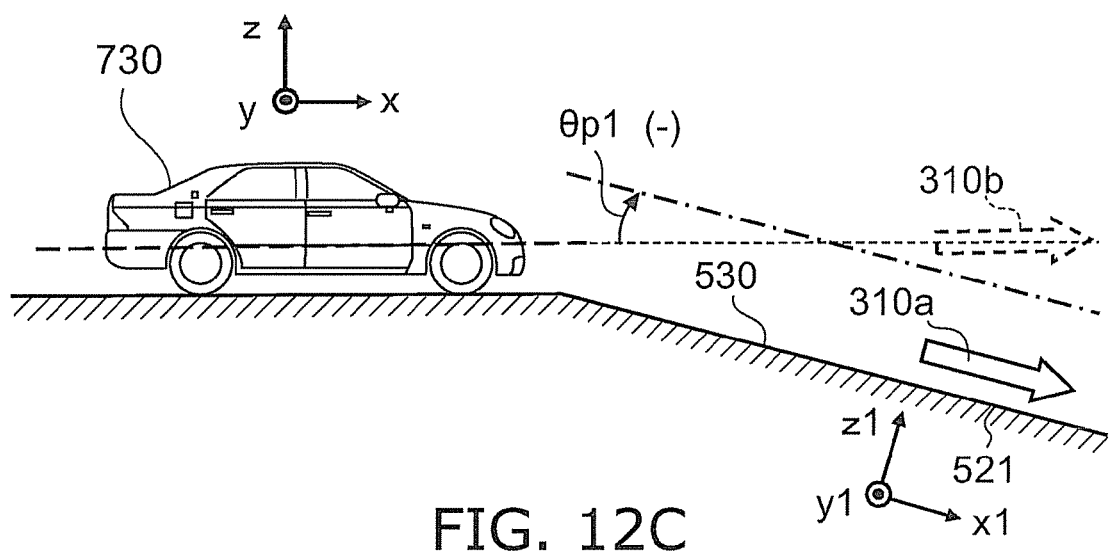

FIGS. 12A to 12C are schematic views illustrating states of external environments where the automotive display system according to the second embodiment of the invention is used.

Namely, FIGS. 12A to 12C illustrate three kinds of states of the external environment of the frontward path of the vehicle 730 in which the automotive display system 20 is mounted. The vehicle 730 and the road 530 are viewed from the side of the vehicle 730. In this example, the road 530 is horizontal in the left and right direction of the road 530.

In FIG. 12A, the location is horizontal where the vehicle 730 is traveling, parked, or stopped. The road 530 at the target position 521 corresponding to the arrow 310 also is horizontal. In such a case, the x axis, the y axis, and the z axis are parallel to and have directions matched to the x1 axis, the y1 axis, and the z1 axis, respectively.

On the other hand, in the case where the location is horizontal where the vehicle 730 is traveling, parked, or stopped and the frontward road 530 is uphill as illustrated in FIG. 12B, the x1 axis and the z1 axis rotate around the y1 axis when the vertical direction is taken as the reference. The angle of this rotation is taken as a grade angle $\theta p1$. In this example, the rotation is counterclockwise, and the grade angle $\theta p1$ is taken as positive.

In such a case, the uncorrected arrow 310b unnaturally appears to be buried in the road 530 if the display object 180 corresponding to the arrow 310 is disposed in the image DI without a correction. However, in the automotive display system 20 according to this embodiment, the display object 180 is rotated counterclockwise in the virtual space VS and generated in the image DI. Therefore, the corrected arrow 310a after the correction is perceived to follow the road 530, and a congruous and natural image can be presented.

On the other hand, in the case where the location is horizontal where the vehicle 730 is traveling, parked, or stopped and the frontward road 530 is downhill as illustrated in FIG. 12C, the x1 axis and the z1 axis rotate around the y1 axis. In this example, the rotation is clockwise, and the grade angle $\theta p1$ is taken as negative.

In such a case, the uncorrected arrow 310b unnaturally appears to float in the air above the road 530 if the display object 180 corresponding to the arrow 310 is disposed in the image DI without a correction. However, in the automotive display system 20 according to this embodiment, the display object 180 is rotated clockwise in the virtual space VS and generated in the image DI. Therefore, the corrected arrow 310a after the correction is perceived to follow the road 530, and a congruous and natural image can be presented.

The slant of the road in the left and right direction will now be described.

FIGS. 13A to 13F are schematic views illustrating other states of the external environment where the automotive display system according to the second embodiment of the invention is used.

Namely, FIGS. 13A to 13F illustrate three kinds of states of the external environment of the frontward path of the vehicle 730 in which the automotive display system 20 is mounted. The vehicle 730 and the road 530 are viewed from the rear of the vehicle 730. In this example, there is no grade relating to the extension direction of the road 530, that is, there is no uphill or downhill slant; the road 530 is horizontal left and right at a proximal target position 523 as viewed from the vehicle 730; and the road 530 slants in the left and right direction at a distal target position 522 as viewed from the vehicle 730.

Figure 13A:
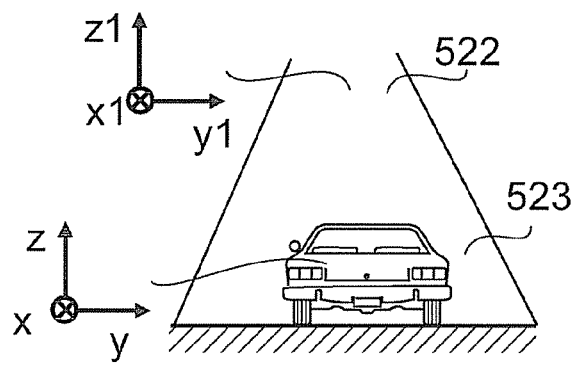
FIGS. 13A to 13F are schematic views illustrating other states of the external environment where the automotive display system according to the second embodiment is used.
Figure 13D:
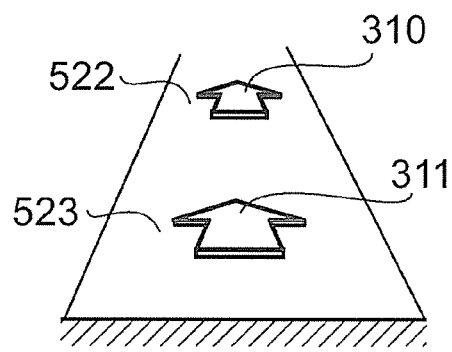
Figure 13B:
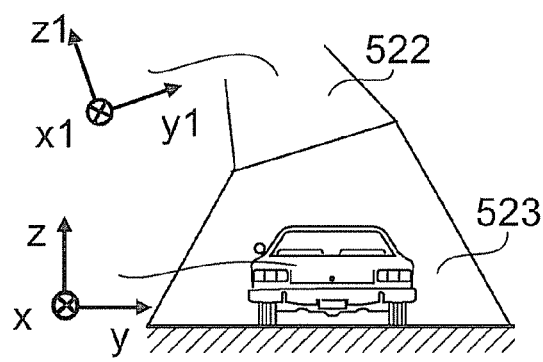
Figure 13E:
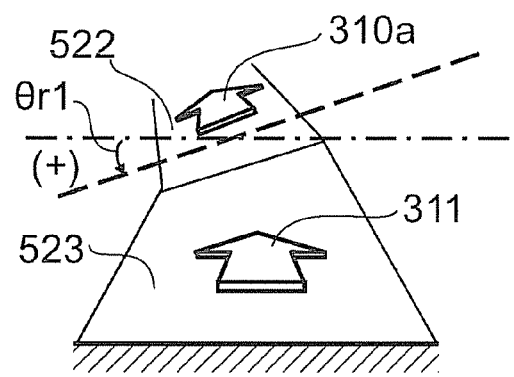
Figure 13C:
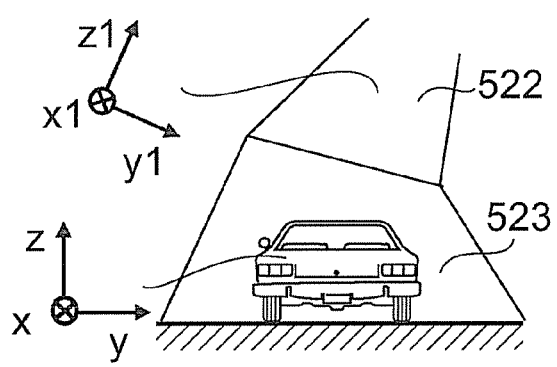
Figure 13F:
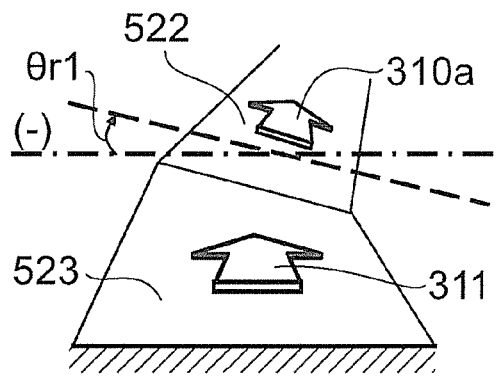

FIGS. 13A, 13B, and 13C schematically illustrate the vehicle 730 and the road 530. FIGS. 13D, 13E, and 13F correspond to FIGS. 13A, 13B, and 13C, respectively. The road 530 and the arrow 310, i.e., the display object 180, displayed overlaid on the road 530 are illustrated. FIGS. 13D, 13E, and 13F illustrate the arrow 310 and the corrected arrow 310a corresponding to the distal target position 522 as viewed from the vehicle 730 and an arrow 311 of the proximal target position 523 as viewed from the vehicle 730.

In the case where the frontward road 530 is horizontal left and right both proximally and distally as illustrated in FIG. 13A, the x1 axis, the y1 axis, and the z1 axis corresponding to the axes of the road 530 at the target positions 522 and 523 are parallel to and have directions matched to the x axis, the y axis, and the z axis corresponding to the axes of the vehicle 730, respectively.

In such a case, the arrow 311 at the proximal target position 523 is not corrected and the arrow 310 at the distal target position 522 also is not corrected as illustrated in FIG. 13D.

On the other hand, as illustrated in FIG. 13B, the road 530 is horizontal left and right at the proximal target position 523 as viewed from the vehicle 730, and the road 530 slants in the left and right direction such that the leftward portion thereof is lower than the rightward portion at the distal target position 522 as viewed from the vehicle 730.

Here, the x1 axis, the y1 axis, and the z1 axis are parallel to the x axis, the y axis, and the z axis at the proximal target position 523, respectively; while at the distal target position 522, the y1 axis and the z1 axis rotate around the x1 axis and the y1 axis and the z1 axis are shifted from the y axis and the z axis, respectively.

In such a case as illustrated in FIG. 13E, the arrow 311 is not corrected at the proximal target position 523; while at the distal target position 522, the arrow 310 is corrected and the corrected arrow 310a is generated. For example, the angle of the rotation of the y1 axis and the z1 axis at the distal target position 522 is taken as the left/right slant angle $\theta r1$. In this case, the rotation direction of the y1 axis and the z1 axis is counterclockwise, and the left/right slant angle $\theta r1$ is taken as positive. At the distal target position 522, the arrow 310 is rotated the left/right slant angle $\theta r1$ in the same direction (the positive direction) in the virtual space VS and generated in the image DI. Thereby, the corrected arrow 310a after the correction is perceived to follow the road 530, and a congruous and natural image can be presented.

As illustrated in FIG. 13C, the road 530 is horizontal left and right at the proximal target position 523 as viewed from the vehicle 730; while at the distal target position 522 as viewed from the vehicle 730, the road 530 slants in the left and right direction such that the rightward portion thereof is lower than the leftward portion. For example, at the distal target position 522, the rotation direction of the y1 axis and the z1 axis is clockwise, and the left/right slant angle θr1 is negative.

In such a case, as illustrated in FIG. 13F, the arrow 311 is not corrected at the proximal target position 523; while at the distal target position 522, the arrow 310 is rotated the left/right slant angle θn in the same direction (the negative direction) in the virtual space VS and generated in the image DI. Thereby, the corrected arrow 310a after the rotation is perceived to follow the road 530, and a congruous and natural image can be presented.

The change of the angle of the heading direction of the road will now be described.

Figure 14A:
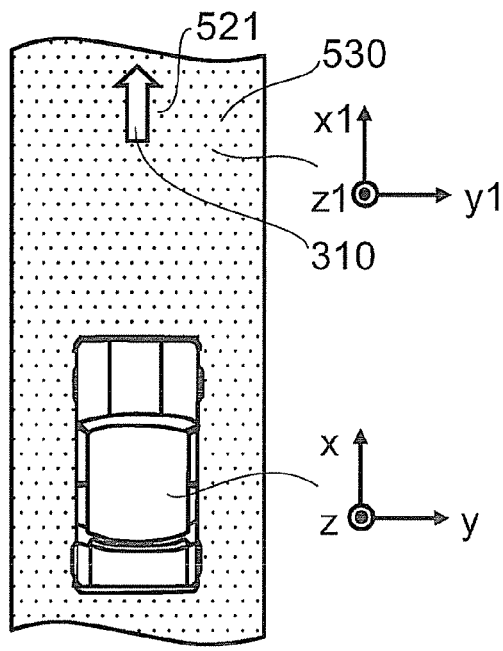
FIGS. 14A to 14C are schematic views illustrating other states of the external environment where the automotive display system according to the second embodiment is used.
Figure 14B:
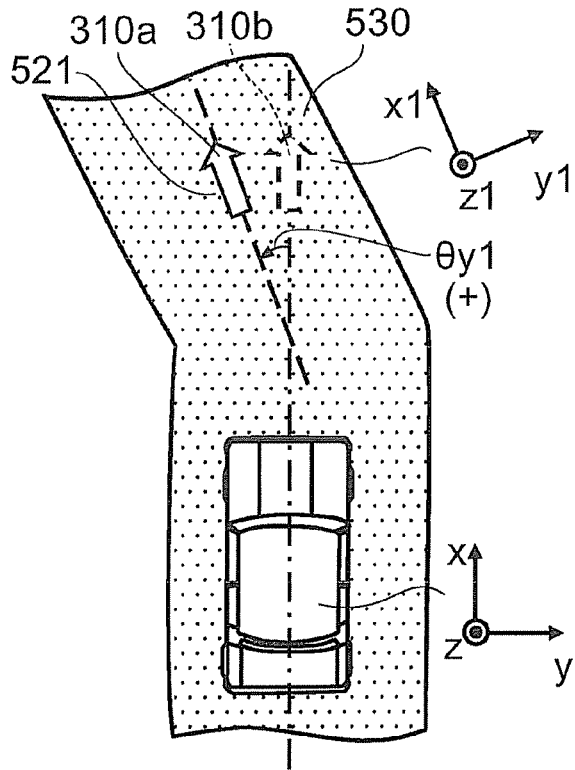
Figure 14C:
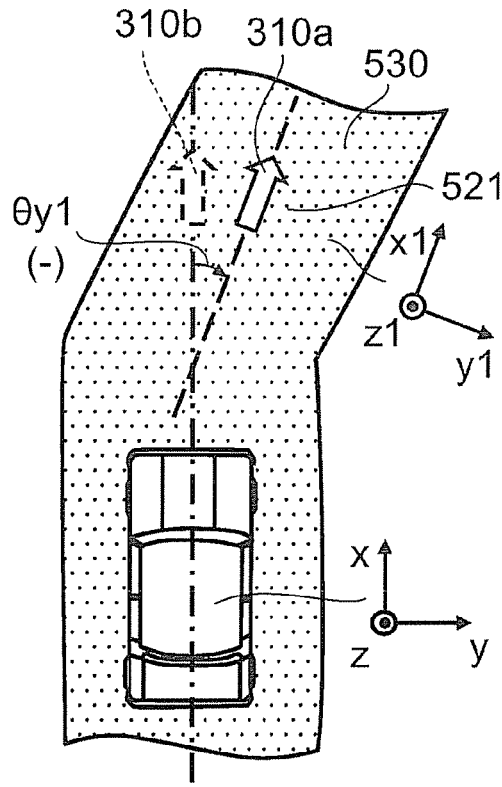

FIGS. 14A to 14C are schematic views illustrating other states of the external environment where the automotive display system according to the second embodiment of the invention is used.

Namely, FIGS. 14A to 14C illustrate three kinds of states of the frontward road 530 of the vehicle 730 in which the automotive display system 20 is mounted. The vehicle 730 and the road 530 are viewed from above the vehicle 730. In this example, there is no slant (uphill or downhill) relating to the travel direction of the road 530, there is no slant relating to the left and right direction, and the road 530 is horizontal.

In the case where the road 530 proceeds straight with respect to the travel direction of the vehicle 730 at the target position 521 as illustrated in FIG. 14A, the x axis, the y axis, and the z axis corresponding to the vehicle 730 are parallel to and have directions matched to the x1 axis, the y1 axis, and the z1 axis corresponding to the frontward road 530, respectively. In such a case, the arrow 310 appears naturally even without being corrected.

On the other hand, in the case where the extension direction of the road 530 points leftward of the frontward target position 521 of the vehicle 730 (the counterclockwise direction as viewed from above) as illustrated in FIG. 14B, the x1 axis and the y1 axis rotate around the z1 axis. The angle of the rotation is taken as the heading angle θy1 of the road 530. In this example, the rotation is counterclockwise and the heading angle θy1 is taken as positive.

In such a case, the arrow 310 is rotated the heading angle θy1 in the same direction (the positive direction) in the virtual space VS corresponding to the rotation of the x1 axis and the y1 axis and generated in the image DI. Thereby, the corrected arrow 310a after the rotation is perceived to follow the road 530, and a congruous and natural image can be presented.

In the case where the extension direction of the road 530 points rightward of the frontward target position 521 of the vehicle 730 (the clockwise direction as viewed from above) as illustrated in FIG. 14C, the x1 axis and the y1 axis rotate around the z1 axis, and the heading angle θy1 is negative.

In such a case, the arrow 310 is rotated the heading angle θy1 in the same direction (the negative direction) in the virtual space VS corresponding to the rotation of the x1 axis and the y1 axis and generated in the image DI. Thereby, the corrected arrow 310a after the rotation is perceived to follow the road 530, and a congruous and natural image can be presented.

The rotation of the arrow 310 in the virtual space VS corresponding to the grade angle θp1, the left/right slant angle θr1, and the heading angle θy1 recited above may be performed using, for example, the methods described in regard to FIGS. 5A to 5F, FIGS. 7A to 7F, and FIGS. 9A to 9F. In other words, in the case where the grade angle θp1, the left/right slant angle θr1, and the heading angle θy1, i.e., the angle of the axes of the road 530, change, it is sufficient to correct the angles in the relatively reverse direction with respect to the case where the pitch angle θp, the roll angle θr, and the yaw angle θy, i.e., the angles of the axes of the vehicle 730, are changed, respectively. It is sufficient to similarly change the angle in the virtual space VS and change at least one of the configuration, the size, and the position of the display object 180 in the image DI.

Thereby, for example, the axis of the background object 520 including at least one of the uphill/downhill grade, the slant in the left and right direction, and the heading direction of the road can be corrected, matched to the axis of the vehicle 730, and displayed. Thereby, a monocular automotive display system can be provided having reduced incongruity caused by differences between the slant of the background and the attitude and the heading of the vehicle.

Although, for example, the GPS receiver, i.e., the vehicle position acquisition unit 411, is provided in the angle information acquisition unit 401 of the automotive display system 20 in this specific example, the invention is not limited thereto. For example, a vehicle position acquisition unit including a GPS receiver and the like may be provided in the vehicle 730 in which the automotive display system 20 is mounted, and the external environment angle information acquisition unit 410 of the angle information acquisition unit 401 may acquire the data relating to the position of the vehicle 730 acquired by the vehicle position acquisition unit.

Further, although the external environment information storage unit 412 is provided in the angle information acquisition unit 401 in the automotive display system 20 in this specific example, the invention is not limited thereto. For example, an external environment information storage unit may be provided in the vehicle 730 in which the automotive display system 20 is mounted, and the data relating to the external environment information stored in the external environment information storage unit may be used. Also, the external environment information storage unit may be provided outside the vehicle 730 in which the automotive display system 20 is mounted, and the data relating to the external environment information stored in the external environment information storage unit may be acquired by the external environment angle information acquisition unit 410 of the angle information acquisition unit 401 by, for example, a method such as wireless communication.

The results of the automotive display system 10 according to the first embodiment can be effectively realized in the case where the axes of the background object 520, that is, the grade angle θp1, the left/right slant angle θr1, and the heading angle θy1, are substantially constant, and the angle of the axes of the vehicle 730 (the pitch angle θp, the roll angle θr, and the yaw angle θy) are changed. On the other hand, the results of the automotive display system 20 according to the second embodiment can be effectively realized in the case where the angle of the axis of the vehicle 730 is substantially constant and the axes of the background object 520 (i.e., the grade angle θp1, the left/right slant angle θr1, and the heading angle θy1) are changed.

Although the axis of the background object 520 and the axis of the vehicle 730 may be thus controlled independently, a monocular automotive display system can be provided having further reduced incongruity caused by differences between the slant of the background and the attitude and the heading of the vehicle by controlling the display object 180 based on the relative difference of angles between the axis of the background object 520 and the axis of the vehicle 730 as described below.

Third Embodiment

Figure 15:
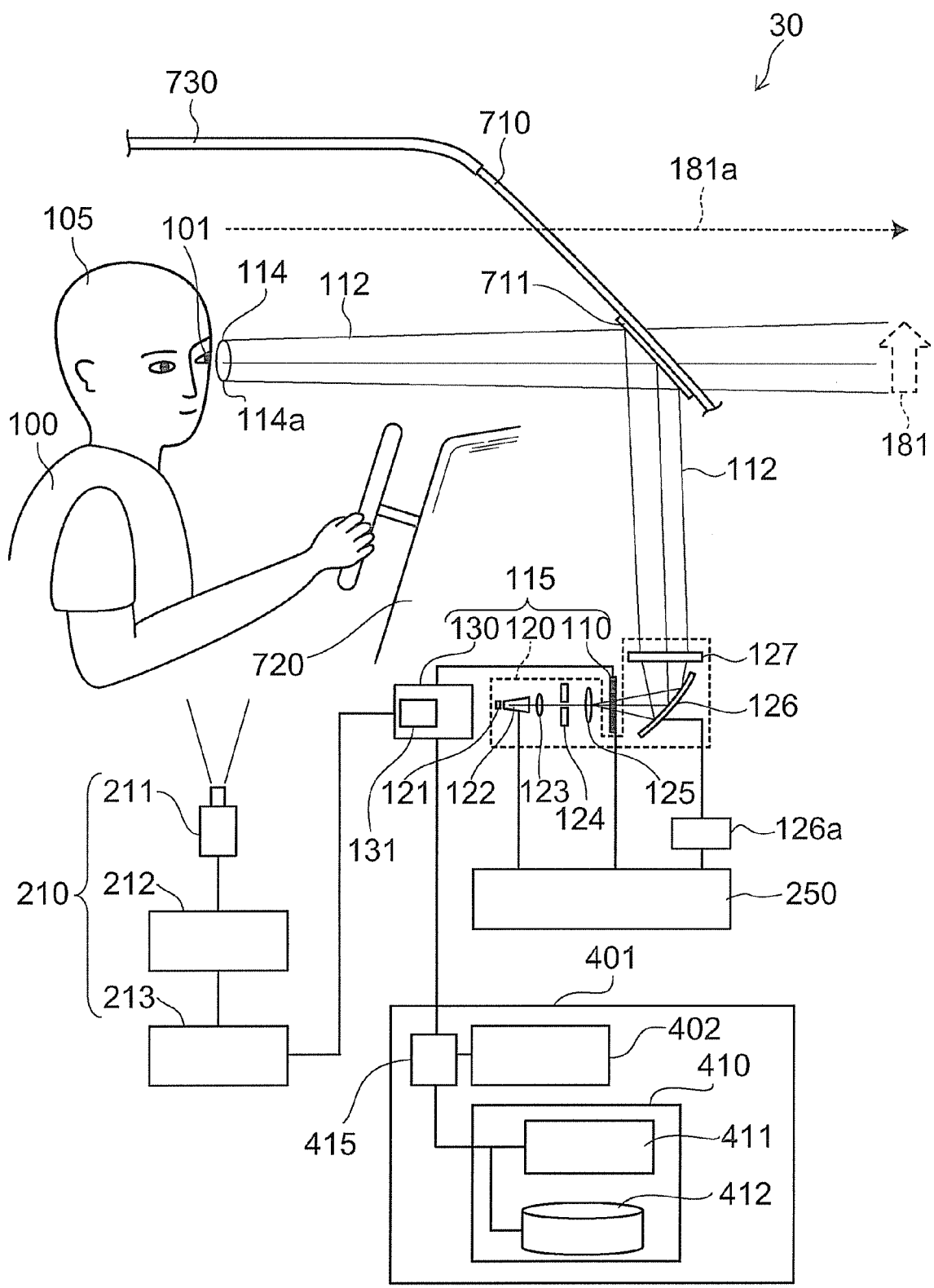
FIG. 15 is a schematic view illustrating the configuration of an automotive display system according to a third embodiment.

FIG. 15 is a schematic view illustrating the configuration of an automotive display system according to a third embodiment of the invention.

The angle information acquisition unit 401 of an automotive display system 30 according to the third embodiment of the invention illustrated in FIG. 15 includes the vehicle axis angle detection unit 402 and the external environment angle information acquisition unit 410. The automotive display system 30 further includes an angle calculation unit 415 that acquires the output of the vehicle axis angle detection unit 402 and the external environment angle information acquisition unit 410 and derives the relative difference of angles between the axis of the background object 520 and the axis of the vehicle 730. Otherwise, the automotive display system 30 may be similar to the automotive display system 10, and a description is therefore omitted.

The operations of the vehicle axis angle detection unit 402 and the external environment angle information acquisition unit 410 are similar to those described above. In the automotive display system 30, the angle calculation unit 415 calculates the relative difference of angles based on the angles (the pitch angle $\theta p$, the roll angle $\theta r$, and the yaw angle $\theta y$) of the axes of the vehicle 730 obtained by the vehicle axis angle detection unit 402 and the angles (the grade angle $\theta p1$, the left/right slant angle $\theta r1$, and the heading angle $\theta y1$) of the axes of the background object 520 obtained by the external environment angle information acquisition unit 410. Based on the difference of the angles, the angle calculation unit 415 rotates the display object 180 in the virtual space VS to correct the difference. As a result, at least one of the configuration, the size, and the position of the display object 180 can be changed in the image DI.

The data of the display object 180 also may be corrected in the image DI without using the virtual space VS based on, for example, pre-stored data of the display object 180 corresponding to various angles.

Figure 16:
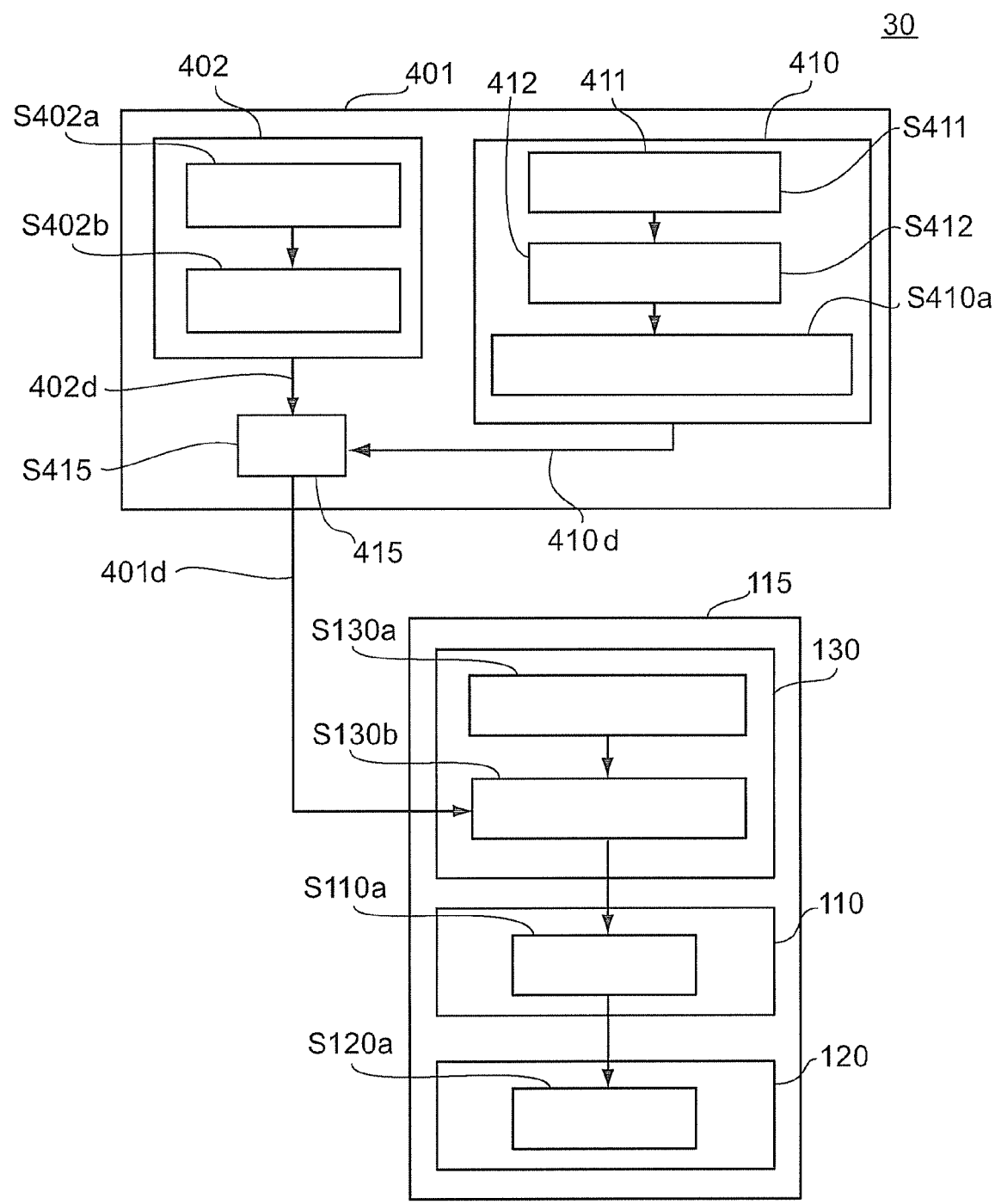
FIG. 16 is a schematic view illustrating the operations of the automotive display system according to the third embodiment.

FIG. 16 is a schematic view illustrating the operations of the automotive display system according to the third embodiment of the invention.

In the automotive display system 30 illustrated in FIG. 16, the vehicle axis angle detection unit 402 of the angle information acquisition unit 401 detects the data relating to the axis of the vehicle 730 (step S402a), low pass filter processing is performed (step S402b), the vehicle angle information 402d is obtained, and the vehicle angle information 402d is output to the angle calculation unit 415.

On the other hand, the vehicle position acquisition unit 411 of the external environment angle information acquisition unit 410 acquires the current position of the vehicle 730 based on the GPS and the like (step S411).

Based on the acquired current position of the vehicle 730, information of the external environment corresponding to the current position of the vehicle 730 including the configuration, the slant, etc., of the road, the intersection, and the like stored in the external environment information storage unit 412 is read and acquired (step S412).

The external environment angle information acquisition unit 410 acquires the external environment angle information 410d relating to the angle of the axis of the background object 520 of the external environment of the vehicle 730 (step S410a) based on the information of the external environment corresponding to the current position of the vehicle 730 and outputs the external environment angle information 410d to the angle calculation unit 415. The external environment angle information 410d is, for example, the uphill/downhill grade angle $\theta p1$, the left/right slant angle $\theta r1$ of the slant in the left and right direction, and the heading angle $\theta y1$ of the road described above.

The angle calculation unit 415 calculates the relative difference of the angles as axis difference data 401d (step S415) based on the angles (the pitch angle $\theta p$, the roll angle $\theta r$, and the yaw angle $\theta y$) relating to the axes of the vehicle 730 from the vehicle angle information 402d and the angles (the uphill/downhill grade angle $\theta p1$, the left/right slant angle $\theta r1$ of the slant in the left and right direction, and the heading angle $\theta y1$ of the road) of the axes of the background object 520 from the external environment angle information 410d.

The axis difference data 401d is provided to the image projection unit 115. Namely, the axis difference data 401d is provided to, for example, the image generation unit 130 of the image projection unit 115.

The image generation unit 130 generates image data including, for example, the arrow 310 as the prescribed display object 180 (step S130a). The arrow 310, i.e., the display object 180, is rotated in the virtual space VS to correct the image data (step S130b) based on the axis difference data 401d from the angle information acquisition unit 401.

As a result, at least one of the configuration, the size, and the position of the display object 180 can be changed in the image DI.

The data of the display object 180 also may be corrected in the image DI without using the virtual space VS based on, for example, pre-stored data of the display object 180 corresponding to various angles.

The corrected image data is provided to the image formation unit 110. The image formation unit 110 forms the image DI including, for example, the arrow 310, i.e., the display object 180 (step S110a).

The projection unit 120 projects the formed image DI onto the one eye 101 of the image viewer 100 (step S120a).

Thus, the automotive display system 30 according to this embodiment corrects the display object 180 to correct the difference based on the relative difference between the angle of the axis of the vehicle 730 obtained by the vehicle axis angle detection unit 402 and the angle of the axis of the background object 520 obtained by the external environment angle information acquisition unit 410. Thereby, a monocular automotive display system can be provided having further reduced incongruity caused by differences between the slant of the background and the attitude and the heading of the vehicle.

Figure 17A:
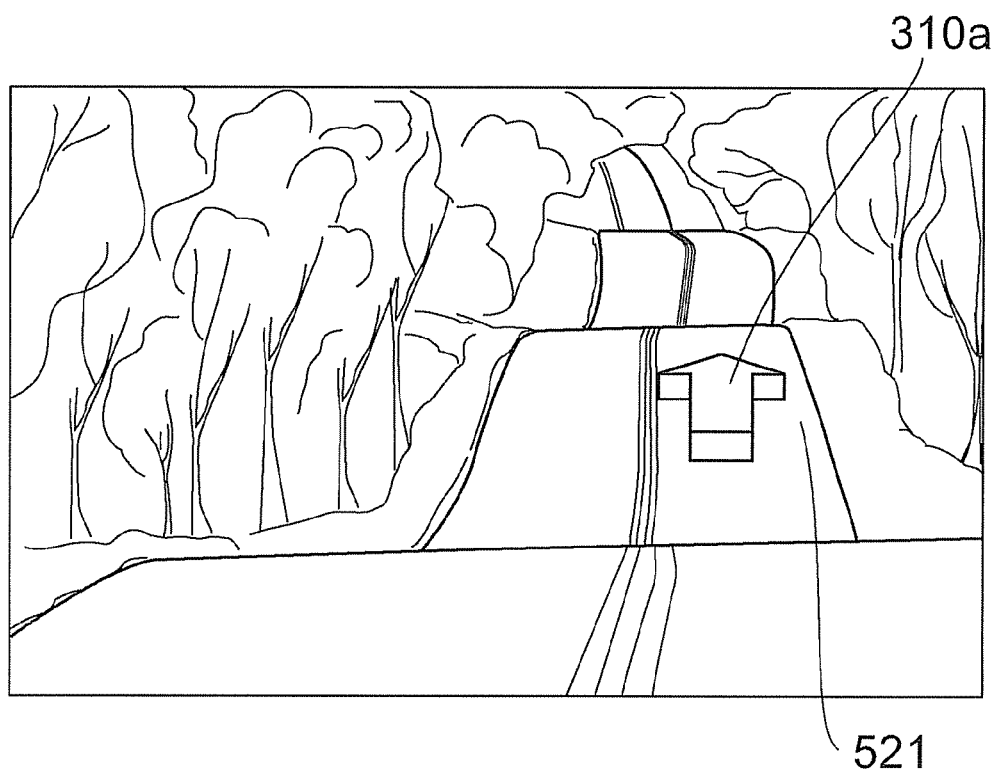
FIGS. 17A and 17B are schematic views illustrating the operations of the automotive display system according to the third embodiment.
Figure 17B:
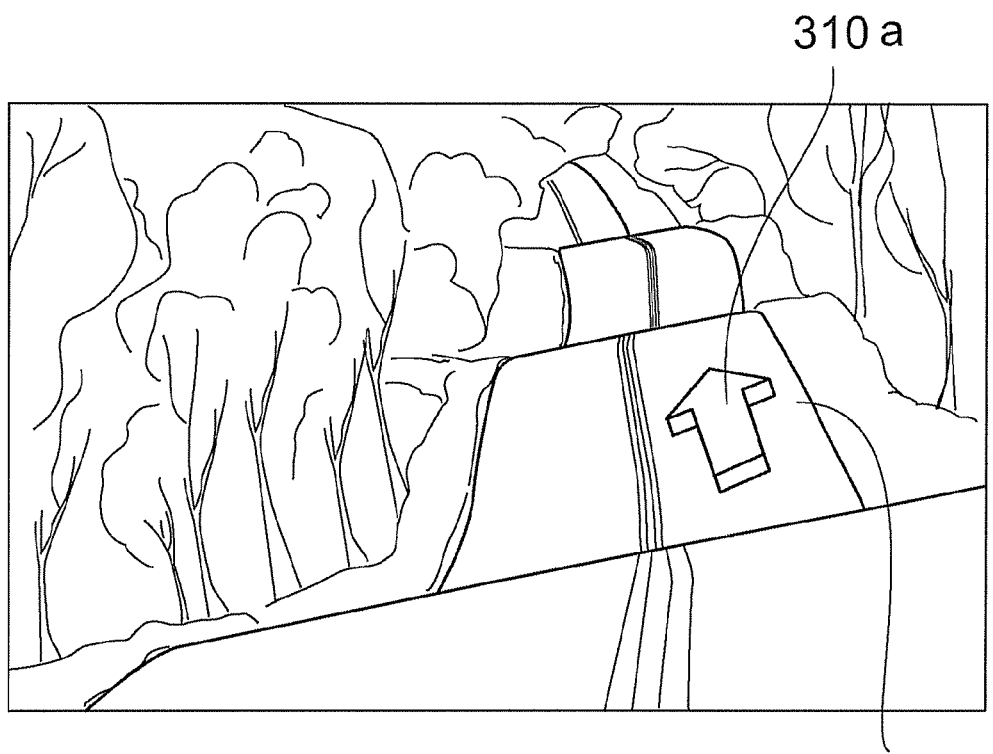

FIGS. 17A and 17B are schematic views illustrating the operations of the automotive display system according to the third embodiment of the invention.

Namely, FIG. 17A illustrates the operation of the automotive display system 30 in the case where the axis of the vehicle 730 is horizontal in the rear to front and left to right directions and the frontward road is slanted uphill and downhill, that is, the state illustrated in FIG. 12B. On the other hand, FIG. 17B illustrates the operation of the automotive display system 30 in the case where the vehicle 730 is rolling, that is, the state illustrated in FIG. 6B. FIG. 17B illustrates the frontward background rotated as viewed from the vehicle 730 to match the roll of the vehicle 730.

As illustrated in FIG. 17A, the frontward road is slanted uphill and downhill and is slanted uphill at the target position 521 of the arrow, i.e., the display object. Here, as described above in regard to FIG. 12B, the uncorrected arrow 310b pointing in the horizontal direction is rotated upward and corrected to the corrected arrow 310a. Thereby, as illustrated in FIG. 17A, the corrected arrow 310a points upward along the grade of the road and can be naturally perceived.

On the other hand, in the case where the vehicle 730 rolls clockwise as illustrated in FIG. 17B, the left and right axis (the y axis) of the vehicle 730 is shifted from the left and right axis (the y1 axis) of the frontward road. In such a case, as described above in regard to FIGS. 7B and 7E, the uncorrected arrow 310b lying in the left and right horizontal direction is corrected by rotating counterclockwise to the corrected arrow 310a to match the roll angle θr of the vehicle 730. Thereby, as illustrated in FIG. 17B, the corrected arrow 310a is displayed along the road and can be naturally perceived even in the case where the vehicle 730 is rolling.

Figure 18A:
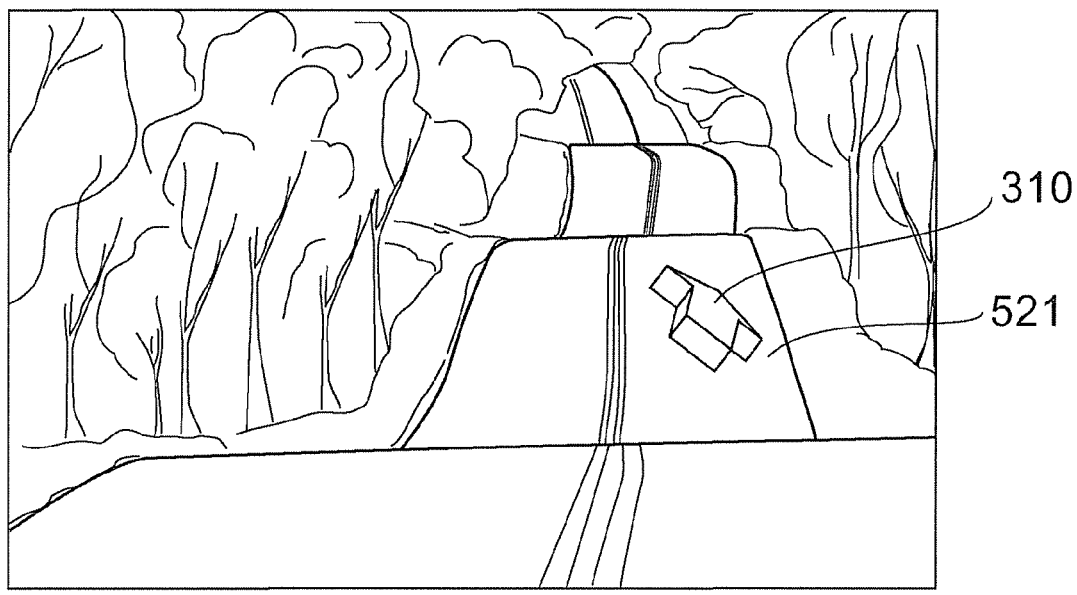
FIGS. 18A and 18B are schematic views illustrating operations of an automotive display system of a comparative example.
Figure 18B:
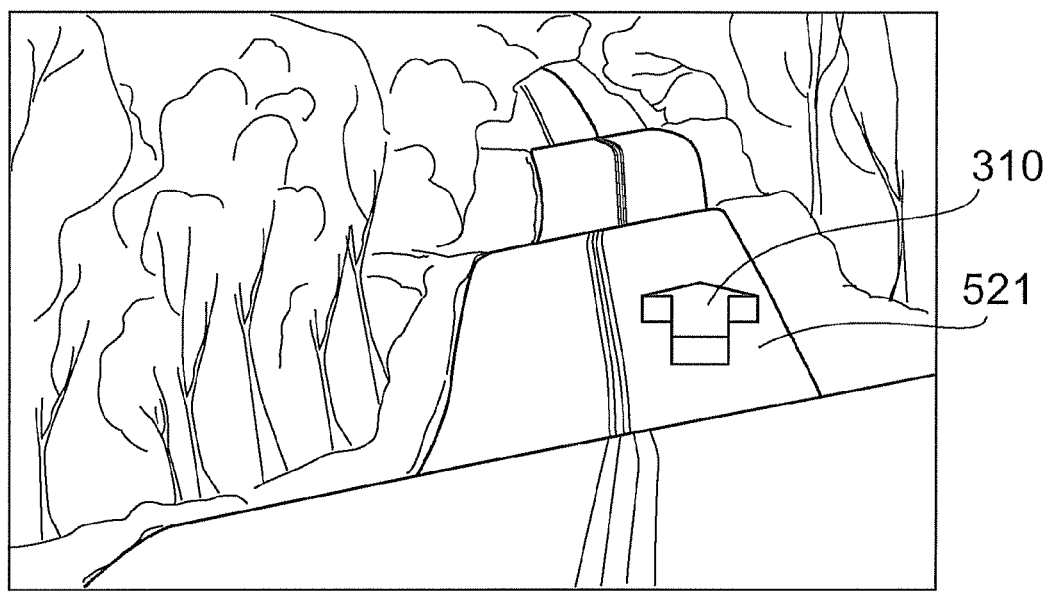

FIGS. 18A and 18B are schematic views illustrating operations of an automotive display system of a comparative example.

The automotive display system of the comparative example does not include the angle information acquisition unit 401. Accordingly, the display object is not corrected even in the case where the attitude and the heading of the vehicle are shifted from the slant of the background.

FIGS. 18A and 18B are display examples of the comparative example in the case where the vehicle 730 is rolling as illustrated in FIG. 17B. FIG. 18A illustrates the case where the road of the background is taken as the reference, and the road of the background follows the vertical direction of the page surface. On the other hand, FIG. 18B illustrates the same state of the vehicle 730 where the rolling vehicle 730 is taken as the reference, and the axis of the vehicle 730 follows the vertical direction of the page surface.

In this case as well, the frontward road at the target position 521 has an uphill grade.

In the automotive display system of the comparative example illustrated in FIG. 18A, no correction is performed to reflect conditions even though the frontward road is uphill and the vehicle 730 is rolling. Therefore, the arrow 310 is perceived to be stuck and buried into the upward hill of the frontward road. Simultaneously thereto, the arrow 310 is perceived to tilt left to right due to the roll of the vehicle 730. Thus, in the case of the comparative example, the arrow 310 is perceived unnaturally.

As illustrated in FIG. 18B, when the rolling vehicle 730 is taken as the reference, the frontward road appears to slant right to left. Also, the arrow 310 appears to be stuck and buried into the road. In other words, the arrow 310 is horizontal, the arrow 310 does not follow the road, and the arrow 310 is perceived unnaturally.

Thus, in the case of the comparative example, the arrow 310 is perceived unnaturally, is not only difficult to view but also increases the burden on the driver, i.e., the image viewer 100, and in some cases, may have a negative effect on operating safety.

Conversely, the automotive display system 30 according to this embodiment provides a monocular automotive display system having high viewability, good safety, and reduced incongruity caused by differences between the slant of the background and the attitude and the heading of the vehicle.

Although the angle calculation unit 415 is provided inside the angle information acquisition unit 401 in this specific example recited above, the invention is not limited thereto. For example, the angle calculation unit 415 may be provided in the image projection unit 115. Specifically, for example, the angle calculation unit 415 may be provided inside the image generation unit 130 of the image projection unit 115, and the vehicle angle information 402d acquired by the vehicle position acquisition unit 411 and the external environment angle information 410d acquired by the external environment angle information acquisition unit 410 may be input to the angle calculation unit 415 inside the image generation unit 130.

Figure 19:
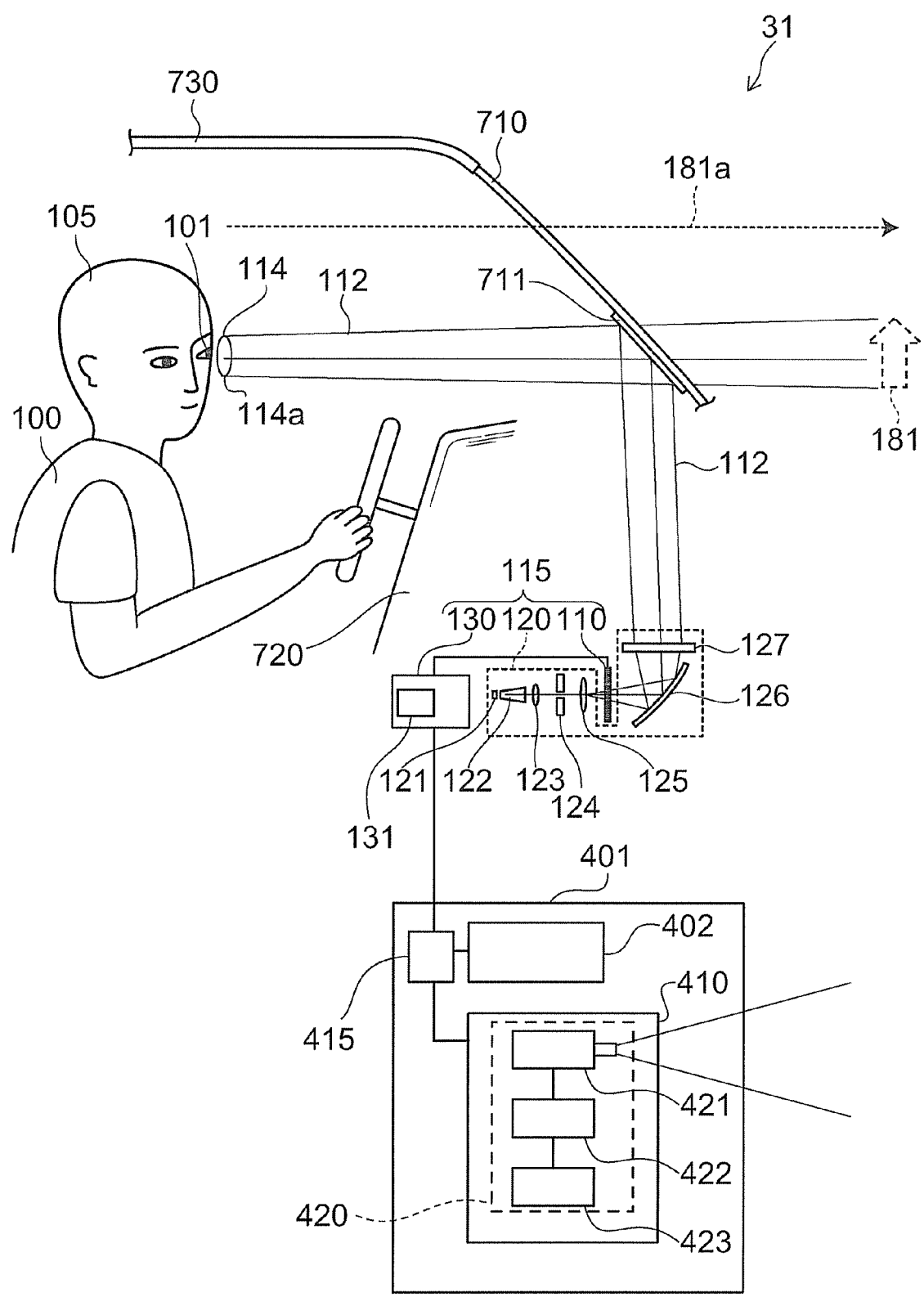
FIG. 19 is a schematic view illustrating the configuration of another automotive display system according to the third embodiment.

FIG. 19 is a schematic view illustrating the configuration of another automotive display system according to the third embodiment of the invention.

The angle information acquisition unit 401 of the other automotive display system 31 according to the third embodiment of the invention illustrated in FIG. 19 also includes the vehicle axis angle detection unit 402 and the external environment angle information acquisition unit 410. In this case as well, the angle calculation unit 415 is provided in the angle information acquisition unit 401. Although the image viewer position detection unit 210 and the control unit 250 are omitted in FIG. 19, the automotive display system 31 also may include these components and perform similar operations.

The external environment angle information acquisition unit 410 of the automotive display system 31 includes an external environment information detection unit 420 that detects the information of the background of the frontward external environment of the vehicle 730. In this specific example, the external environment information detection unit 420 includes an external environment imaging unit 421 (a camera), an image analysis unit 422 that performs image analysis of the image captured by the external environment imaging unit 421, and an external environment information generation unit 423 that extracts various information relating to the configuration, grade, slant, heading, etc., of streets, intersections, and the like from the image analyzed by the image analysis unit 422 to generate information of the external environment.

The external environment imaging unit 421 captures images of, for example, the ever-changing region frontward of the vehicle 730 in real time. Thereby, the external environment angle information 410d relating to the angle of the axis of the background object 520 of the external environment of the vehicle 730 can be acquired in real time.

In the automotive display system 31, the angle calculation unit 415 calculates the relative difference of angles based on the angles (the pitch angle θp, the roll angle θr, and the yaw angle θy) of the axes of the vehicle 730 obtained by the vehicle axis angle detection unit 402 and the angles (the uphill/downhill grade angle θp1, the left/right slant angle θr1 of the slant in the left and right direction, and the heading angle θy1 of the road) of the axes of the background object 520 obtained in real time by the external environment angle information acquisition unit 410. Based on the difference of the angles, the angle calculation unit 415 rotates the display object 180 in the virtual space VS to correct the difference. As a result, at least one of the configuration, the size, and the position of the display object 180 can be changed in the image DI.

The data of the display object 180 also may be corrected in the image DI without using the virtual space VS based on, for example, pre-stored data of the display object 180 corresponding to various angles.

By acquiring information of the frontward region in real time, the other automotive display system 31 according to this embodiment can provide a monocular automotive display system that acquires the shift between the slant of the background and the attitude and the heading of the vehicle in real time and reduces the incongruity caused thereby.

Figure 20:
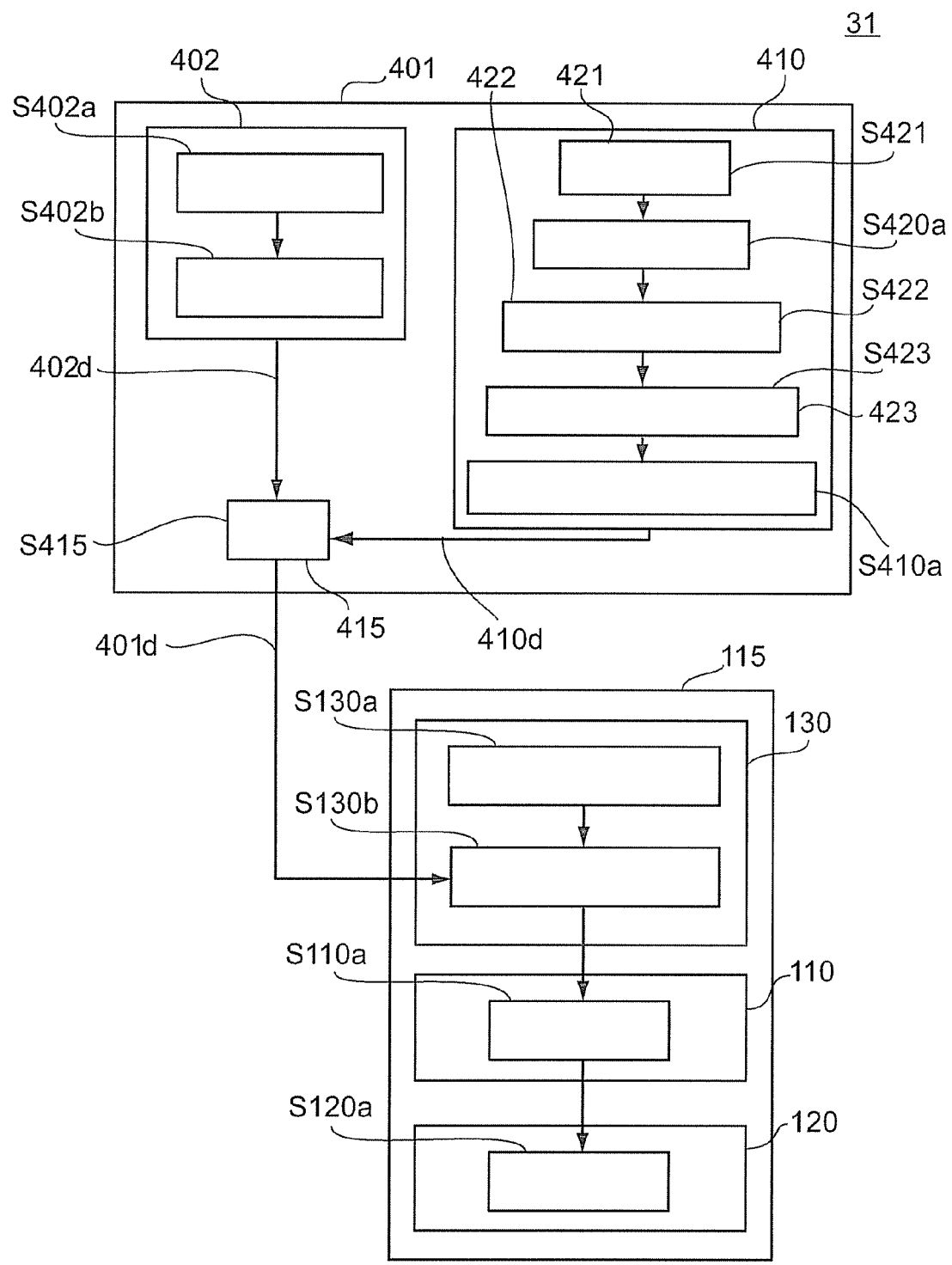
FIG. 20 is a schematic view illustrating the operation of the other automotive display system according to the third embodiment.

FIG. 20 is a schematic view illustrating the operation of the other automotive display system according to the third embodiment of the invention.

In the automotive display system 31 illustrated in FIG. 20, the vehicle axis angle detection unit 402 of the angle information acquisition unit 401 detects the data relating to the axis of the vehicle 730 (step S402a), low pass filter processing is performed (step S402b), the vehicle angle information 402d is obtained, and the vehicle angle information 402d is output to the angle calculation unit 415.

On the other hand, the external environment imaging unit 421 of the external environment information detection unit 420 of the external environment angle information acquisition unit 410 first captures an image of the external environment of the vehicle 730 (step S421). Filter processing of the captured image data of the external environment is performed as necessary (step S420a). Thereby, for example, noise components due to vibrations and the like of the vehicle 730 in which the external environment information detection unit 420 is mounted are removed.

The filter-processed image data of the external environment then undergoes image analysis by the image analysis unit 422 (step S422)

The external environment information generation unit 423 then extracts various information relating to the configuration, grade, slant, heading, etc., of the streets and the intersections from the analyzed image and generates information of the external environment (step S423).

The external environment angle information 410d is acquired from the information of the external environment (step S410a). The external environment angle information 410d is then output to the angle calculation unit 415.

Thereafter, the operations of the angle calculation unit 415, the image generation unit 130, the image formation unit 110, and projection unit 120 are similar to those described above, and a description is omitted.

Thus, the automotive display system 31 according to this embodiment corrects the display object 180 to correct the relative difference between the angle of the axis of the vehicle 730 obtained by the vehicle axis angle detection unit 402 and the angle of the axis of the background object 520 obtained in real time by the external environment angle information acquisition unit 410. Thereby, a monocular automotive display system can be provided having further reduced incongruity caused by differences between the slant of the background and the attitude and the heading of the vehicle.

A single camera (monocular camera) or a stereo camera including multiple cameras may be used as the external environment imaging unit 421. In the case where a stereo camera is used, information of the background in the depth direction can be acquired with higher precision.

In the case where a leading vehicle travels in frontward path of the vehicle 730, the external environment imaging unit 421 may acquire the information of the external environment not only based on the topography of the road and the like but also based on capturing and using an image of the leading vehicle. Thereby, information of the external environment can be acquired with a higher precision, and the data relating to the axis of the background object 520 of the external environment can be acquired with better precision.

In addition to the external environment information detection unit 420 recited above, the external environment angle information acquisition unit 410 may simultaneously include the vehicle position acquisition unit 411 (e.g., the GPS and the like) described above and the external environment information storage unit 412. Thereby, information of the external environment can be obtained with a higher precision at high speed, and the data processing by the external environment information detection unit 420 can be reduced. As described above, a vehicle position acquisition unit 411 and an external environment information storage unit 412 provided separately from the automotive display system may be operated in combination with the external environment information detection unit 420 recited above.

Although the angle information acquisition unit 401 includes the vehicle axis angle detection unit 402 and the external environment angle information acquisition unit 410 including the external environment information detection unit 420 in this specific example, in some cases, the angle information acquisition unit 401 may include only the external environment angle information acquisition unit 410 including the external environment information detection unit 420. In such a case, as in the automotive display system 20 according to the second embodiment, results can be effectively realized in the case where the angle of the axis of the vehicle 730 is substantially constant and the axes of the background object 520 (i.e., the uphill/downhill grade angle $\theta p1$, the left/right slant angle $\theta r1$ of the slant in the left and right direction, and the heading angle $\theta y1$ of the road) change.

Figure 21:
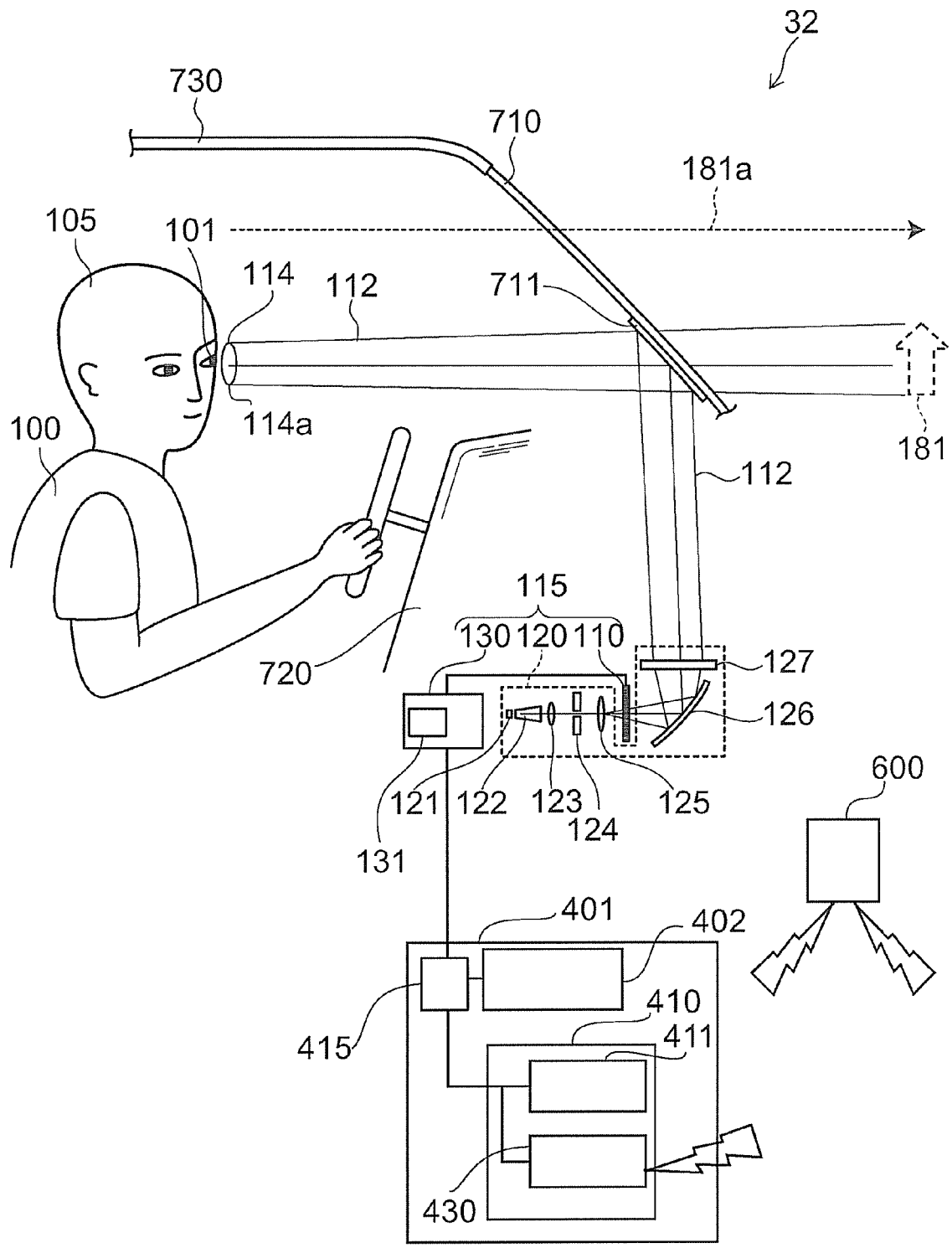
FIG. 21 is a schematic view illustrating the configuration of another automotive display system according to the third embodiment.

FIG. 21 is a schematic view illustrating the configuration of another automotive display system according to the third embodiment of the invention.

The angle information acquisition unit 401 of another automotive display system 32 according to the third embodiment of the invention illustrated in FIG. 21 also includes the vehicle axis angle detection unit 402 and the external environment angle information acquisition unit 410. In this case as well, the angle calculation unit 415 is provided in the angle information acquisition unit 401. Although the image viewer position detection unit 210 and the control unit 250 are omitted in FIG. 21, the automotive display system 32 also may include these components and perform similar operations.

In the automotive display system 32, the external environment angle information acquisition unit 410 includes the vehicle position acquisition unit 411 and a communication unit 430 capable of communicating with a host 600 provided outside the vehicle 730.

A GPS receiver and the like, for example, may be used as the vehicle position acquisition unit 411, and a description of the operation thereof is omitted.

On the other hand, the communication unit 430 may include, for example, various wireless devices.

The host 600 stores various data relating to roads, topography, etc. In addition to data stored beforehand, the host 600 may continuously receive data relating to the roads, the topographies, traffic conditions, and the like from the vehicle 730 and other vehicles, add the received data to the various stored data, or add and store the received data after correcting.

The host 600 and the communication unit 430 may communicate via, for example, various base stations provided at roads and intersections on land and/or satellite stations provided in satellites and the like.

For example, various information of the external environment of the vehicle 730 corresponding to the current position of the vehicle 730 acquired by the vehicle position acquisition unit 411 is acquired from the host 600 via the communication unit 430.

The external environment angle information acquisition unit 410 thereby acquires the external environment angle information 410d relating to the angle of the axis of the background object 520 of the external environment of the vehicle 730 based on the position of the vehicle 730 acquired by the vehicle position acquisition unit 411 and the information of the external environment of the vehicle 730 acquired from the host 600.

Figure 22:
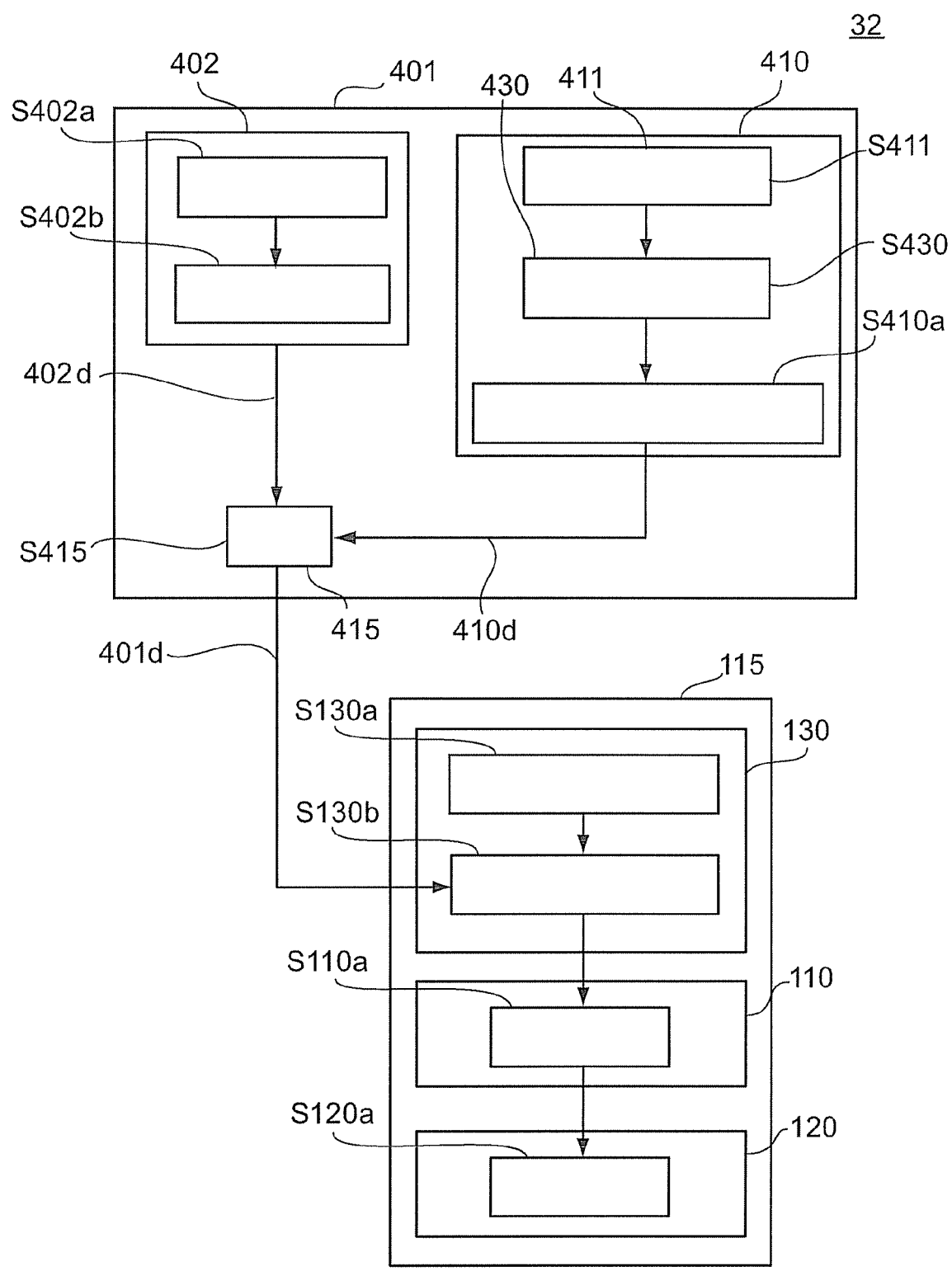
FIG. 22 is a schematic view illustrating the operation of another automotive display system according to the third embodiment.

FIG. 22 is a schematic view illustrating the operation of another automotive display system according to the third embodiment of the invention.

In the automotive display system 32 illustrated in FIG. 22, the vehicle axis angle detection unit 402 of the angle information acquisition unit 401 detects the data relating to the axis of the vehicle 730 (step S402a), low pass filter processing is performed (step S402b), the vehicle angle information 402d is obtained, and the vehicle angle information 402d is output to the angle calculation unit 415.

On the other hand, the vehicle position acquisition unit 411 of the external environment angle information acquisition unit 410 can acquire the current position of the vehicle 730 based on GPS and the like (step S411).

Based on the acquired current position of the vehicle 730, the communication unit 430 acquires the information of the external environment corresponding to the current position of the vehicle 730 from the not-illustrated host 600 (step S430).

The external environment angle information acquisition unit 410 acquires the external environment angle information 410d relating to the angle of the axis of the background object 520 of the external environment of the vehicle 730 based on the information of the external environment corresponding to the current position of the vehicle 730 (step S410a). The external environment angle information 410d is output to the angle calculation unit 415.

Thereafter, the operations of the angle calculation unit 415, the image generation unit 130, the image formation unit 110, and the projection unit 120 are similar to those described above, and a description is omitted.

Thus, the automotive display system 32 according to this embodiment corrects the display object 180 to correct the relative difference between the angle of the axis of the vehicle 730 obtained by the vehicle axis angle detection unit 402 and the angle of the axis of the background object 520 obtained from the host 600 via the communication unit 430 of the external environment angle information acquisition unit 410. Thereby, a monocular automotive display system can be provided having further reduced incongruity caused by differences between the slant of the background and the attitude and the heading of the vehicle. A navigation system may be provided inside the automotive display system 32 or in the vehicle 730 in which the automotive display system 32 is mounted. In such a case, the information of the external environment relating to the road of the travel path made by the navigation system may be collectively acquired from, for example, the host 600. The information of the external environment relating to the road also may be acquired in blocks of subdivided areas within a prescribed distance from the current position of the vehicle 730. Thereby, convenient and highly efficient data communication is possible.

Figure 23:
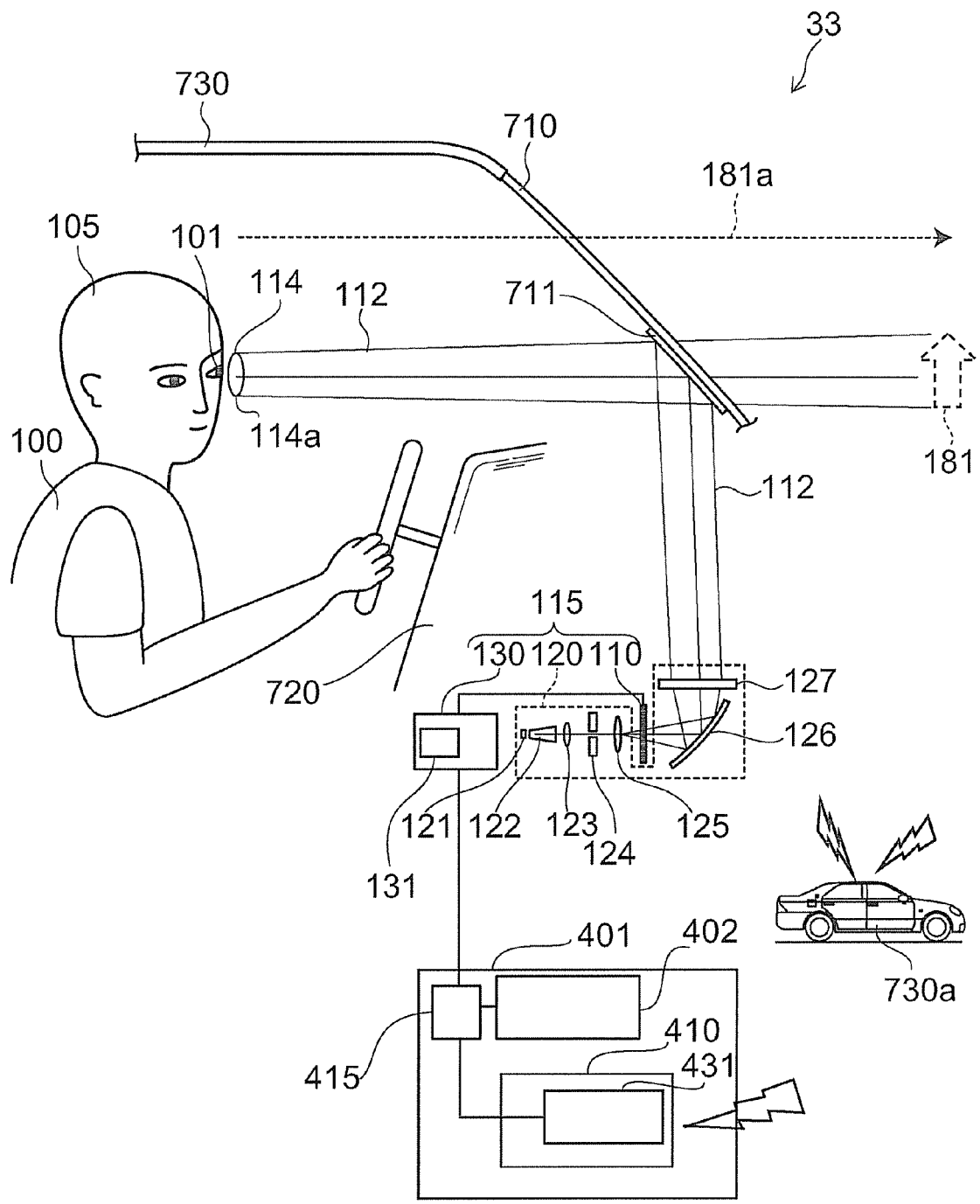
FIG. 23 is a schematic view illustrating the configuration of another automotive display system according to the third embodiment.

FIG. 23 is a schematic view illustrating the configuration of another automotive display system according to the third embodiment of the invention.

The angle information acquisition unit 401 of another automotive display system 33 according to the third embodiment of the invention illustrated in FIG. 23 also includes the vehicle axis angle detection unit 402 and the external environment angle information acquisition unit 410. In this case as well, the angle calculation unit 415 is provided in the angle information acquisition unit 401. Although the image viewer position detection unit 210 and the control unit 250 are omitted in FIG. 23, the automotive display system 33 also may include these components and perform similar operations.

The external environment angle information acquisition unit 410 of the automotive display system 33 includes the vehicle position acquisition unit 411 and an inter-vehicle communication unit 431 capable of communicating with a vehicle 730a different from the vehicle 730 in which the automotive display system 33 is mounted. The other vehicle 730a may be taken as a leading vehicle traveling in the frontward path of the vehicle 730. The other vehicle 730a also includes an inter-vehicle communication unit 431, and it is assumed that the other vehicle 730a and the vehicle 730 can communicate directly.

It is assumed that the vehicle axis angle detection unit 402 and the vehicle position acquisition unit 411 are provided also in the other vehicle 730a. Thereby, data is acquired relating to the angles (the pitch angle θp, the roll angle θr, and the yaw angle θy) of the axes of the other vehicle 730a corresponding to the position of the other vehicle 730a according to the travel of the other vehicle 730a. The angles (the pitch angle θp, the roll angle θr, and the yaw angle θy) of the axes of the other vehicle 730a may be considered to correspond to the grade angle θp1, the left/right slant angle θr1, and the heading angle θy1 of the road.

Accordingly, the information of the external environment of the vehicle 730 can be obtained from the other vehicle 730a by acquiring the angles (the pitch angle θp, the roll angle θr, and the yaw angle θy) of the axes of the other vehicle 730a obtained by the vehicle axis angle detection unit 402 provided in the other vehicle 730a with the information of the position of the other vehicle 730a. Thus, the angles (the grade angle θp1, the left/right slant angle θr1, and the heading angle θy1) of the axes of the background object 520 at the target position 521 are ascertained based on the information of the external environment obtained from the other vehicle 730a.

As described above, the angle calculation unit 415 calculates the relative difference of the angles based on the axis of the vehicle 730 and the axis of the external environment. Based on this calculation result, the angle calculation unit 415 corrects the display object 180.

Thereby, a monocular automotive display system can be provided having further reduced incongruity caused by differences between the slant of the background and the attitude and the heading of the vehicle.

The automotive display system 32 described above may be used in the case where the data relating to the axis of the other vehicle 730a acquired by the other vehicle 730a is sent to the host 600, then the data relating to the axis of the other vehicle 730a is acquired via the host 600, and the axis of the background object 520 of the external environment is ascertained based on this data.

Figure 24:
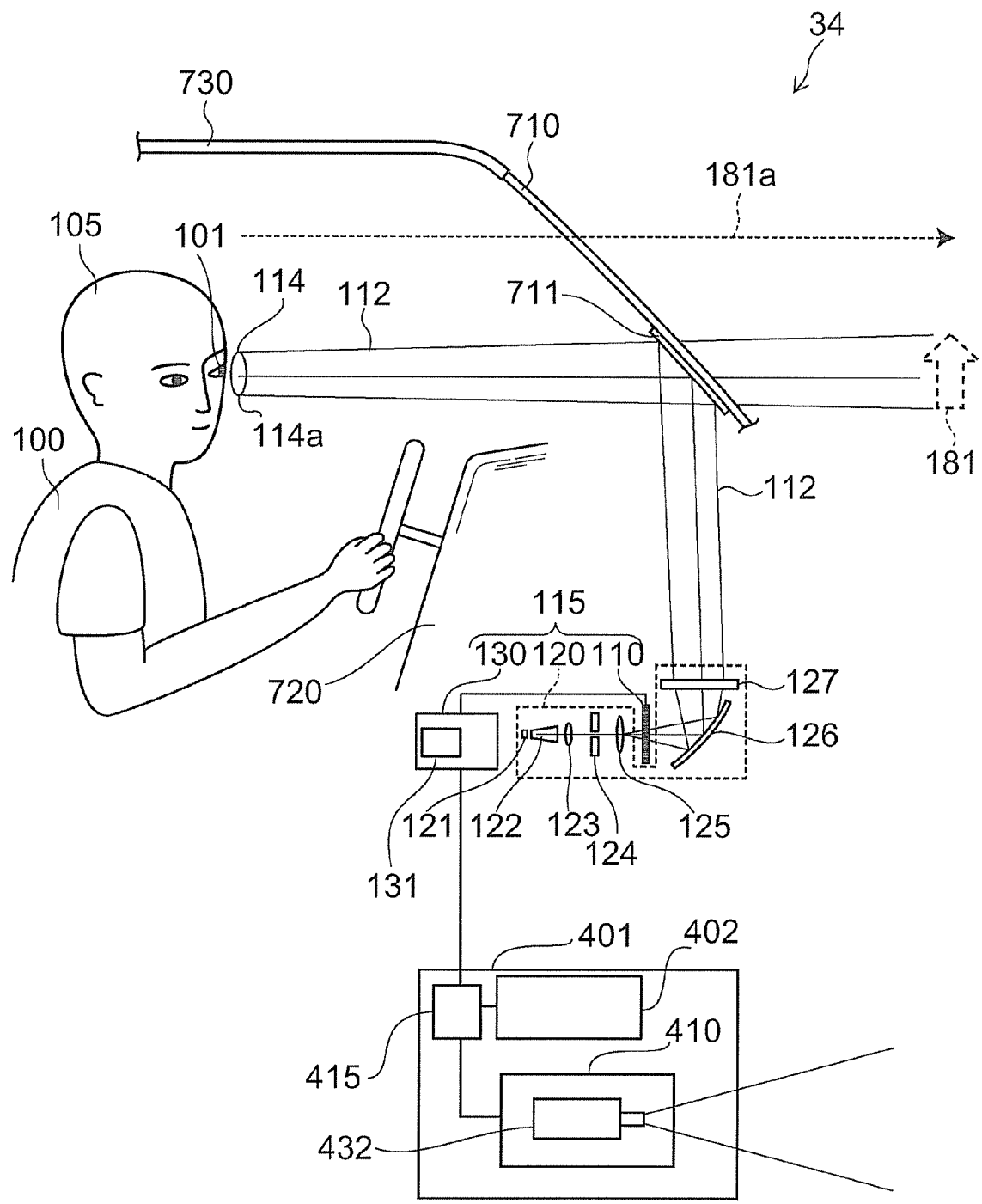
FIG. 24 is a schematic view illustrating the configuration of another automotive display system according to the third embodiment.

FIG. 24 is a schematic view illustrating the configuration of another automotive display system according to the third embodiment of the invention.

The angle information acquisition unit 401 of another automotive display system 34 according to the third embodiment of the invention illustrated in FIG. 24 also includes the vehicle axis angle detection unit 402 and the external environment angle information acquisition unit 410. In this case as well, the angle calculation unit 415 is provided in the angle information acquisition unit 401. Although the image viewer position detection unit 210 and the control unit 250 are omitted in FIG. 24, the automotive display system 34 also may include these components and perform similar operations.

In the automotive display system 34, the external environment angle information acquisition unit 410 includes a receiver 432. The receiver 432 may include sending functions and receiving functions. In such a case, for example, a radar device and the like may be used. Thereby, the information of the external environment such as the configuration, grade, slant, heading, etc., of the frontward path, for example, of the vehicle 730 is acquired.

The angles (the grade angle θp1, the left/right slant angle θr1, and the heading angle θy1) of the axes of the background object 520 are ascertained based on this information.

As described above, the angle calculation unit 415 calculates the relative difference in the angles based on the axis of the vehicle 730 and the axis of the external environment. Based on this calculation result, the angle calculation unit 415 corrects the display object 180.

Thereby, a monocular automotive display system can be provided having further reduced incongruity caused by differences between the slant of the background and the attitude and the heading of the vehicle.

In the case where markers such as transmitters are laid along the road on which the vehicle 730 travels, the data relating to the grade, the slant in the left and right direction, the heading (the curve), and the like of the road can be acquired by the reception of the signals from the markers by the receiver 432. The angle of the axis of the background object 520 may be ascertained using this information.

Fourth Embodiment

Figure 25:
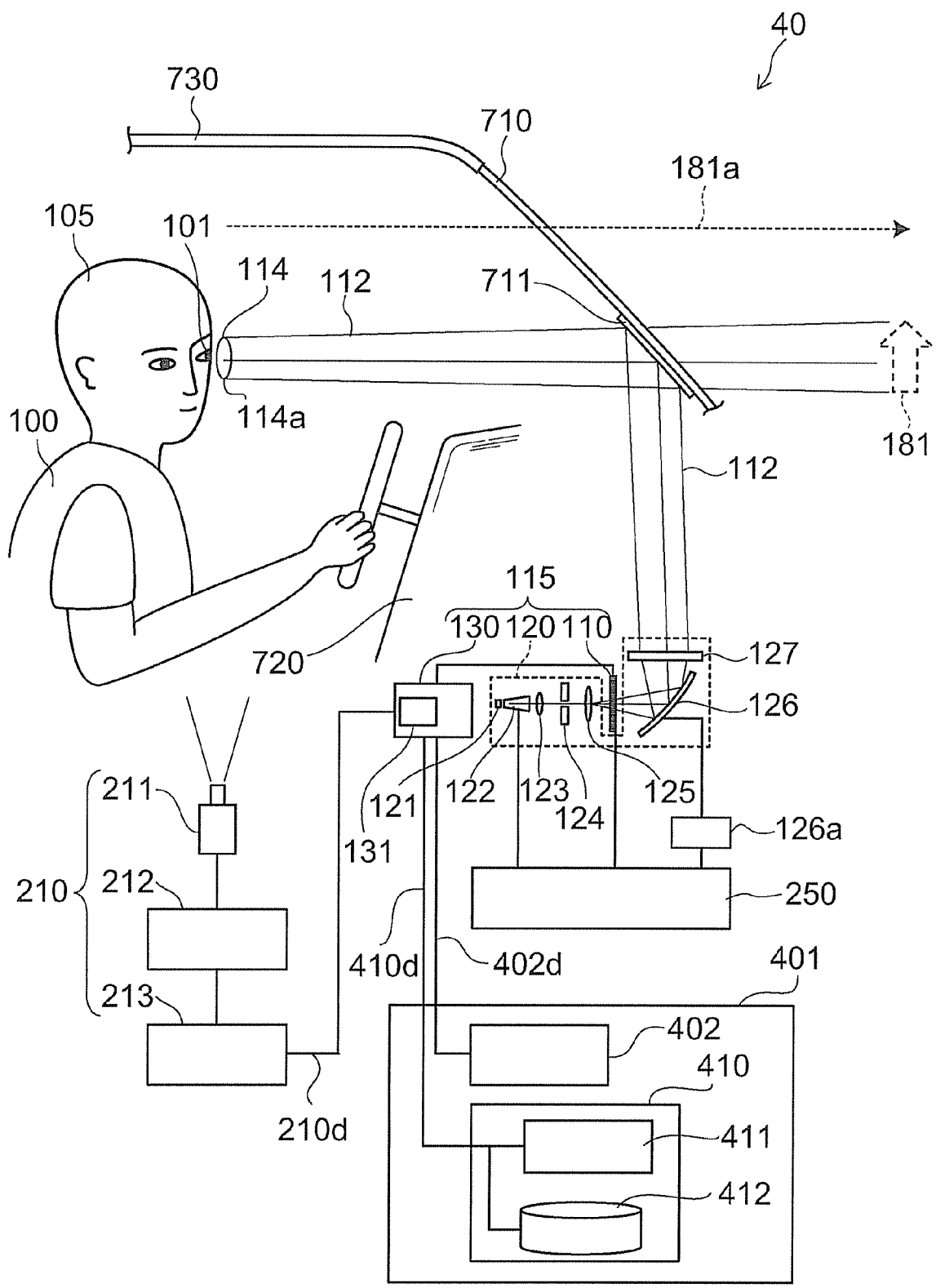
FIG. 25 is a schematic view illustrating the configuration of an automotive display system according to a fourth embodiment.

FIG. 25 is a schematic view illustrating the configuration of an automotive display system according to a fourth embodiment of the invention.

An automotive display system 40 according to the fourth embodiment of the invention illustrated in FIG. 25 includes the image projection unit 115, the angle information acquisition unit 401, and the image viewer position detection unit 210.

The angle information acquisition unit 401 includes the vehicle axis angle detection unit 402 and the external environment angle information acquisition unit 410. Although the external environment angle information acquisition unit 410 includes the vehicle position acquisition unit 411 and the external environment information storage unit 412 in this specific example, the configuration of the external environment angle information acquisition unit 410 may include at least one of any of the configurations described above.

Although the angle of the display object 180 is changed based on at least one of the vehicle angle information 402d and the external environment angle information 410d acquired by the angle information acquisition unit 401 in the automotive display system according to the first to third embodiments, the display object 180 of the automotive display system 40 according to this embodiment is further changed based on the position of the image viewer 100 (e.g., the position of the one eye 101).

In other words, the virtual visual point 101a may be disposed at any position in the virtual space VS as described above in regard to FIG. 3. In the automotive display system according to the first to third embodiment, the case is described where the virtual visual point 101a is fixed. Although the virtual visual point 101a corresponds to the position of the one eye 101 of the image viewer 100 in real space, the position of the image viewer 100, i.e., the driver, is relatively fixed inside the vehicle 730. Therefore, the position of the one eye 101 is relatively fixed.

However, the posture of the driver changes, albeit in a limited area. Therefore, the position of the one eye 101 also moves. The automotive display system 40 performs operations such as detecting the position of the one eye 101 by the image viewer position detection unit 210; changing the position of the virtual visual point 101a in the virtual space VS corresponding to the change of the position of the one eye 101; and rotating the angle of the arrow 310, i.e., the display object 180, and moving the position of the arrow 310 corresponding to the change of the virtual visual point 101a position.

Thereby, a correction of the position of the one eye 101 of the image viewer 100 can be made in the case where the position moves. Therefore, a monocular automotive display system having better viewability and further reduced incongruity caused by differences between the slant of the background and the attitude and the heading of the vehicle and the shifting of the position of the one eye 101 of the image viewer 100.

Because the position of the virtual image 181 formed by the image of the display object 180 shifts not only in angle but also in position in the background in the case where the one eye 101 of the image viewer 100 moves, both the angle and the position of the virtual image 181 can be corrected by correcting the angle and the position of the display object 180.

The correction of the angle and the position of the display object 180 in the case where the virtual visual point 101a moves can be realized using three dimensional computer graphics rendering.

In this specific example, the angle calculation unit 415 is not provided in the angle information acquisition unit 401, and the vehicle angle information 402d and the external environment angle information 410d acquired by the angle information acquisition unit 401 are provided directly to the image generation unit 130 of the image projection unit 115.

For example, a portion (not illustrated) corresponding to the angle calculation unit 415 may be provided inside the image generation unit 130, and the vehicle angle information 402d and the external environment angle information 410d may be input thereto. The image viewer position information 210d, i.e., the data relating to the position of the image viewer 100 (e.g., the position of the one eye 101) detected by the image viewer position detection unit 210 may be input to the image generation unit 130. Thereby, the image generation unit 130 changes the angle of the display object 180 in the image based on at least one of the vehicle angle information 402d, the external environment angle information 410d, and the image viewer position information 210d. In other words, the display object 180 is rotated in the virtual space VS to correct the angle, and the position is moved to correct the position.

The operation of correcting the display object 180 by the image viewer position information 210d described above may be applied to any of the automotive display systems according to the embodiments of the invention described above in the case where the image viewer position detection unit 210 that detects the position of the image viewer 100 (e.g., the position of the one eye 101) is provided.

Figure 26:
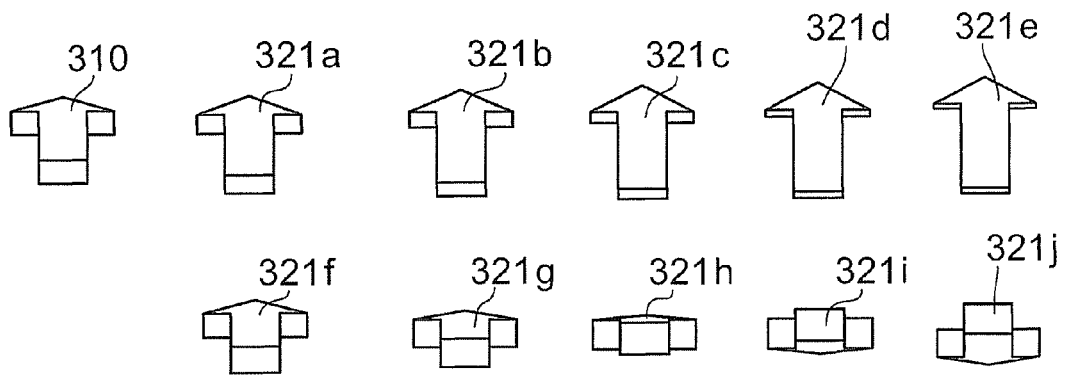
FIG. 26 is a schematic view illustrating the operations of the automotive display systems according to the embodiments.

FIG. 26 is a schematic view illustrating the operations of the automotive display systems according to the embodiments of the invention.

Namely, FIG. 26 illustrates modifications of the arrow 310, i.e., the display object 180, accompanying pitch angles Op of the vehicle 730. Here, the case where the road is flat is assumed to simplify the description.

As illustrated in FIG. 26, the arrow 310 points frontward when the pitch angle θp=0. The arrow 310 is disposed, for example, about 50 cm in the air above the road and therefore appears to be below the image viewer 100 as viewed from the image viewer 100. To this end, the configuration of the arrow 310 appears as viewed from above on the front side thereof.

For arrows 321a, 321b, 321c, 321d, and 321e corresponding to pitch angles θp=−5 degrees, −10 degrees, −15 degrees, −20 degrees, and −25 degrees, respectively, the original arrow 310 rotates upward. In other words, the tip of the arrow rotates to be disposed frontward as viewed from the image viewer 100. For arrows 321f, 321g, 321h, 321i, and 321j corresponding to pitch angles θp=5 degrees, 10 degrees, 15 degrees, 20 degrees, and 25 degrees, respectively, the original arrow 310 rotates downward.

Such image data of the arrows 321a to 321j may be used as the image data of the corrected arrow 310a.

Such arrows 321a to 321j may be used as the corrected arrow 310a also in the case where the vehicle 730 is horizontal and the frontward road slants uphill and downhill.

Figure 27:
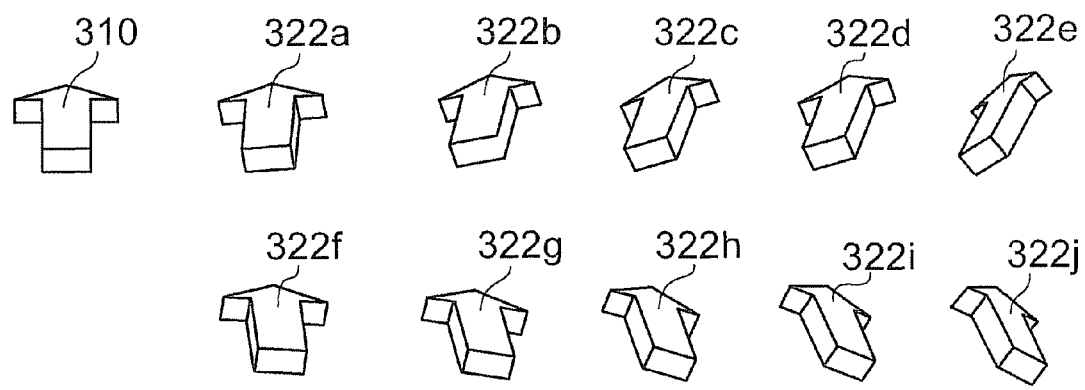
FIG. 27 is a schematic view illustrating other operations of the automotive display systems according to the embodiments.

FIG. 27 is a schematic view illustrating other operations of the automotive display systems according to the embodiments of the invention.

Namely, FIG. 27 illustrates modifications of the arrow 310, i.e., the display object 180, accompanying roll angles θr of the vehicle 730. Here, the case where the road is flat is assumed to simplify the description.

As illustrated in FIG. 27, the arrow 310 has a configuration which is horizontal left and right when the roll angle θr=0.

For arrows 322a, 322b, 322c, 322d, and 322e corresponding to roll angles θr=−5 degrees, −10 degrees, −15 degrees, −20 degrees, and −25 degrees, respectively, the original arrow 310 rotates counterclockwise. For arrows 322f, 322g, 322h, 322i, and 322j corresponding to roll angles θr=5 degrees, 10 degrees, 15 degrees, 20 degrees, and 25 degrees, respectively, the original arrow 310 rotates clockwise.

Such image data of the arrows 322a to 322j may be used as the image data of the corrected arrow 310a.

Such arrows 322a to 322j may be used as the corrected arrow 310a also in the case where the vehicle 730 is horizontal and the frontward road slants in the left and right direction.

Figure 28:
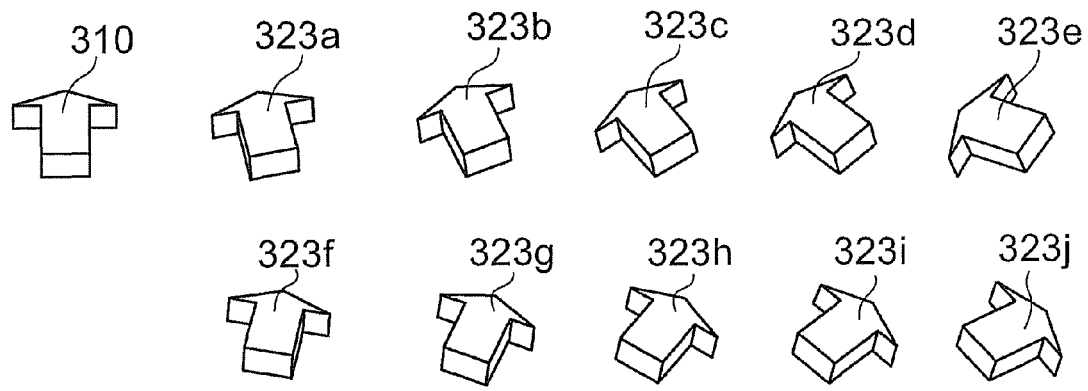
FIG. 28 is a schematic view illustrating other operations of the automotive display systems according to the embodiments.

FIG. 28 is a schematic view illustrating other operations of the automotive display systems according to the embodiments of the invention.

Namely, FIG. 28 illustrates modifications of the arrow 310, i.e., the display object 180, accompanying yaw angles θy of the vehicle 730. Here, the case where the road is proceeding straight is assumed to simplify the description.

As illustrated in FIG. 28, the arrow 310 points frontward when the yaw angle θy=0.

For arrows 323a, 323b, 323c, 323d, and 323e corresponding to yaw angles θy=−5 degrees, −10 degrees, −15 degrees, −20 degrees, and −25 degrees, respectively, the original arrow 310 rotates counterclockwise as viewed from above. For arrows 323f, 323g, 323h, 323i, and 323j corresponding to yaw angle θy=5 degrees, 10 degrees, 15 degrees, 20 degrees, and 25 degrees, respectively, the original arrow 310 rotates clockwise.

Such image data of the arrows 323a to 323j may be used as the image data of the corrected arrow 310a.

Such arrows 323a to 323j may be used as the corrected arrow 310a also in the case where the heading of the frontward road curves in the left and right direction at the target position 521.

As described above, the image data of the arrows 321a to 321j, the arrows 322a to 322j, and the arrows 323a to 323j may be obtained by rotating the arrow 310 in the virtual space VS.

Further, for example, the image data corresponding to the prescribed angles may be obtained by pre-storing the image data of such arrows 321a to 321j, arrows 322a to 322j, and arrows 323a to 323j and interpolating the image data to correspond to the prescribed angles. Thus, the display object 180 can be corrected relatively efficiently at high speed based on two dimensional image data without using three dimensional computer graphics rendering.

The image data recited above may be stored in, for example, the image memory 131 provided in the image generation unit 130. In such a case, the image data may be stored, for example, as data for each pixel, or, for example, as vector data.

Figure 29:
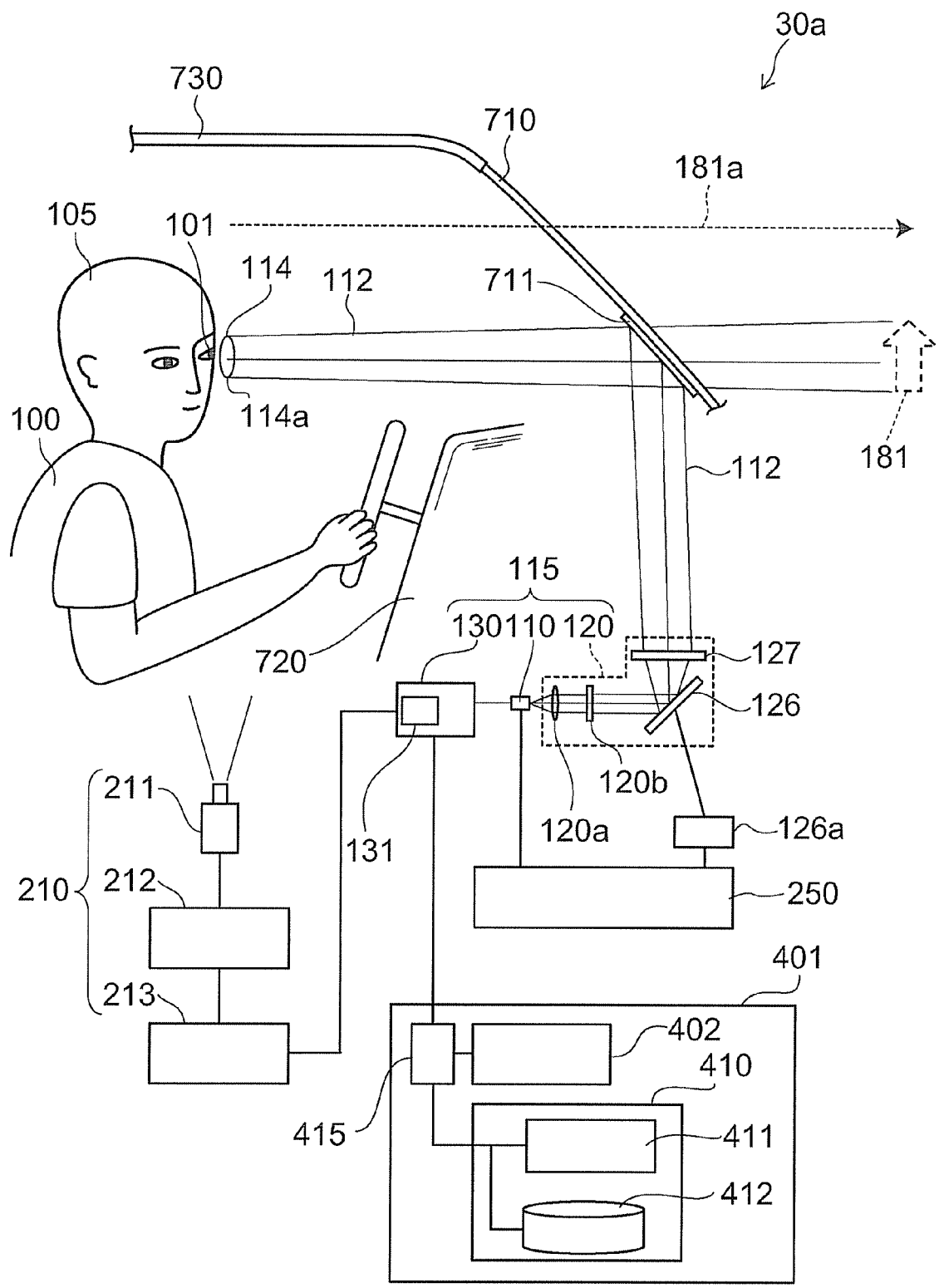
FIG. 29 is a schematic view illustrating a modification of the automotive display system according to embodiments.

FIG. 29 is a schematic view illustrating a modification of the automotive display system according to embodiments of the invention.

An automotive display system 30a of the modification illustrated in FIG. 29 is the automotive display system 30 according to the third embodiment with a modified configuration of the image projection unit 115. Namely, the configurations of the image formation unit 110 and the projection unit 120 in the image projection unit 115 are modified.

Namely, an LCD including an LED backlight may used as the image formation unit 110. An imaging lens 120a, a lenticular lens 120b controlling the divergence angle, the mirror 126, and the aspherical Fresnel lens 127 are used as the projection unit 120.

In the case where such a configuration is used, operations similar to those of the automotive display system 30 can be performed. A self-emitting display device such as, for example, an organic EL display device may be used as the image formation unit.

The combination of the image formation unit 110 and the projection unit 120 of this specific example may be applied to any of the automotive display systems according to the embodiments of the invention described above.

Thus, any appropriate configuration may be used in the image projection unit 115.

Fifth Embodiment

Figure 30:
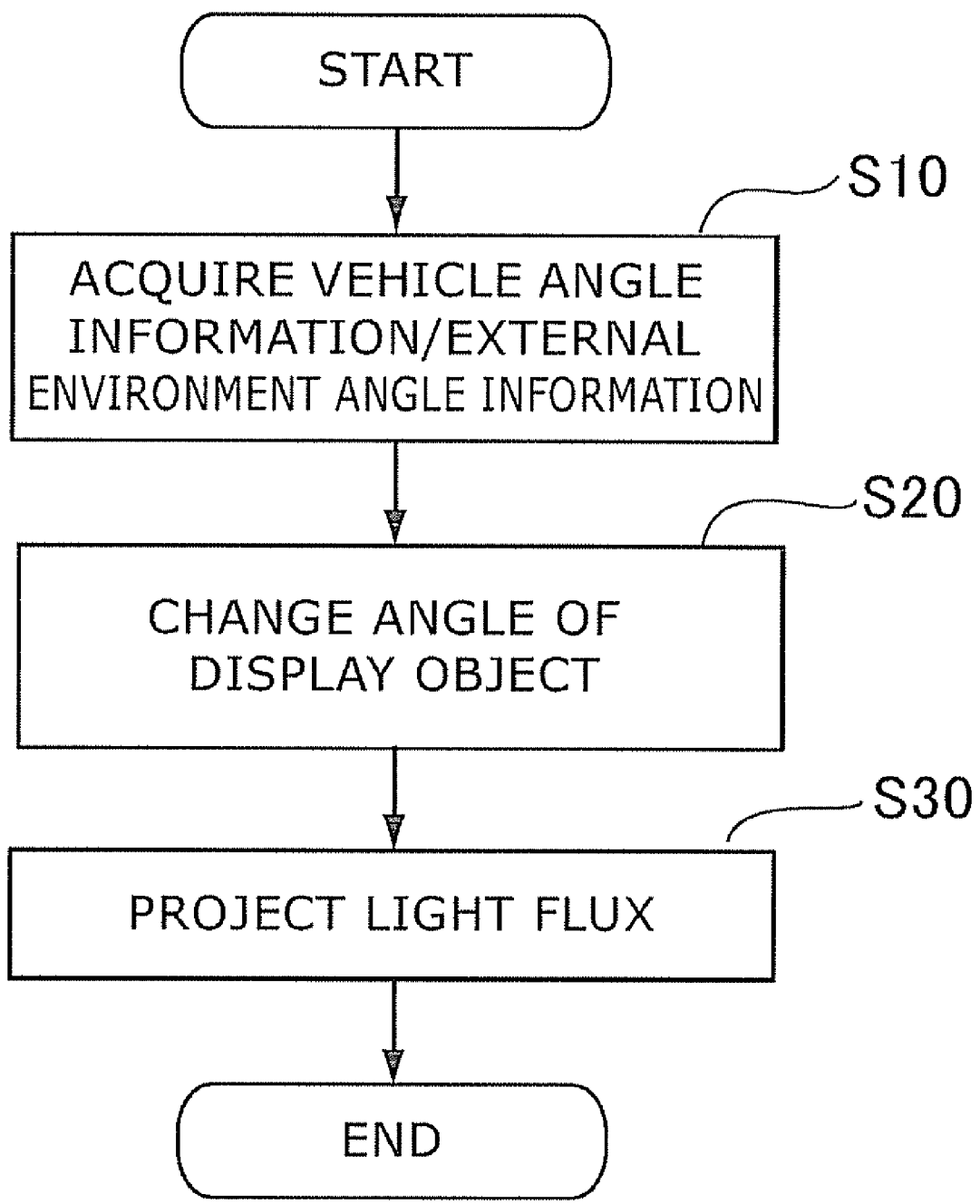
FIG. 30 is a flowchart illustrating a display method according to a fifth embodiment.

FIG. 30 is a flowchart illustrating a display method according to a fifth embodiment of the invention.

In the display method according to this embodiment illustrated in FIG. 30, first, at least one of the vehicle angle information 402d relating to the angle of the axis of the vehicle 730 in which the image viewer 100 rides and the external environment angle information 410d relating to the angle of the axis of the background object 520 of the external environment outside the space where the image viewer 100 rides in the vehicle 730 is acquired (step S10).

The vehicle axis angle detection unit 402 described above, for example, may be used to acquire the vehicle angle information 402d.

The external environment angle information acquisition unit 410 described above, for example, may be used to acquire the external environment angle information 410d. The vehicle position acquisition unit 411 (e.g., a GPS receiver) that acquires the position of the vehicle 730 and the external environment information storage unit 412 that stores the information of the external environment of the vehicle 730 may be used as the external environment angle information acquisition unit 410 as described above. The vehicle position acquisition unit 411 and the communication unit 430 capable of communicating with the host 600 provided outside of the vehicle 730 also may be used as the external environment angle information acquisition unit 410. The inter-vehicle communication unit 431 capable of communicating between the vehicle 730 and another separate vehicle 730a also may be used as the external environment angle information acquisition unit 410. The external environment information detection unit 420 including the external environment imaging unit 421 that captures an image of the external environment of the vehicle 730 also may be used as the external environment angle information acquisition unit 410. The receiver 432 (for example, a radar device) that detects the topography of the external environment of the vehicle 730 also may be used as the external environment angle information acquisition unit 410.

The angle of the display object 180 is changed in the image DI based on at least one of the acquired vehicle angle information 402d and the external environment angle information 410d (step S20).

At this time, the relative difference between the angle of the axis of the vehicle 730 and the angle of the axis of the background object 520 may be calculated by, for example, the angle calculation unit 415 based on, for example, the acquired vehicle angle information 402d and the external environment angle information 410d; and the angle of the display object 180 in the image DI may be changed based on the relative difference.

The light flux 112 including the image DI including the display object 180 having a changed angle is projected toward the one eye 101 of the image viewer 100 (step S30).

Thereby, a display method applicable to monocular automotive applications can be provided having reduced incongruity caused by differences between the slant of the background and the attitude and the heading of the vehicle.

In step S20 recited above, the angle of the display object 180 in the image DI may be changed further based on the position of the image viewer 100 (e.g., the position of the one eye 101) detected by, for example, the image viewer position detection unit 210. In such a case, for example, the position of the virtual visual point in the virtual space VS may be taken as the position of the detected one eye 101. Thereby, even in the case where the position of the one eye 101 changes, an image of the proper display object corresponding to the change can be generated, and a more natural image can be presented.

In step S30 recited above, at least one of the projection area and the projection position of the light flux 112 may be adjusted by controlling the image projection unit 115 by, for example, the control unit 250 based on, for example, the position of the image viewer 100 (e.g., the position of the one eye 101) detected by the image viewer position detection unit 210; and the light flux 112 may be projected toward the one eye 101 of the image viewer 100. Thereby, even in the case where the head 105 of the image viewer 100 moves, the movement does not cause the position of the one eye 101 to move out of the image presentation position, the practical viewing area can be increased, and a more convenient display method can be provided.

Although cases where the arrow 310 indicating the path are used as the display object 180 is described above, also, for example, any positional information 511 of the external environment such as the address of a location and any external environment information such as name information 512 of street names, surrounding buildings, etc., may be used as the display object 180. In such a case as well, the positional information 511, the name information 512, and the like of the external environment may be displayed corresponding to the target position of the background object 520 of the external environment corresponding thereto. In such a case, similarly to the case of the arrow 310, the angle of the display object 180 is changed in the image based on the relative difference in the angles of the axis of the vehicle 730 and the axis of the background object 520. For example, the address may be displayed along the topography thereof; the road name and the like may be displayed along the grade, the slant, and the heading of the road; and the names of buildings and the like may be displayed along the configuration of the buildings and the like. Thereby, a congruous and natural display can be provided.

Hereinabove, exemplary embodiments of the invention are described with reference to specific examples. However, the invention is not limited to these specific examples. For example, one skilled in the art may appropriately select specific configurations of components of automotive display systems and display methods from known art and similarly practice the invention. Such practice is included in the scope of the invention to the extent that similar effects thereto are obtained.

Further, any two or more components of the specific examples may be combined within the extent of technical feasibility; and are included in the scope of the invention to the extent that the purport of the invention is included.

Moreover, all automotive display systems and display methods obtainable by an appropriate design modification by one skilled in the art based on the automotive display systems and the display methods described above as exemplary embodiments of the invention also are within the scope of the invention to the extent that the purport of the invention is included.

Furthermore, various modifications and alterations within the spirit of the invention will be readily apparent to those skilled in the art. All such modifications and alterations should therefore be seen as within the scope of the invention.

The invention claimed is:

1. An automotive display system, comprising:
   an image projection unit configured to project a light flux including an image including a display object toward one eye of an image viewer; and
   an angle information acquisition unit configured to acquire at least one of vehicle angle information and external environment angle information, the vehicle angle information relating to an angle of at least one of an attitude and a heading of a vehicle carrying the image viewer, the external environment angle information relating to an angle of a background object at a target position of the display object in a background of an external environment of the vehicle,
   the image projection unit changing an angle of the display object in the image based on at least one of the vehicle angle information and the external environment angle information acquired by the angle information acquisition unit.

2. The system according to claim 1, wherein the image projection unit changes the angle of the display object in the image based on a relative difference between the angle of the background object and the angle of at least one of the attitude and the heading of the vehicle.

3. The system according to claim 1, wherein the angle of the background object includes at least one of an angle of a grade in a direction along an extension direction of a road in a frontward path of the vehicle, an angle of a slant in a direction along a left and right direction orthogonal to an extension direction of the road, and an angle of a heading of an extension direction of the road at a target position of the display object.

4. The system according to claim 1, wherein the angle of the display object in the image is a three dimensional angle of the display object in a virtual space corresponding to the image.

5. The system according to claim 4, wherein the angle of the display object in the image is an angle when a position of the one eye of the image viewer is taken as a virtual visual point in the virtual space.

6. The system according to claim 1, wherein
   the image projection unit further includes an image data storage unit configured to store image data of the display object corresponding to at least one of the angle of the attitude of the vehicle, the angle of the heading of the vehicle, and the angle of the background object, and the image projection unit changes the angle of the display object in the image based on the image data stored in the image data storage unit.

7. The system according to claim 6, wherein the image projection unit generates interpolation image data interpolated from a plurality of the image data stored in the image data storage unit and changes the angle of the display object in the image based on the interpolation image data.

8. The system according to claim 1, further comprising:
an image viewer position detection unit configured to detect a position of the image viewer; and
a control unit configured to adjust the angle of the display object in the image and at least one of a projection area and a projection position of the light flux based on the position of the image viewer detected by the image viewer position detection unit.

9. The system according to claim 8, wherein the image viewer position detection unit detects a position of the one eye of the image viewer as the position of the image viewer.

10. The system according to claim 1, wherein
the angle acquisition unit includes an external environment angle information acquisition unit configured to acquire the external environment angle information, and
the external environment angle information acquisition unit includes an external environment information storage unit that stores information of the external environment.

11. The system according to claim 1, wherein the image projection unit makes the image viewable by the image viewer via a reflector that reflects the light flux and projects the light flux toward the one eye of the image viewer.

12. The system according to claim 1, wherein the angle of the display object in the image includes at least one of a first rotation angle around an axis in a first direction corresponding to a direction from a rear of the vehicle toward a front of the vehicle, a second rotation angle around an axis in a second direction corresponding to a left and right direction of the vehicle, and a third rotation angle around an axis in a third direction orthogonal to the first direction and the second direction in the image.

13. The system according to claim 1, wherein the angle of at least one of the attitude and the heading of the vehicle includes at least one of a roll angle, a pitch angle, and a yaw angle of the vehicle.

14. The system according to claim 1, wherein the angle of the display object in the image is an angle corresponding to a configuration, a size, and a position of the display object in the image.

15. The system according to claim 1, wherein the angle acquisition unit includes a vehicle axis angle detection unit that detects at least one of a roll angle, a pitch angle, and a yaw angle of the vehicle.

16. The system according to claim 1, wherein
the angle acquisition unit includes an external environment angle information acquisition unit that acquires the external environment angle information, and
the external environment angle information acquisition unit includes a communication unit capable of communicating with a host provided outside the vehicle.

17. The system according to claim 1, wherein
the angle acquisition unit includes an external environment angle information acquisition unit that acquires the external environment angle information, and
the external environment angle information acquisition unit includes an inter-vehicle communication unit capable of communicating with a vehicle different from the vehicle.

18. The system according to claim 1, wherein
the angle acquisition unit includes an external environment angle information acquisition unit that acquires the external environment angle information, and
the external environment angle information acquisition unit includes an external environment information detection unit including an external environment imaging unit that captures an image of the external environment of the vehicle.

19. The system according to claim 1, wherein
the angle acquisition unit includes an external environment angle information acquisition unit that acquires the external environment angle information, and
the external environment angle information acquisition unit includes a receiver that detects topography of the external environment of the vehicle.

20. A display method, comprising:
acquiring at least one of vehicle angle information and external environment angle information, the vehicle angle information relating to an angle of at least one of an attitude and a heading of a vehicle carrying an image viewer, the external environment angle information relating to an angle of a background object at a target position of the display object in a background of an external environment of the vehicle;
changing an angle of a display object in an image based on at least one of the acquired vehicle angle information and the acquired external environment angle information; and
projecting a light flux including the image including the display object toward one eye of the image viewer.

* * * * *